US008745501B2

(12) United States Patent  
Krantz et al.

(10) Patent No.: US 8,745,501 B2  
(45) Date of Patent: Jun. 3, 2014

(54) SYSTEM AND METHOD OF DISPLAYING A MULTIMEDIA TIMELINE

(75) Inventors: David Krantz, San Antonio, TX (US); Aradhana Goel, Chicago, IL (US); Joseph Graceffa, Chicago, IL (US); Mark Jones, Evanston, IL (US); Iain Roberts, Chicago, IL (US); April Starr, Chicago, IL (US); Thomas Keil Stat, Northbrook, IL (US)

(73) Assignee: AT&T Knowledge Ventures, LP, Reno, NV (US)

( * ) Notice: Subject to any disclaimer, the term of this patent is extended or adjusted under 35 U.S.C. 154(b) by 1522 days.

(21) Appl. No.: 11/726,030

(22) Filed: Mar. 20, 2007

(65) Prior Publication Data

US 2008/0235591 A1   Sep. 25, 2008

(51) Int. Cl.  
*G06F 3/00* (2006.01)

(52) U.S. Cl.  
USPC ............................ 715/730; 715/731; 715/732

(58) Field of Classification Search  
USPC ................................................ 715/730–732  
See application file for complete search history.

(56) References Cited

U.S. PATENT DOCUMENTS

| 4,866,542 | A | 9/1989 | Shimada et al. |
| 5,302,968 | A | 4/1994 | Heberle |
| 5,367,316 | A | 11/1994 | Ikezaki |
| 5,388,197 | A | 2/1995 | Rayner |
| 5,408,275 | A | 4/1995 | Song et al. |
| 5,550,965 | A | 8/1996 | Gabbe et al. |
| 5,659,793 | A | 8/1997 | Escobar et al. |
| 5,826,102 | A | 10/1998 | Escobar et al. |
| 5,889,506 | A | 3/1999 | Lopresti et al. |
| 5,920,642 | A | 7/1999 | Merjanian |
| 6,061,697 | A | 5/2000 | Nakao |
| 6,075,575 | A | 6/2000 | Schein et al. |
| 6,256,019 | B1 | 7/2001 | Allport |
| 6,275,174 | B1 | 8/2001 | Stork et al. |
| 6,310,606 | B1 | 10/2001 | Armstrong |
| 6,340,978 | B1 * | 1/2002 | Mindrum ...................... 715/764 |
| 6,397,388 | B1 | 5/2002 | Allen |
| 6,408,301 | B1 * | 6/2002 | Patton et al. ................. 707/741 |
| 6,486,896 | B1 * | 11/2002 | Ubillos ......................... 715/784 |
| 6,529,920 | B1 | 3/2003 | Arons et al. |
| 6,553,345 | B1 | 4/2003 | Kuhn et al. |

(Continued)

FOREIGN PATENT DOCUMENTS

GB        2388941 A    11/2003  
WO    WO 01/53925 A1   7/2001

OTHER PUBLICATIONS

The Design of the TimeWeaver System, Retrieved from http://web.mit.edu/cms.845/www/projects/spring-04/interactive-narratives/timeweaver/, Retrieved on Feb. 3, 2010, MIT, pp. 1-21.

(Continued)

*Primary Examiner* — Tadeese Hailu  
*Assistant Examiner* — Darrin Hope  
(74) *Attorney, Agent, or Firm* — Toler Law Group, PC

(57) ABSTRACT

Systems, methods, and computer readable media to display a multimedia timeline are disclosed. Data associated with a multimedia timeline may be received. The multimedia timeline may correspond to a life event. A first view may be generated to display a first portion of the multimedia timeline in a timeline format at a display device. The first view may correspond to a first time period.

32 Claims, 31 Drawing Sheets

(56) References Cited

U.S. PATENT DOCUMENTS

| | | | |
|---|---|---|---|
| 6,563,533 B1 | 5/2003 | Colby | |
| 6,598,074 B1 | 7/2003 | Moller et al. | |
| 6,622,171 B2 | 9/2003 | Gupta et al. | |
| 6,636,197 B1* | 10/2003 | Goldenberg et al. | 345/156 |
| 6,636,648 B2 | 10/2003 | Loui et al. | |
| 6,671,805 B1 | 12/2003 | Brown et al. | |
| 7,096,271 B1 | 8/2006 | Omoigui et al. | |
| 7,146,574 B2 | 12/2006 | Goldthwaite et al. | |
| 7,194,631 B2 | 3/2007 | Numano | |
| 7,194,634 B2 | 3/2007 | Ellison et al. | |
| 7,246,313 B2 | 7/2007 | Sung et al. | |
| 7,644,868 B2 | 1/2010 | Hare | |
| 7,725,731 B2 | 5/2010 | Brown et al. | |
| 7,800,615 B2 | 9/2010 | MacPherson | |
| 7,954,049 B2* | 5/2011 | Fletcher et al. | 715/231 |
| 2002/0038374 A1 | 3/2002 | Gupta et al. | |
| 2002/0099552 A1* | 7/2002 | Rubin et al. | 704/270 |
| 2002/0140820 A1* | 10/2002 | Borden, IV | 348/207.99 |
| 2002/0156909 A1 | 10/2002 | Harrington | |
| 2003/0009493 A1 | 1/2003 | Parker et al. | |
| 2003/0064355 A1 | 4/2003 | Florance | |
| 2003/0093699 A1 | 5/2003 | Banning et al. | |
| 2003/0159153 A1 | 8/2003 | Falvo et al. | |
| 2003/0195894 A1 | 10/2003 | Powers | |
| 2004/0030934 A1 | 2/2004 | Mizoguchi et al. | |
| 2004/0055018 A1 | 3/2004 | Stone | |
| 2004/0123320 A1 | 6/2004 | Daily et al. | |
| 2004/0205515 A1 | 10/2004 | Socolow et al. | |
| 2004/0218895 A1 | 11/2004 | Samadani et al. | |
| 2004/0224638 A1 | 11/2004 | Fadell et al. | |
| 2004/0225743 A1 | 11/2004 | Huggins et al. | |
| 2005/0034057 A1 | 2/2005 | Hull et al. | |
| 2005/0044480 A1 | 2/2005 | Dahan Templier | |
| 2005/0055377 A1 | 3/2005 | Dorey et al. | |
| 2005/0105374 A1 | 5/2005 | Finke-Anlauff et al. | |
| 2005/0158034 A1 | 7/2005 | Yokota et al. | |
| 2005/0162397 A1 | 7/2005 | Kwon et al. | |
| 2005/0180573 A1 | 8/2005 | Pelly et al. | |
| 2005/0289340 A1 | 12/2005 | Camenisch et al. | |
| 2006/0010420 A1 | 1/2006 | Peterson et al. | |
| 2006/0053468 A1 | 3/2006 | Sudoh et al. | |
| 2006/0080707 A1 | 4/2006 | Laksono | |
| 2006/0090141 A1* | 4/2006 | Loui et al. | 715/764 |
| 2006/0092295 A1 | 5/2006 | Mercer | |
| 2006/0129933 A1 | 6/2006 | Land et al. | |
| 2006/0190440 A1 | 8/2006 | Horvitz et al. | |
| 2006/0219776 A1 | 10/2006 | Finn | |
| 2006/0235698 A1 | 10/2006 | Cane et al. | |
| 2006/0282776 A1* | 12/2006 | Farmer et al. | 715/719 |
| 2007/0079001 A1 | 4/2007 | Ando et al. | |
| 2007/0171224 A1 | 7/2007 | MacPherson | |
| 2007/0223685 A1 | 9/2007 | Boubion et al. | |
| 2007/0266304 A1 | 11/2007 | Fletcher et al. | |
| 2007/0277224 A1 | 11/2007 | Osborn et al. | |
| 2008/0065548 A1 | 3/2008 | Muijen | |
| 2008/0065681 A1 | 3/2008 | Fontijn et al. | |
| 2008/0115197 A1 | 5/2008 | Moss | |
| 2008/0174550 A1 | 7/2008 | Laurila et al. | |
| 2008/0195743 A1 | 8/2008 | Brueck et al. | |
| 2008/0228507 A1 | 9/2008 | Larue et al. | |
| 2008/0231595 A1 | 9/2008 | Krantz et al. | |
| 2008/0235247 A1 | 9/2008 | Krantz et al. | |
| 2008/0235248 A1 | 9/2008 | Krantz et al. | |
| 2008/0235403 A1 | 9/2008 | Krantz et al. | |
| 2008/0235590 A1 | 9/2008 | Krantz et al. | |
| 2008/0235595 A1 | 9/2008 | Krantz et al. | |
| 2008/0235628 A1 | 9/2008 | Faught | |
| 2008/0235763 A1 | 9/2008 | Krantz et al. | |
| 2008/0320396 A1 | 12/2008 | Mizrachi et al. | |
| 2009/0271815 A1 | 10/2009 | Contin et al. | |

OTHER PUBLICATIONS

TimeLiner 5.0, User Manual, www.tomsnyder.com, 2002, Tom Snyder Productions Inc., Watertown, MA, pp. 1-87.

Alonso, O., et al., "Exploratory Search Using Timelines", SIGCHI 2007 Workshop on Exploratory Search and HCI Workshop, No. 1, 2007, pp. 1-4.

Oh, et al. "Manipulating Multimedia Contents with Tangible Media Control System", ICEC 2004, LNCS 3166, IFIP International Federation for Information Processing 2004, pp. 57-67.

* cited by examiner

SYSTEM AND METHOD OF DISPLAYING A MULTIMEDIA TIMELINE

FIELD OF THE DISCLOSURE

The present disclosure relates generally to displaying a multimedia timeline.

BACKGROUND

Portable electronic devices such as audio recorders, digital cameras, and video cameras, are becoming increasingly popular. As a result, an ever-increasing amount and variety of multimedia data, such as pictures, recordings, documents, and emails are becoming available. Traditionally, multimedia data is organized and stored by data type, such as photographs in a photo album, music in an audio player memory, and video on a digital video disk (DVD). However, organizing, storing and sharing multimedia data electronically can be cumbersome and confusing, especially to inexperienced computer users. Hence, there is a need for an improved system and method to display a multimedia timeline.

DETAILED DESCRIPTION OF THE DRAWINGS

Figure 1:
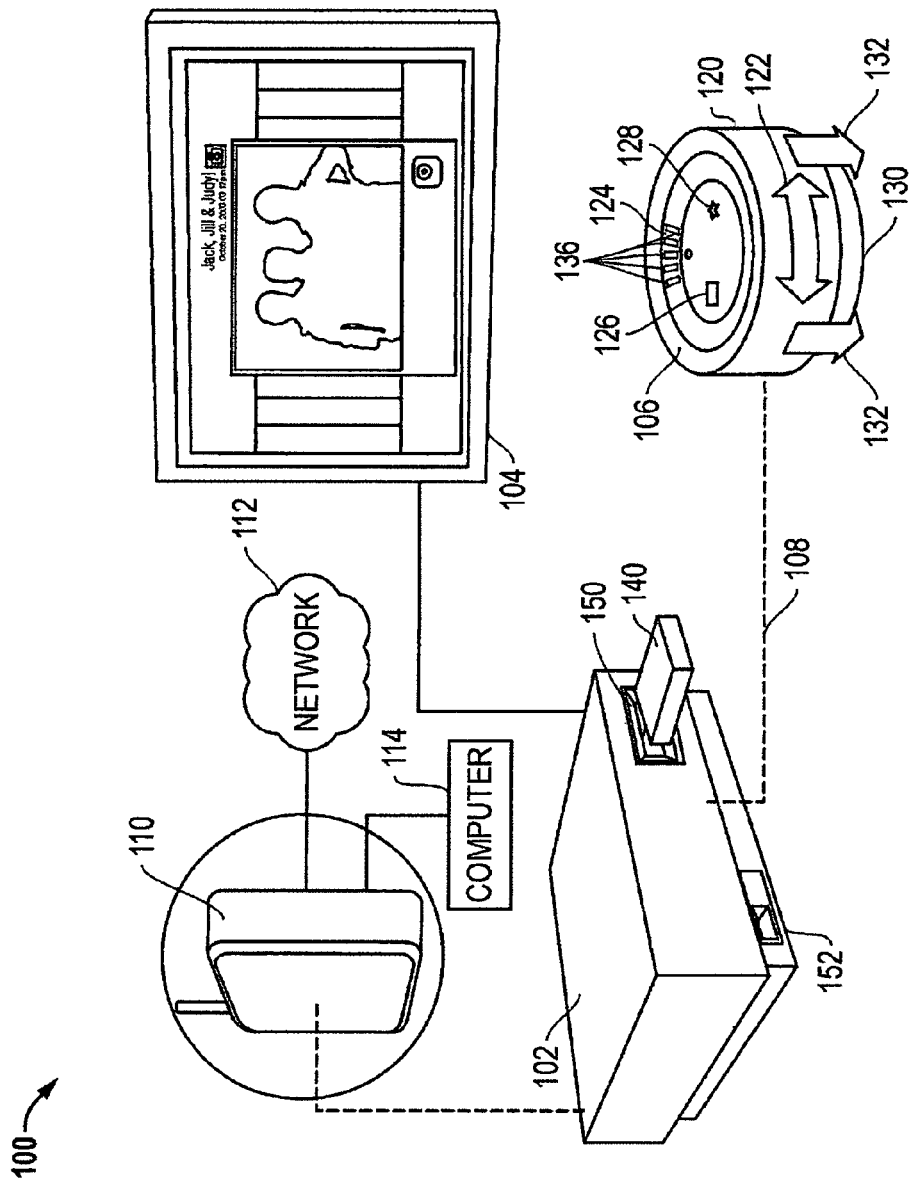
FIG. 1 is a general diagram of a particular illustrative embodiment of a system to provide a multimedia timeline.

The present disclosure is generally directed to a system and method of providing multimedia timelines. In a particular illustrative embodiment, a system to provide a multimedia timeline may include a multimedia device to provide multimedia timeline content to a display device. The multimedia device may be configured to receive navigation and selection commands from a user input device. In a particular embodiment, the multimedia device may be configured to receive one or more access key devices. Each access key device may store one or more access keys to obtain multimedia timeline access. An access key may include information to identify a designated user or one or more multimedia timelines associated with the access key. The multimedia device may communicate with a timeline server via a network, such as the Internet, and customer premises equipment (CPE). In a particular embodiment, a computer may also communicate with the timeline server via the network.

In a particular embodiment, the multimedia device may be a timeline docking station that is dedicated to providing multimedia timeline sessions without requiring a separate personal computer. The multimedia device may request and receive multimedia timeline data from the timeline server via the network. The multimedia device may generate a user-friendly graphical user interface (GUI) to provide the multimedia timeline data at a display device, such as a monitor or television.

In a particular embodiment, the multimedia timeline GUI may display a timeline playlist that includes any type of data objects, such as audio data, video data, digital image data, text data, documents, email, web-enabled data such as Flash data or markup language data, any other type of multimedia data, or any combination thereof. The multimedia timeline GUI may provide the data objects in a chronological ordered timeline format and may enable a user to select and view any data object independent of data type. The multimedia timeline GUI may enable a user to zoom in or zoom out between daily, weekly, and monthly views of the multimedia timeline data. The multimedia timeline GUI may also enable a user to attach one or more audio clips or other data objects to an item in the multimedia timeline.

In a particular embodiment, the multimedia device may have one or more ports, such as a Universal Serial Bus (USB) port, to enable data transfer with external devices, such as digital cameras, video cameras, audio recorders or players, or other types of multimedia storage or capture devices. Multimedia data from external devices may be automatically uploaded to the multimedia device and sent to the timeline server to be stored in chronological order in one or more multimedia timelines.

In a particular embodiment, the multimedia device may have an access key port that may be configured to receive an access key. The multimedia device may enforce a security policy that may limit viewing or editing access to a multimedia timeline based on identification data obtained from an inserted access key device. In a particular embodiment, the multimedia device may request multimedia timeline data automatically upon insertion of an access key device into the access key port. In a particular embodiment, the multimedia device may include an illuminable area surrounding the access key port to visually indicate that unviewed timeline material is available.

In a particular embodiment, the access key device may include a unique or semi-unique identifier corresponding to a particular user and associated with one or more multimedia timelines. In a particular embodiment, the access key device may include a Radio Frequency Identification (RFID) tag for identification by the multimedia device. In a particular embodiment, one or more master key devices may be encoded to allow unrestricted viewing and editing of a multimedia timeline, and one or more valet key devices may be encoded to only allow restricted viewing or editing of the multimedia timeline.

In a particular embodiment, the multimedia device may provide additional security via a visual security interface that displays a selection of multiple data objects from the user's multimedia timeline or from other sources. Access may be granted to the multimedia timeline based on a correct selection by the user of one or more predetermined data objects or sequences of data objects. Viewing of the requested timeline may be disabled after a certain number of unsuccessful attempts.

In a particular embodiment, the CPE may include a wireless router and a modem, such as a digital subscriber line (DSL) modem or cable modem. In a particular embodiment, the CPE may wirelessly communicate with the multimedia device via a dedicated wireless network. In a particular embodiment, a dongle may be attached to the modem or to the computer to provide a dedicated and exclusive wireless connection to the multimedia device at locations that may not be otherwise equipped with a wireless network.

In a particular embodiment, the user input device may enable a user to wirelessly navigate and select multimedia objects at a multimedia timeline graphical user interface (GUI) provided by the multimedia device. In a particular embodiment, the user input device may be a dedicated device for use with multimedia timeline viewing and may be configured to resemble a hockey puck with user-friendly controls. The user input device may include a rotatable outer ring to enable a user to chronologically navigate a multimedia timeline GUI. The user input device may include an independently rotatable inner ring to enable a user to zoom in, zoom out, or change views. The user input device may include lights or slots to indicate a degree of zoom.

In a particular embodiment, the user input device may enable a user to select a data object or other item of the multimedia timeline GUI by pressing downward on the outer ring of the user input device in a direction that is substantially perpendicular to the plane of rotation of the outer ring. The user input device may also include other controls to enable multimedia timeline operations, such as a menu control and a favorites control. The user input device may include one or more illuminable indicators to indicate a new message or new item added to an available multimedia timeline. The user input device may also include a microphone that enables a user to record audio annotations to be transmitted to the multimedia device for attachment to a multimedia timeline data object.

In a particular embodiment, data objects and metadata that are associated with a multimedia timeline may be sent to a multimedia timeline server from the computer. A multimedia timeline may be created by capturing data objects at the computer, such as audio data, video data, digital image data, documents, email, other media types, or any combination thereof. In a particular embodiment, a user of the computer may drag and drop icons representing the data objects to a target such as a timeline icon. The data objects may be sent to the timeline server for later retrieval during a multimedia timeline viewing session. In a particular embodiment, annotations may be added to one or more data objects at the computer for inclusion in the multimedia timeline.

In a particular embodiment, the computer or the timeline server may generate metadata to link data objects to other data objects in a multimedia timeline. The metadata can link new data objects to already stored data objects in the multimedia timeline. In a particular embodiment, the metadata can link one or more stored data objects to one or more other stored data objects. In a particular embodiment, the computer may generate metadata associated with one or more captured data objects and may send both the metadata and the data objects to the timeline server.

During operation, a user may populate a multimedia timeline stored at a timeline server with multimedia data objects via the computer. In an embodiment, at least a portion of the multimedia data and metadata associated with the user's multimedia timeline may be uploaded to the timeline server from other network-enabled devices, such as a cellular phone or a personal digital assistant (PDA), as illustrative, non-limiting examples.

In a particular embodiment, a user may begin a multimedia timeline viewing session by inserting an access key device into a multimedia device that can provide multimedia timeline sessions and that has access to the timeline server. The multimedia device may authenticate the access key and request multimedia timeline data from the timeline server. In another embodiment, an authentication process, such as sending a user identification and password to the timeline server, may be used to establish a timeline viewing session at a multimedia device that is not configured to receive an access key device.

In a particular embodiment, the multimedia device may receive the requested multimedia timeline data and may display a multimedia timeline GUI at a display device. The user may navigate the multimedia timeline GUI and may select data objects by using a user input device that is coupled to the multimedia device.

Referring to FIG. 1, a particular illustrative embodiment of a system to provide a multimedia timeline is depicted and generally designated 100. The system 100 includes a multimedia device 102 to provide multimedia content to a display device 104. The multimedia device 102 may be coupled to a user input device 106. The multimedia device 102 and a computer 114 are in communication with a network 112 via customer premises equipment (CPE) 110.

Figure 14:
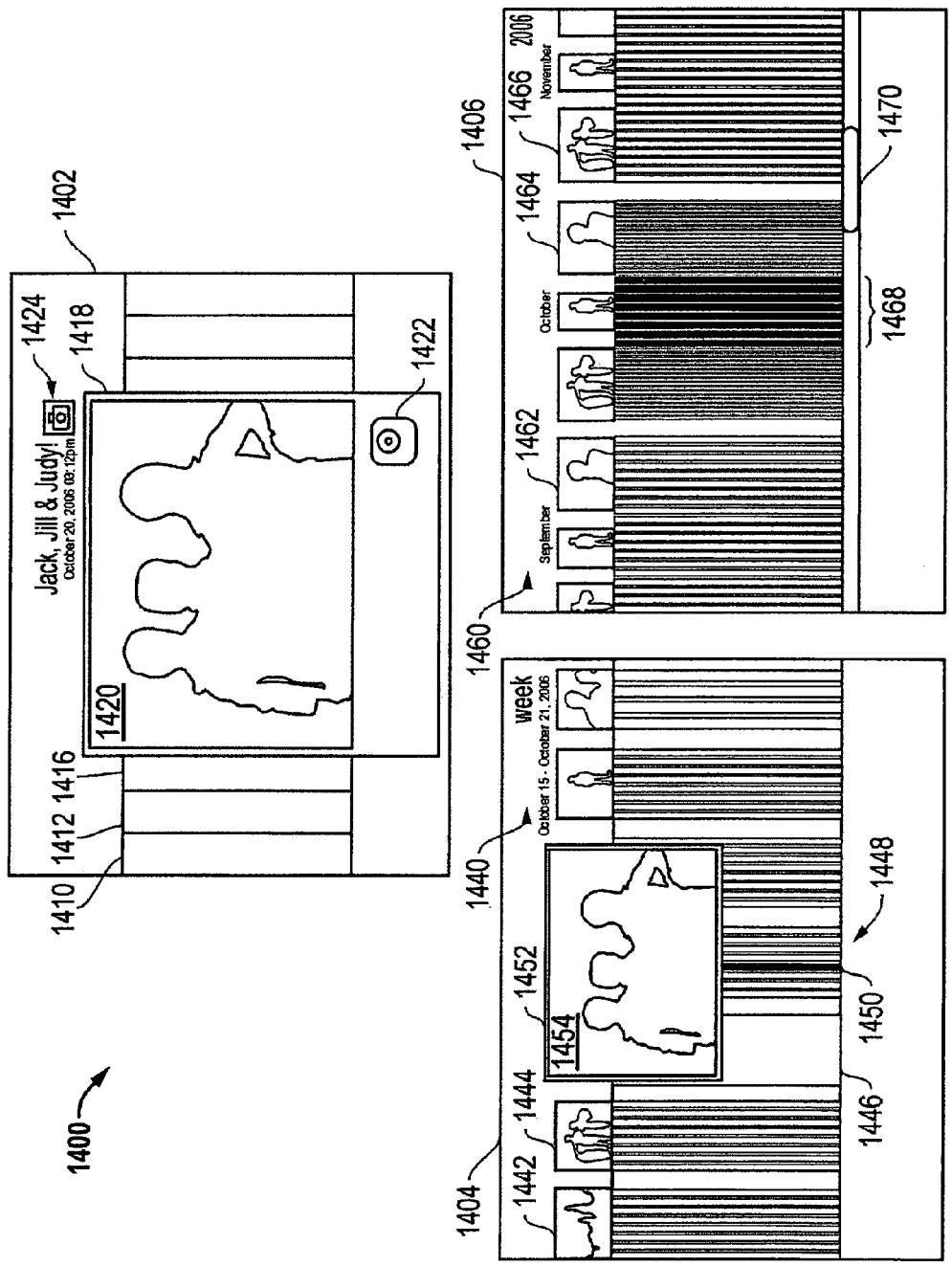
FIG. 14 is a diagram of a particular illustrative embodiment of an interface to display a multimedia timeline.

In a particular embodiment, the multimedia device 102 may send a request for multimedia timeline data, including multimedia data objects associated with a multimedia timeline, metadata relating to the multimedia data objects, and metadata relating to the multimedia timeline. The multimedia timeline data may be received from the network 112 via the CPE 110. The multimedia device 102 may generate a user-friendly graphical user interface (GUI) to provide at least a portion of the multimedia timeline data at the display device 104. An illustrative, non-limiting example of a multimedia timeline GUI is illustrated at FIG. 14.

In a particular embodiment, the multimedia device 102 may have an access key port 150 that may be configured to receive an access key 140. The access key 140 may include a unique or semi-unique identifier corresponding to a particular user and associated with one or more multimedia timelines that are available via the network 112. In a particular embodiment, the multimedia device 102 may send a request via the network 112 to receive data relating to multimedia timelines that are associated with the access key 140. In a specific embodiment, the multimedia device 102 may request the multimedia timeline data automatically upon insertion of the access key device 140 into the access key port 150. In a particular embodiment, the multimedia device 102 may include an indicator to provide an indication that at least one multimedia timeline associated with an access key 140 or a user of the multimedia device 102 has been modified to include multimedia content since a last viewing by the user. As an illustrative, non-limiting example, an illumination device proximate to the key port 150 may visually indicate that unviewed material is available to the user.

In a particular embodiment, the multimedia device 102 may have one or more ports 152 to enable data transfer with an external device (not shown). In a particular embodiment, the port 152 may be a serial port. In a specific embodiment, the port 152 may be a Firewire or Universal Serial Bus (USB) port.

In a particular embodiment, the user input device 106 may enable a user of the system 100 to navigate and to select multimedia objects via a multimedia timeline GUI displayed at the display device 104. The user input device 106 may include a scroll wheel 120 that may function as a date range selector that enables a user to chronologically navigate through a multimedia timeline by rotating the scroll wheel 120 as indicated by directional arrow 122. The scroll wheel 120 may adjust a date range of the multimedia timeline displayed at a multimedia timeline GUI view earlier in time when rotated in a first direction and later in time when rotated in a second direction. The user input device 106 may have a jog wheel 124 that may function as a date range selector that enables a user to zoom in or zoom out at a multimedia timeline GUI view by broadening or narrowing a date range of timeline data displayed at the multimedia timeline GUI view, based on a direction of rotation. At least one indicator 136 may illuminate to indicate the date range or degree of zoom. The user input device 106 also may have a selection control 130, such as a button, that may be actuated by compressing the user input device as indicated by the directional arrow 132. In a particular embodiment, the user input device 106 may also include other controls to enable multimedia timeline operations, such as a menu control 126 and a favorites control 128. In a particular embodiment, the user input device 106 may have a transmitter (not shown) to transmit commands to the multimedia device 102 via a wireless connection 108 in response to an actuation of one or more of the controls 120, 124, 126, 128, and 130.

In a particular embodiment, the computer 114 may enable an upload of data objects and metadata that are associated with a multimedia timeline to a multimedia timeline server (not shown) that may be in communication with the network 112. In a particular embodiment, the computer 114 may generate multimedia data objects, receive multimedia data objects via one or more input devices (not shown), or any combination thereof. In a particular embodiment, the computer 114 may further generate metadata associated with the data objects. In a specific embodiment, metadata associated with a data object may include a date reference, a user identification, a thumbnail representation, a multimedia type description, a data object size, other metadata, or any combination thereof. In a particular embodiment, the computer 114 may automatically prompt a user to generate and send data objects, metadata associated with the data objects, metadata associated with one or more multimedia timelines, or any combination thereof, to a multimedia timeline server (not shown) via the network 112 upon generating or receiving a multimedia data object. In another embodiment, the computer may generate and send data objects, metadata associated with the data objects, metadata associated with a multimedia timeline, or any combination thereof, in response to a user selection of data objects for inclusion into a multimedia timeline.

In a particular embodiment, the CPE 110 include routers, local area network devices, modems, such as digital subscriber line (DSL) modems, any other suitable devices for facilitating communication between the multimedia device 106, the computer 114, and the network 112 or any combination thereof. In a particular embodiment, the CPE 110 may wirelessly communicate with the multimedia device 102. In a specific embodiment, the multimedia device 102 may communicate with the CPE 110 via Institute of Electrical and Electronics Engineers (IEEE) 802.11x standards.

In a particular embodiment, the multimedia device 102, the user input device 106, and the CPE 110 may be dedicated components to facilitate system configuration, communication and display of multimedia timelines. In another embodiment, one or more of the multimedia device 102, the user input device 106 and the CPE 1 10 may be configured to perform functions that are not related to communication and display of multimedia timelines. As an illustrative, non-limiting example, the user input device 106 may be a traditional remote control device configured to control the display device 104.

During operation, in a particular embodiment, a user may populate a multimedia timeline stored at a timeline server (not shown) with multimedia data objects, metadata associated with the data objects, metadata associated with the multimedia timeline, or any combination thereof. In a particular embodiment, the multimedia timeline may be a group of multimedia data objects that have been assembled by one or more users to be displayed via a chronological graphical user timeline interface.

In a particular embodiment, the multimedia timeline may correspond to a life event. In a particular embodiment, the life event may include at least a portion of a person's life. In a particular embodiment, the life event may include a business event. The business event may include a meeting, a presentation, a conference, a project, a career, any other business event, or any combination thereof. In a particular embodiment, the life event may include a social event. The social event may include a religious activity, a performance, a party, a sporting activity, a fraternal organization activity, a recreational activity, a festival, any other social events, or any combination thereof.

In a particular embodiment, at least a portion of the multimedia data objects and metadata of the user's multimedia timeline may be uploaded to a timeline server from the computer 114. In an embodiment, the timeline server may store multimedia data objects and metadata at a data center that stores multimedia timelines, data objects associated with multimedia timelines, metadata associated with multimedia timelines, or any combination thereof. In an embodiment, at least a portion of the multimedia data and metadata associated with the user's multimedia timeline may be uploaded to a timeline server from other network-enabled devices, such as a cellular phone, a PDA, other network devices, or any combination thereof.

In a particular embodiment, a user of the system 100 may begin a multimedia timeline viewing session by inserting the access key device 140 into the multimedia device 102. The multimedia device 102 may authenticate an access key received from the access key device 140 and request multimedia timeline data via the network 112. The requested multimedia timeline data may correspond to one or more multimedia timelines associated with the access key.

In a particular embodiment, the multimedia device 102 may receive multimedia timeline data and display a chronological multimedia timeline GUI at the display device 104. The user may navigate the GUI and may select data objects, metadata, or any combination thereof, with the user input device 106. The multimedia device 106 may respond to wireless commands received from the user input device 106 and may update the GUI displayed at the display device 104 accordingly.

In a particular embodiment, the multimedia device 102 may be integrated with other devices such as a set-top box device, a router, a modem, a display device, any other electronic device, or any combination thereof. In a particular embodiment, the CPE 110, the network 112, the computer 114, or any combination thereof, may be physically located away from the multimedia device 102, the display device 104, the user input device 106, or any combination thereof.

Figure 2:
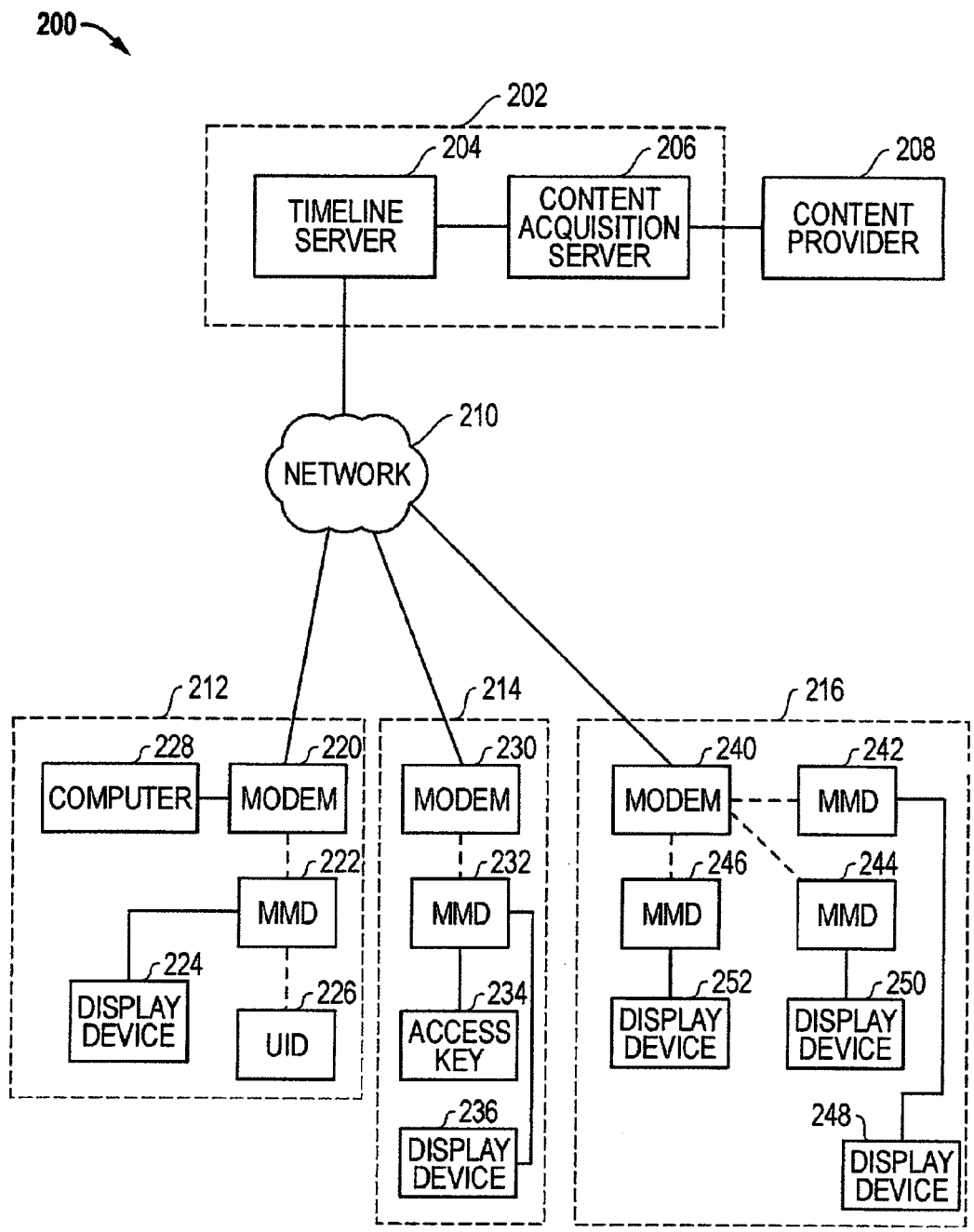
FIG. 2 is a block diagram of another illustrative embodiment of a system to provide a multimedia timeline.

Referring to FIG. 2, another illustrative embodiment of a system to provide a multimedia timeline is depicted and generally designated 200. A timeline system 202 communicates with a first user system 212, a second user system 214 and a third user system 216 via a network 210. The network 210 may be a public network, such as the Internet, a private network, or any combination thereof.

The timeline system 202 may include a timeline server 204. In a particular embodiment, the timeline server 204 may receive and store data associated with multiple multimedia timelines, such as multimedia data objects, metadata relating to multimedia data objects, metadata relating to one or more multimedia timelines, other data associated with one or more multimedia timelines, or any combination thereof. In a particular embodiment, the timeline server 204 may receive requests from one or more of the user systems 212, 214, and 216 for multimedia timeline data via the network 210. The timeline server may provide multimedia timeline data associated with one or more multimedia timelines to a request originator via the network 210.

The timeline system 202 may include a content acquisition server 206. In a particular embodiment, the content acquisition server 206 may receive multimedia content from one or more content providers 208. In a particular embodiment, the content acquisition server 206 may provide multimedia content to the timeline server 204.

In a particular embodiment, the first user system 212 may communicate with the timeline system 202 via the network 210 and first customer premises equipment (CPE), such as a first modem 220. A display device 224 may be coupled to a first multimedia device 222 to display a multimedia timeline graphical user interface (GUI) and to display or otherwise provide multimedia data associated with one or more multimedia timelines. A user input device 226 may be wirelessly coupled to the first multimedia device 222 to generate user navigation and selection commands for a multimedia timeline GUI. A computer 228 may be coupled to the modem 220 to facilitate sending multimedia data objects, metadata associated with the data objects, metadata associated with one or more multimedia timelines, or any combination thereof, to the timeline server 204. In a particular embodiment, the first user system 212 may represent a system configured to provide multimedia timeline sessions for a first user or family, such as in a first house or apartment unit.

In a particular embodiment, the second user system 214 may communicate with the timeline system 202 via the network 210 and second customer premises equipment (CPE), such as a second modem 230. In a particular embodiment, the second modem 230 may be wirelessly coupled to a second multimedia device 232. A second display device 236 may be coupled to the second multimedia device 232. A representative access key device 234 may be coupled to the second multimedia device 232 to indicate or identify one or more users or multimedia timelines associated with the access key device 234. In a particular embodiment, the second user system 214 may also represent a system configured to provide multimedia timeline sessions for a second user or family, such as in a second house or apartment unit.

In a particular embodiment, the third user system 216 may communicate with the timeline system 202 via the network 210 and third customer premises equipment (CPE), such as a third modem 240. In a particular embodiment, the third modem 240 may be wirelessly coupled to a third multimedia device 242, a fourth multimedia device 244, and fifth multimedia device 246. A third display device 248 may be coupled to the third multimedia device 242. A fourth display device 250 may be coupled to the fourth multimedia device 244. A fifth display device 252 may be coupled to the fifth multimedia device 246. In a particular embodiment, the third user system 216 may represent a system configured to provide multimedia timeline sessions for multiple users, such as in a library, a coffee house, a dormitory, office, hotel, apartment complex, or other community location.

During operation, in a particular embodiment, a user may send multimedia data objects to be associated with one or more particular multimedia timelines to the timeline server 204 from the computer 228. The timeline server 204 may receive the multimedia data objects and update the one or more particular multimedia timelines to include or to link to the received multimedia data objects. A user may engage in a multimedia timeline viewing session at any of the user systems 212, 214, or 216, by coupling the access key device 234 to any of the multimedia devices 222, 232, 242, 244, or 246. A multimedia device 222, 232, 242, 244, or 246 receiving the access key device 234 may receive one or more access keys from the access key device 234 to authenticate the user and request multimedia timeline data from the timeline server 204.

Although only a single timeline system 202 having a single timeline server 204 is depicted, it should be understood that in other embodiments, one or more timeline systems 202 may each include one or more timeline servers 204. In a particular embodiment, the timeline system 202 may include an authentication server that receives authentication information from one or more multimedia devices and sends a verification of the authentication information to the one or more multimedia devices providing the authentication information, the timeline server, or any combination thereof. The authentication server may be part of a timeline server, a separate server, or any combination thereof. In addition, it should be understood that the user systems 212, 214, and 216 may be representative of any number of systems capable of providing one or more multimedia timeline sessions to users by requesting and receiving multimedia timeline data from one or more timeline servers 204.

Figure 3:
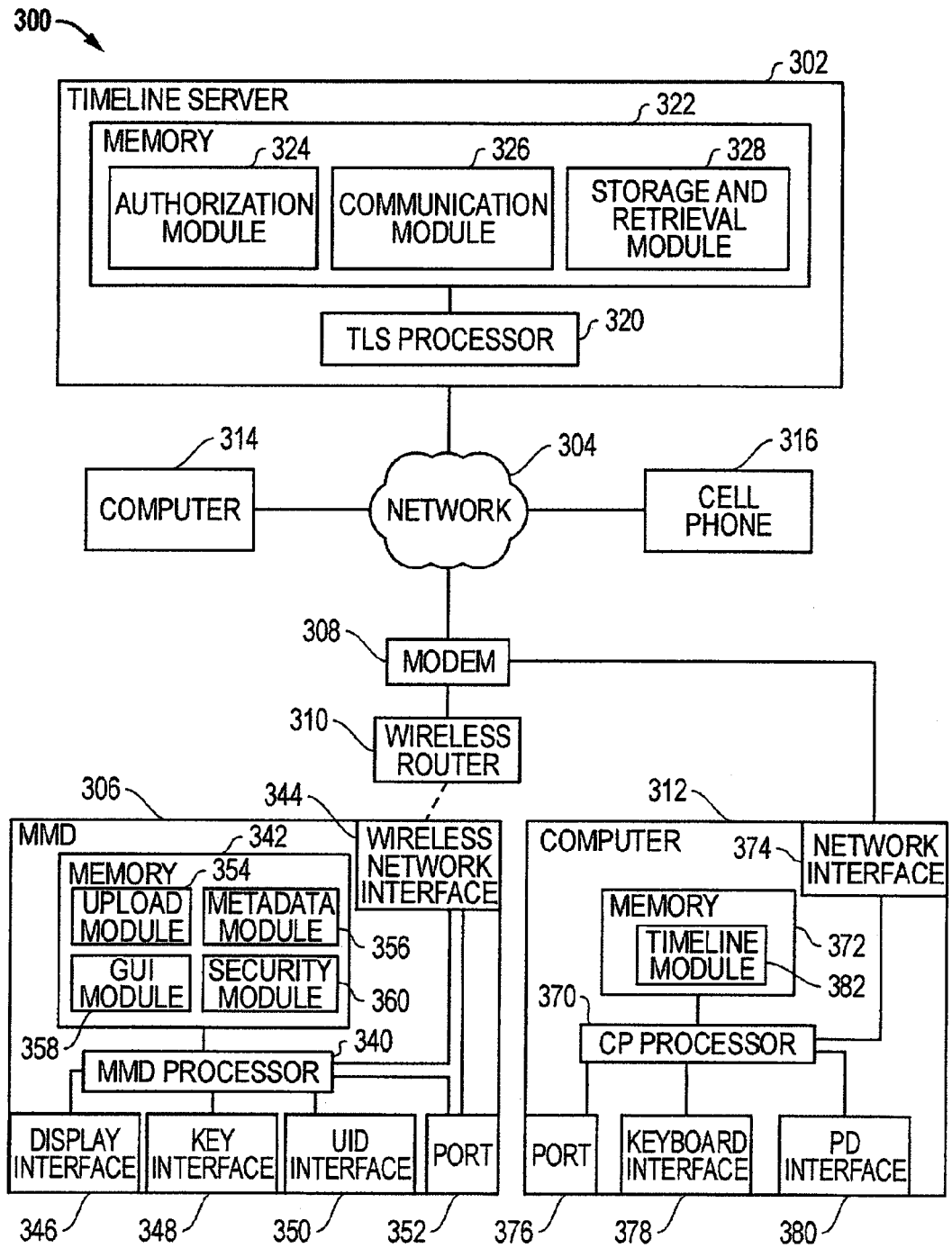
FIG. 3 is a block diagram of another illustrative embodiment of a system to provide a multimedia timeline.

Referring to FIG. 3, another illustrative embodiment of a system to provide a multimedia timeline is depicted and generally designated 300. A timeline server 302 communicates with a multimedia device 306, a first computer 312, a second computer 314, and a network-capable device, such as a cell phone 316, via a network 304. The first computer 312 may be coupled to the network 304 via a modem 308. The multimedia device 306 may be coupled to the network 304 via wireless communication with a wireless router 310 that may be coupled to the modem 308. In a particular embodiment, the wireless router 310 and the modem 308 may be integrated into a single customer premises equipment (CPE). The network 304 may be a public network, such as the Internet, a private network, or any combination thereof.

The timeline server 302 may include a timeline server (TLS) processor 320 and a memory 322. The memory 322 may include an authorization module 324, a communication module 326, and a storage and retrieval module 328.

In a particular embodiment, the authorization module 324 may be executable by the TLS processor 320 to receive authentication information corresponding to one or more users requesting access to one or more multimedia timelines. The authorization module 324 may also be executable by the TLS processor 320 to determine an authority of an authenticated user to access one or more requested multimedia timelines. In a particular embodiment, the authorization module 324 may be executable by the TLS processor 320 to enforce one or more multi-tier security policies corresponding to the requested multimedia timelines. In a particular embodiment, the authorization module 324 may be executable by the TLS processor 320 to generate one or more security challenges and to determine access to a requested multimedia timeline based on a received response to the security challenge.

In a particular embodiment, the communication module 326 may be executable by the TLS processor 320 to send and receive data via the network 304. In a particular embodiment, the communication module 326 may be executable by the TLS processor 320 to receive multimedia data objects and metadata associated with data objects from one or more devices 306, 312, 314, or 316 via the network 304 for inclusion into one or more multimedia timelines. In a particular embodiment, the communication module 326 may be executable by the TLS processor 320 to send multimedia timeline data, including timeline metadata, multimedia data object metadata, multimedia data objects, or any combination thereof, to one or more requesting devices 306, 312, 314, or 316 via the network 304.

In a particular embodiment, the storage and retrieval module 328 may be executable by the TLS processor 320 to receive and store multimedia data associated with one or more designated multimedia timelines. In a particular embodiment, the storage and retrieval module 328 may be executable by the TLS processor 320 to store multimedia timeline data in association with a designated timeline based on a chronological order. In a particular embodiment, the storage and retrievable module 328 may be executable by the TLS processor 320 to retrieve multimedia timeline data, including timeline metadata, multimedia data object metadata, multimedia data objects, or any combination thereof, to provide to an authorized requesting device.

In a particular embodiment, multimedia timeline data may include a data structure representative of a timeline and including a data structure identification and one or more metadata elements. The metadata elements may include pointers or other references to one or more data objects associated with the multimedia timeline. In a particular embodiment, the data structure may include a chronologically ordered group of metadata to enable chronological navigation of associated data objects in a timeline format at via a graphical user interface.

In a particular embodiment, the storage and retrieval module 328 may be executable by the TLS processor 320 to receive a data object, metadata including a pointer or other reference to a data object, or any combination thereof, for addition to a designated multimedia timeline that has an associated data structure at the timeline server 302. The storage and retrieval module 328 may be executable by the TLS processor 320 to determine a date reference associated with the data object or metadata. The storage and retrieval module 328 may be executable by the TLS processor 320 to determine a position within a chronologically ordered group of metadata associated with the designated multimedia timeline based on the date reference. The storage and retrieval module 328 may be executable by the TLS processor 320 to add metadata, including a pointer or other reference to the data object, at the determined position. Similarly, in a particular embodiment, the storage and retrieval module 328 may be executable by the TLS processor 320 to receive and store one or more annotations associated with one or more data objects by directly attaching the annotation to the associated data object, by indirectly attaching the annotation to the associated data object via a link or pointer, or any combination thereof.

The multimedia device 306 may include a multimedia device (MMD) processor 340 and a memory 342 that may be accessible to the MMD processor 340. A wireless network interface 344 may be coupled to the MMD processor 340 to enable wireless communication with the wireless router 310. A display interface 346 may be coupled to MMD processor 340 to provide audio and video information to a display device (not shown). A key interface 348 may be coupled to the MMD processor 340 to enable user authentication with the multimedia device 306 via an access key provided by an access key device (not shown). A user input device (UID) interface 350 may be coupled to the MMD processor 340 to receive commands from a user input device (not shown). A data port 352 may be coupled to the MMD processor 340 to enable data transfer between an external data storage device (not shown) and the multimedia device 306.

In a particular embodiment, an upload module 354 may executable by the MMD processor 340 to receive data via the data port 352. In a particular embodiment, the upload module 354 may be executable by the MMD processor 340 to receive multimedia data objects, such as text documents, email documents. image files, audio files, video files, any other type of multimedia data, or any combination thereof. In a particular embodiment, the upload module 354 may executable by the MMD processor 340 to send data objects, metadata associated with data objects, other data, or any combination thereof, to the timeline server 302.

In a particular embodiment, a metadata module 356 may be executable by the MMD processor 340 to generate metadata associated with a multimedia data object received via the data port 352. In a particular embodiment, the generated metadata may include information such as a user identification, a timeline identification, a date of creation of the multimedia data object, a date of uploading the multimedia data, a user-specified date reference, other information associated with a multimedia timeline, other information associated with a user, other information associated with a data object, or any combination thereof.

In a particular embodiment, a graphical user interface (GUI) module 358 may be executable by the MMD processor 340 to display data associated with a multimedia timeline at a display device (not shown) coupled to the display interface 346. In a particular embodiment, the GUI module 358 may be executable by the MMD processor 340 to process navigation and selection commands that are received via the user input device interface 350.

In a particular embodiment, a security module 360 may be executable by the MMD processor 340 to receive security information and to determine an authorization to access one or more multimedia timelines. In a particular embodiment, the security module 360 may be executable by the MMD processor 340 to receive data acquired via the key interface 348. In another embodiment, the security module 360 may be executable by MMD processor 340 to send data to the GUI module 358 to provide a security interface at a display device. The security module 360 may receive and process information corresponding to navigation and selection of the security interface.

The first computer 312 may include a computer (CP) processor 370 and a memory 372 that may be accessible to the CP processor 370. A network interface 374 enables data communication with the modem 308. A data port 376 may enable data transfer with one or more external data storage devices (not shown), such as a digital camera, a MP3 player, a cell phone, a personal digital assistant (PDA), other devices that store multimedia data, or any combination thereof. The computer 312 can receive user input data via a keyboard interface 378 and a pointing device (PD) interface 380.

In a particular embodiment, a timeline module 382 may be executable by the CP processor 370 to facilitate data operations associated with one or more multimedia timelines. In a particular embodiment, the timeline module 382 may be executable by the CP processor 370 to generate metadata associated one or more multimedia data objects. In a specific embodiment, the multimedia data objects may be received via the data port 376, the network interface 308, other data input interfaces, or any combination thereof. In a specific embodiment, the multimedia data objects may be generated at the first computer 312, such as via a word processor, an email editor, a digital image editor, other multimedia applications, or any combination thereof.

In a particular embodiment, the timeline module 382 may be executable by the CP processor 370 to provide a user interface that enables a user to associate data objects to one or more multimedia timelines by performing a drag-and-drop operation of data objects to a designated target, such as a multimedia timeline icon, folder, or other target.

In a particular embodiment, the timeline module 382 may be executable by the CP processor 370 to inventory at least a portion of the memory 372 or other memory accessible to the computer 312 and to compile at least one list of available multimedia data, including text documents, email documents, image files, audio files, video files, any other type of multimedia data, or any combination thereof. In a particular embodiment, the timeline module 382 may be executable by the CP processor 370 to prompt a user of the computer 312 for a selection of multimedia content to be included in a multimedia timeline. In a particular embodiment, the timeline module 382 may be executable by the CP processor 370 to receive a selection of one or more multimedia data objects and to generate metadata associated with the selected data objects. In a particular embodiment, the selected multimedia data objects may be representative of or associated with an event, such as a time period between a user-specified beginning date and ending date, and may be representative of at least a portion of a person's life.

In a particular embodiment, the timeline module 382 may be executable by the CP processor 370 to automatically add one or more types of data objects and corresponding metadata to a locally stored data structure associated with a multimedia timeline without receiving a user input when the data objects are received at the first computer 312. In a particular embodiment, the timeline module 382 may be executable by the CP processor 370 to receive one or more multimedia data type preferences for one or more designated multimedia timelines so that data objects corresponding to the data type preferences are automatically associated with the designated multimedia timelines when received at the first computer 312.

In a particular embodiment, the timeline module 382 may be executable by the CP processor 370 to receive one or more date references associated with one or more data objects via a user interface. In a particular embodiment, the timeline module 382 may be executable by the CP processor 370 to receive one or more annotations associated with one or more data objects. In a particular embodiment, an annotation may include text, audio data, video data, multiple types of data, or any combination thereof.

In a particular embodiment, the timeline module 382 may be executable by the CP processor 370 to generate metadata associated with one or more multimedia timelines. In a particular embodiment, the timeline metadata may include a user identification, a timeline identification, security information such as authentication information or authorization information, other information associated with a multimedia timeline, other information associated with a user, or any combination thereof. In a particular embodiment, the timeline metadata may include one or more pointers, references, identifiers, or any combination thereof, indicating one or more data objects, metadata associated with one or more data objects, thumbnails, or any combination thereof. In a particular embodiment, the timeline metadata may be stored in a chronological order according to a date reference.

In a particular embodiment, the timeline module 382 may be executable by the CP processor 370 to send multimedia timeline data, such as multimedia data objects, metadata associated with one or more data objects, timeline metadata, or any combination thereof, to the timeline server 302 via the network 304. In a particular embodiment, the timeline module 382 may be executable by the CP processor 370 to send multimedia timeline data as one or more data objects and a chronologically ordered group of metadata including pointers to the data objects. In a particular embodiment, the timeline module 382 may be executable by the CP processor 370 to provide a security mechanism to enable only an authorized user of a particular timeline to add data to the particular multimedia timeline, such as data objects, metadata, annotations, other data, or any combination thereof.

During operation, multimedia data objects and metadata associated with the multimedia data objects may be sent to the timeline server 302 from the first computer 312. In a particular embodiment, at least a portion of a memory accessible to the first computer 312 may be inventoried for available multimedia content. In a specific embodiment, the memory may be inventoried for only selected multimedia data types. In a specific embodiment, the memory may be inventoried for all available multimedia data independent of data type.

In a particular embodiment, inventoried memory may include memory available via one or more hard drives of the first computer 312 or other computers, network devices, digital video recorder (DVR) storage devices, memory devices of external digital devices such as digital cameras, personal digital assistants (PDAs), mobile phones, audio players or recording devices, video players or recording devices, other digital storage devices, or any combination thereof. A selectable list of located multimedia data objects may be displayed to a user of the first computer 312, and selected multimedia data objects, metadata associated with the data objects, timeline metadata, or any combination thereof, may be sent to the timeline server 302 for inclusion in one or more multimedia timelines.

In a particular embodiment, multimedia data objects may also be sent to the timeline server 302 for inclusion in one or more multimedia timelines from other sources, such as the multimedia device 306, the second computer 314, the cell phone 316, other multimedia sources, or any combination thereof.

In a particular embodiment, the timeline server 302 can receive the multimedia data objects, the metadata associated with the data objects, timeline metadata, or any combination thereof, via the network 304. The timeline server 302 can determine an authority of a device or user to upload multimedia data to be associated with a particular multimedia timeline. The timeline server 302 may then format and store the received data so that the received data may be associated with one or more authorized multimedia timelines and may be retrievable for display to as user in a chronological sequence.

In a particular embodiment, a user may request to view a multimedia timeline via the multimedia device 306 by inserting an access key device (not shown) at the key interface 348. An access key that is received from the access key device may be authenticated by the multimedia device 306 and a request for one or more multimedia timelines associated with the access key may be communicated to the timeline server 302. Upon receiving the request for multimedia timeline data, the timeline server 302 may determine an authority of the requestor to receive the timeline data. After authorization, the timeline server 302 may provide data associated with the one or more requested multimedia timelines to the multimedia device 306 via the network 304.

In a particular embodiment, the multimedia device 306 may display a graphical user interface (GUI) indicating at least a portion of the received multimedia timeline data at display device (not shown). The GUI may include a chronological display of indicators that indicate individual multimedia data objects associated with a multimedia timeline. The multimedia device 306 may receive navigation and selection commands from a user input device and may provide selected data objects to a user via the display interface 346.

In a particular embodiment, the multimedia timeline data may also be received and displayed at devices other than the multimedia device 306 that are capable of providing authentication information of a user and of displaying the multimedia data associated with the multimedia timeline. For example, the first computer 312, the second computer 314, and the cell phone 316 may be capable of requesting, receiving, and displaying multimedia data associated with one or more multimedia timelines.

Figure 4:
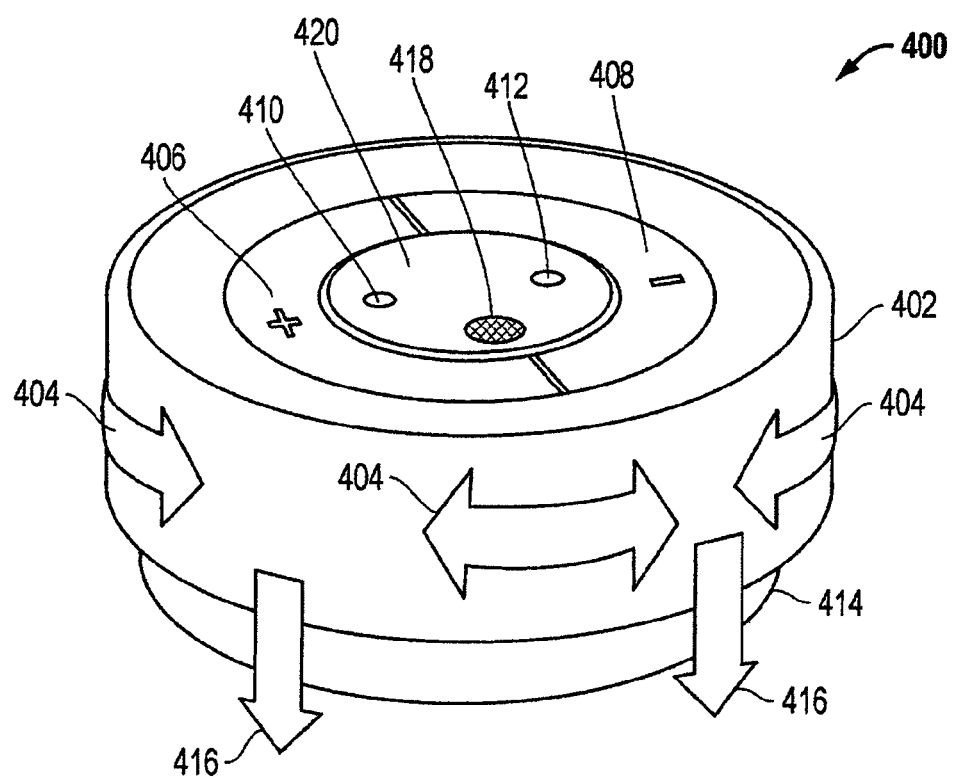
FIG. 4 is a diagram of a particular illustrative embodiment of a device that may be used to interact with a multimedia timeline user interface.

Referring to FIG. 4, a particular illustrative embodiment of a device that may be used to interact with a multimedia timeline user interface is depicted and generally designated 400. In a particular embodiment, the user input device 400 may be configured for dedicated use with a multimedia timeline system. In a particular embodiment, the user input device 400 may be dimensioned and configured for hand-held use. In a particular embodiment, the user input device 400 may communicate with a multimedia device, such as the multimedia device 102 of FIG. 1, via wireless radio frequency transmissions. In a specific embodiment, the user input device 400 may communicate with a multimedia device via at least one of Bluetooth communication protocol transmissions, infrared transmissions, and radio frequency transmissions.

In a particular embodiment, the user input device 400 may include contacts (not shown) to receive a battery (not shown), such as a rechargeable battery. In a particular embodiment, the user input device 400 may be configured to enable charging of the battery via inductive charging. The user input device 400 may include a visual indicator (not shown) to indicate battery power.

The user input device 400 includes an external scroll wheel 402 that may rotate relative to the body of the user input device 400, as indicated by the first directional indicators 404. In a particular embodiment, a rotation of the first directional indicator may cause the user input device 400 to wirelessly transmit an instruction to a multimedia device to chronologically navigate a multimedia timeline graphical user interface (GUI). In a particular embodiment, the scroll wheel 402 may transmit an instruction to adjust a date range of a multimedia timeline displayed at a GUI earlier in time when rotated in a first direction and to adjust the date range later in time when rotated in a second direction. In a particular embodiment, the user input device 420 may include other controls, such as buttons (not shown), to adjust the date range earlier in time and later in time.

The user input device 400 may include a zoom-in control 406 and a zoom-out control 408. In a particular embodiment, the zoom-in control 406 may be actuated to cause the user input device 400 to wirelessly transmit a wireless instruction to a multimedia device to provide an enhanced view of a selected multimedia timeline data object. In a particular embodiment, the zoom-out control 408 may be actuated to cause the user input device 400 to wirelessly transmit an instruction to provide a reduced view of a selected multimedia timeline data object. In a particular embodiment, the zoom-in control 406 may be a button to narrow a date range displayed at a multimedia timeline GUI, and the zoom-out control 408 may be a button to broaden a date displayed at the multimedia timeline GUI.

The user input device 400 may also include a first control 410. In a particular embodiment, the first control 410 may be a "menu" control that may be actuated to cause the user input device 400 to wirelessly transmit an instruction to display one or more menu options associated with a multimedia timeline.

The user input device 400 may include a second control 412. In a particular embodiment, the second control 412 may be a "favorites" control that may be actuated to cause the user input device 400 to wirelessly transmit an instruction to display one or more user-defined lists or selections of multimedia objects of a multimedia timeline.

The user input device 400 may include a select control 414. In an alternative embodiment, the user input device 400 may include a select control 420 that may be a button positioned on a top surface of the user input device 400. In a particular embodiment, an actuation of the select control 414 or 420 may cause the user input device 400 to wirelessly transmit an instruction indicating a selection of one or more selectable components of a multimedia timeline GUI. In a specific embodiment, the select control 414 may be actuated by vertically compressing the user input device 400, as indicated by the second directional indicators 416.

The user input device 400 may include a microphone 418 to capture and store audio information. In a particular embodiment, the user input device 400 may include a memory (not shown) and a controller (not shown) to enable audio information received via the microphone 418 to be wirelessly transmitted to a multimedia device for storage and upload to a multimedia timeline server. In a specific embodiment, the microphone 418 may be operable to receive and transmit audio annotations by a user to be associated with one or more multimedia data objects of a multimedia timeline selected or displayed at a multimedia timeline GUI when the annotation is received. In a particular embodiment, an annotation may be designated to relate to a portion of a timeline. As a illustrative, non-limiting example, the annotation may relate to a particular time period, such as a second, a minute, an hour, a day, a week, a month, a year, a decade, a century, a millennium, or any combination thereof.

In a particular embodiment, the user input device 400 may include a data port (not shown) to enable data transfer with external devices. In a particular embodiment, multimedia files may be received at the data port, stored in the memory of the user input device 400, and transmitted to a multimedia device to add to a multimedia timeline. In a particular embodiment, the data port may be any type of current of future data port, capable of supporting one or more communication protocols, including but not limited to Universal Serial Bus (USB), Firewire, Bluetooth, and IEEE 802.11x.

Figure 5:
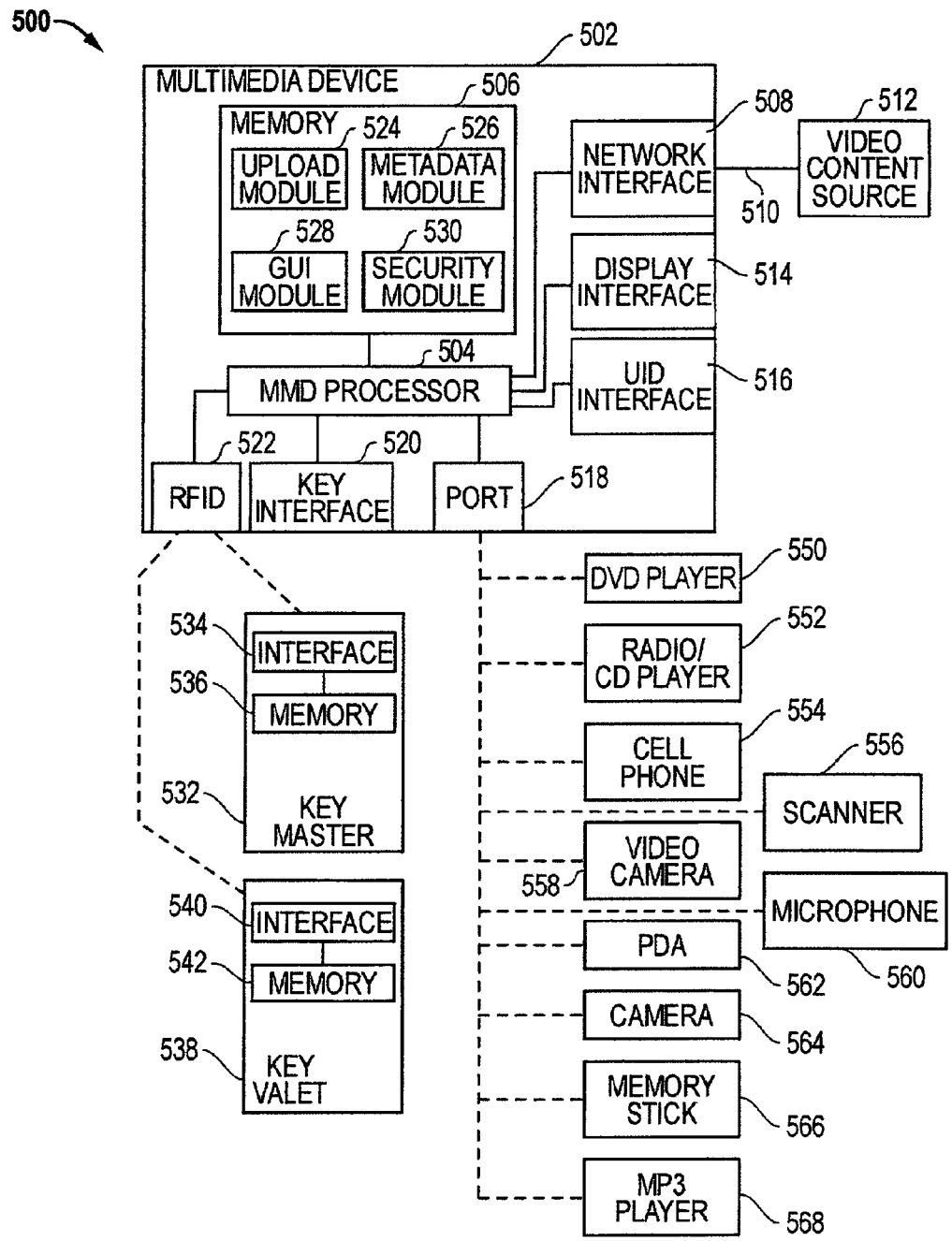
FIG. 5 is a block diagram of a particular illustrative embodiment of a system to access a multimedia timeline.

Referring to FIG. 5, a particular illustrative embodiment of a system to access a multimedia timeline is depicted and generally designated 500. A multimedia device 502 may be coupled to a video content source 512. The multimedia device 502 may be further coupled to a key device master 532. The multimedia device 502 may also be coupled to a key device valet 538. The multimedia device 502 may be further coupled to one or more multimedia data devices, including a digital video disc (DVD) player 550, a radio/compact disc (CD) player 552, a cell phone 554, a scanner 556, a video camera 558, a microphone 560, a personal digital assistant (PDA) 562, a camera 564, a memory stick 566, and a Moving Picture Experts Group Audio Layer 3 (MP3) player 568.

The multimedia device 502 may include a multimedia device (MMD) processor 504 and a memory 506 that may be accessible to the MMD processor 504. The MMD processor 504 may be coupled to a network interface 508 for communication with a video content source 512 via a network 510. The MMD processor 504 may be coupled to a display interface 514 to provide video and audio content to a display device (not shown). The MMD processor 504 may be coupled to a user input device (UID) interface 516 receive commands from a user input device (not shown). The MMD processor 504 may be coupled to a port 518 to receive data from one or more external multimedia data sources, such as the representative multimedia data sources 550-568. The MMD processor 504 may be coupled to a key interface 520 to receive information from one or more key devices 532 and 538. In a particular embodiment, the key interface 520 may include a digital signal interface, a physical interface, a wireless interface, or any combination thereof. In a particular embodiment, a RFID interface 522 may enable wireless radio frequency communication with one or more key devices 532 and 538.

In a particular embodiment, an upload module 524 may be executable by the MMD processor 504 to receive multimedia data via the port 518 and to communicate the multimedia data to a multimedia timeline server (not shown). In a particular embodiment, a metadata module 526 may be executable by the MMD processor 504 to generate and associate metadata with one or more received multimedia data objects. In a particular embodiment, a graphical user interface (GUI) module 528 may be executable by the MMD processor 504 to receive data associated with a multimedia timeline and to provide a graphical user interface for a multimedia timeline at one or more display devices via the display interface 514. In addition, in a particular embodiment, the GUI module 528 may be executable via the MMD processor 504 to be responsive to navigation and selection commands received via the user input device interface 516. In a particular embodiment, a security module 530 may be executable by the MMD processor 504 to receive user identification information, to authenticate one or more users based on the user information, and to provide one or more levels of access to a multimedia timeline based on the user and the authentication information, in conjunction with one or more security policies established for the multimedia timeline.

In a particular embodiment, the key device master 532 may include a housing (not shown) that contains a first interface 534 coupled to a first memory 536. In a particular embodiment, the first interface 534, the first memory 536, or any combination thereof, may provide an access key that may include user identification and authentication information to the multimedia device 502. In a particular embodiment, the key device valet 538 may include a second interface 540 coupled to a second memory 542. In a particular embodiment, the second interface 540, the second memory 542, or any combination thereof, may provide an access key that may include user identification and authentication information to the multimedia device 502.

In a particular embodiment, the interfaces 532 and 540 may include one or more active transceivers, one or more passive radio frequency reception and resonance components, or any combination thereof. In a particular embodiment, the interfaces 532 and 540 may include a RFID interface, a wireless USB interface, a Bluetooth interface, an 802.11x interface, any other type of interface, or any combination thereof. In a specific embodiment, the key interface 520 may include one or more apertures defined by a housing of the multimedia device 502, and the key device master 532 and key device valet 538 may be configured to be insertable into the key interface 520.

In a particular embodiment, one or both of the key devices 532 and 538 may include a data port (not shown) coupled to the respective interfaces 532 and 540 to enable data exchange at the key interface 520. In a particular embodiment, the data port may include any present or future type of data port. In a particular embodiment, the key device master 532 may include an identification of one or more multimedia timelines to which a user associated with the key device master 532 may have a managerial level of access, and the key device valet 538 may include an identification of one or more multimedia timelines to which the key device valet holder may have a reduced level of viewing access, editing access, or any combination thereof.

In a particular embodiment, one or more of the access key devices 532 and 538 may include one or more biometric sensors (not shown) to enable identification of a user via biometric data. In a particular embodiment, the biometric data may include biometric data based on a fingerprint, a deoxyribo nucleic acid (DNA), an eye retina, an eye iris, a facial pattern, a hand geometry, a voice, a facial thermogram, a signature, a hand vein, a keystroke dynamics, any other biometric data, or any combination thereof.

In a particular embodiment, the multimedia device 502 may provide full access to upload, edit, and view all multimedia data objects corresponding to a multimedia timeline that may be associated with the key device master 532 when the key device master 532 is coupled to the key interface 520. The multimedia device 502 may restrict an upload, an editing, or a viewing access to one or more multimedia data objects associated with the same multimedia timeline when the key device valet 538 is coupled to the key interface 520. Thus, in a specific embodiment, the key device master 532 may be used to create and edit a multimedia timeline, and one or more key device valets 538 may be used to provide restricted access to view only designated portions of the multimedia timeline.

In a particular embodiment, a user may distribute one or more key devices to enable members of a group to access one or more multimedia timelines. In a particular embodiment, the multimedia timeline may have a multi-tiered security system and the key devices may provide each particular group member with an appropriate level of access to the multimedia timeline for the particular group member. As an illustrative, non-limiting example, a first group member may have unrestricted access to the multimedia timeline while a second group member may have a restricted access to the multimedia timeline. In a particular embodiment, the group may be a family.

Figure 6:
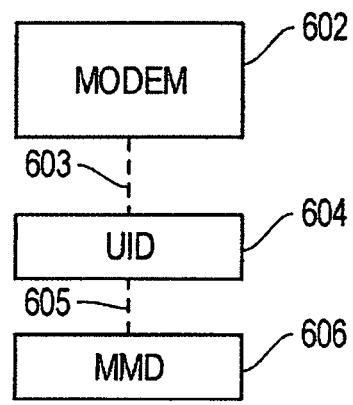
FIG. 6 is a block diagram of another illustrative embodiment of a system to access a multimedia timeline.

Referring to FIG. 6, another illustrative embodiment of a system to access a multimedia timeline is depicted and generally designated 600. A modem 602 may be wirelessly coupled to a user input device (UID) 604. The user input device 604 may be wirelessly coupled a multimedia device (MMD) 606.

In a particular embodiment the modem 602 may be coupled to the user input device 604 via a first wireless network 603. In a particular embodiment, the first wireless network 603 may be an IEEE 802.11x network. In a particular embodiment, the user input device 604 may be coupled to the multimedia device 606 via a second wireless network 605. In a particular embodiment, the second wireless network 605 may be a Bluetooth network 605.

Figure 7:
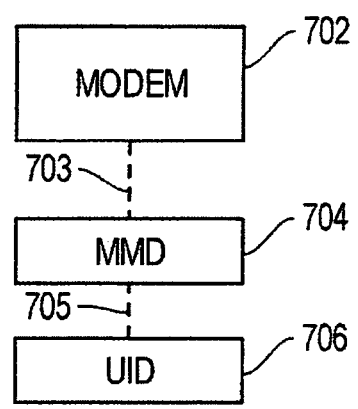
FIG. 7 is a block diagram of another illustrative embodiment of a system to access a multimedia timeline.

Referring to FIG. 7, another illustrative embodiment of a system to access a multimedia timeline is depicted and generally designated 700. A modem 702 may be wirelessly coupled to a multimedia device (MMD) 704. The multimedia device 704 may be wirelessly coupled to a user input device (UID) 706.

In a particular embodiment, the modem 702 may be coupled to the multimedia device 704 via a first wireless network 703. In a specific embodiment, the first wireless network 703 may be an 802.11x wireless network. In a particular embodiment, the multimedia device 704 may be coupled to the user input device 706 via a second wireless network 705. In a particular embodiment, the second wireless network 705 may be a Bluetooth network.

Figure 8:
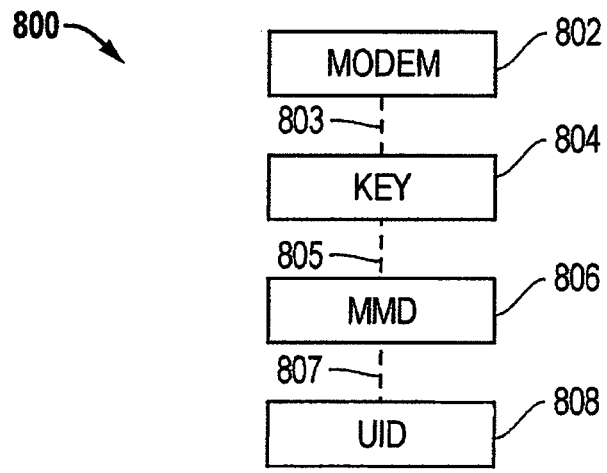
FIG. 8 is a block diagram of another illustrative embodiment of a system to access a multimedia timeline.

Referring to FIG. 8, another illustrative embodiment of a system to access a multimedia timeline is depicted and generally designated 800. A modem 802 may be wirelessly coupled to a key device 804. The key device 804 may be coupled to a multimedia device (M MD) 806. The multimedia device may be wirelessly coupled to a user input device (UID) 808. In a specific embodiment, the key device 804 may be a key device master. In another specific embodiment, the key device 804 may be a key device valet.

In a particular embodiment, the modem 802 may wirelessly coupled to the key device 804 via a first wireless network 803. In a particular embodiment, the key device 804 may be physically coupled to the multimedia device 806 via a connection 805. In a particular embodiment, the user input device 808 may be wirelessly coupled to the key device 804 via a second wireless network 807.

Figure 9:
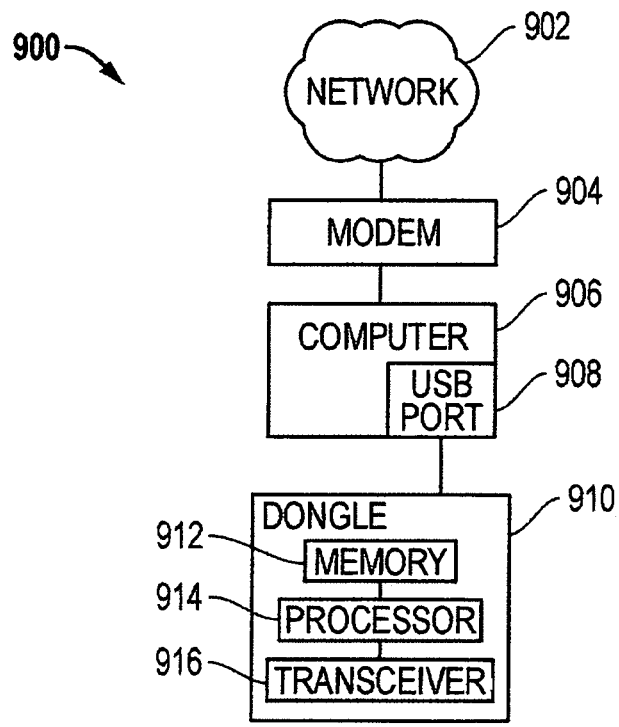
FIG. 9 is a block diagram of another illustrative embodiment of a system to access a multimedia timeline.

Referring to FIG. 9, another illustrative embodiment of a system to access a multimedia timeline is depicted and generally designated 900. A computer 906 communicates with a network 902 via a modem 904. A dongle 910 may be coupled to the computer 906 via a Universal Serial Bus (USB) port 908.

In a particular embodiment, the dongle 910 may include a memory 912, a processor 914, and a transceiver 916. In a particular embodiment, the dongle 910 can wirelessly communicate with a multimedia device (not shown) to provide access for the multimedia device to the network 902 via the computer 906 and the modem 904. In a particular embodiment, the dongle 910 may provide wireless access to only one or more designated multimedia devices, and may restrict wireless access to all non-designated devices. In a specific embodiment, the dongle 910 may provide a dedicated wireless access point for a single designated multimedia device to send and receive multimedia timeline data via the network 902.

Figure 10:
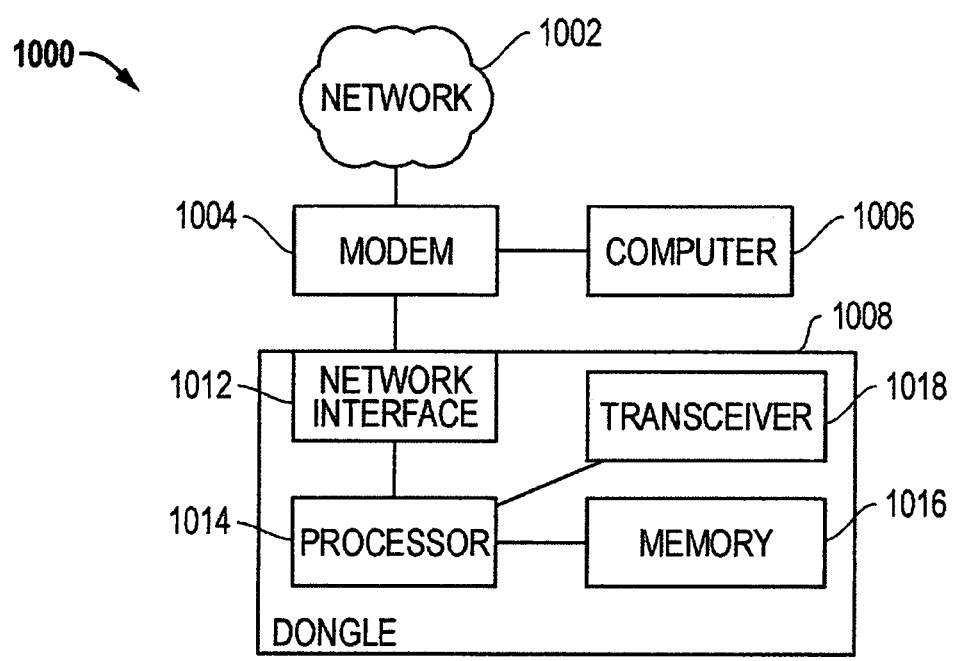
FIG. 10 is a block diagram of a particular illustrative embodiment of a system to wirelessly communicate multimedia timeline data.

Referring to FIG. 10, a particular illustrative embodiment of a system to wirelessly communicate multimedia timeline data is depicted and generally designated 1000. A personal computer 1006 and a dongle 1008 are in communication with a network 1002 via a modem 1004. The dongle 1008 may be coupled to the modem 1004 via a connector 1020 to a network interface 1012. The dongle 1008 may include a processor 1014, a memory 1016, and a transceiver 1018.

In a particular embodiment, the dongle 1008 can wirelessly communicate with a multimedia device (not shown) to provide access for the multimedia device to the network 1002 via the modem 1004. In a particular embodiment, the connector 1020 may enable communications without using the personal computer 1006 via a direct connection to the modem 1004, an access point (not shown), a gateway (not shown), a router (not shown), a switch (not shown), or any combination thereof. In a particular embodiment, the dongle 1008 may be preconfigured to establish a wireless network that is exclusive to one or more authorized multimedia devices and to directly connect via the connector 1020 without requiring a software installation or settings configured by a user.

In a particular embodiment, the dongle 1008 may provide wireless access to only one or more designated multimedia devices, and may restrict wireless access to all non-designated devices. In a specific embodiment, the dongle 1008 may provide a dedicated wireless access point for a single designated multimedia device to send and receive multimedia timeline data via the network 1002. In a particular embodiment, the dongle 1008 may include an indicator (not shown) that identifies one or more designated multimedia devices as authorized devices. In a particular embodiment, the identifier may be hardwired to the processor 1014.

In a particular embodiment, the dongle 1008 may provide a wireless network to communicate data associated with a multimedia timeline between a one or more multimedia devices and the network 1002. In a particular embodiment, the wireless network may enable IEEE 802.11x protocol communication via the wireless transceiver 1018. In a particular embodiment, the dongle 1008 may receive requests from a multimedia device and send the requests to a timeline server (not shown) coupled to the network 1002. In a particular embodiment, the dongle 1008 may be configured to exclusively communicate multimedia timeline data, to exclusively enable wireless communications with one or more authorized multimedia devices, to exclusively enable wireline communication with one or more timeline servers, or any combination thereof.

In a particular embodiment, the dongle 1008 may be configured to determine a sender, an intended recipient, or any combination thereof, of received wireless messages. In a particular embodiment, the processor 1014 may be configured to filter wireless messages received at the transceiver to determine whether to send the wireless messages to the network 1002 via the network interface 1012. In a particular embodiment, the dongle 1008 may be configured to only send messages to the network 1002 that are received from an authorized multimedia device, addressed to a timeline server, or any combination thereof.

In a particular embodiment, the processor 1014 may be configured to filter messages received at via the network interface 1012 to determine whether to send the messages via the transceiver 1018. In a particular embodiment, the dongle 1008 may be configured to only send messages received from the network 1002 that are received from a timeline server, addressed to an authorized multimedia device, or any combination thereof.

Figure 11:
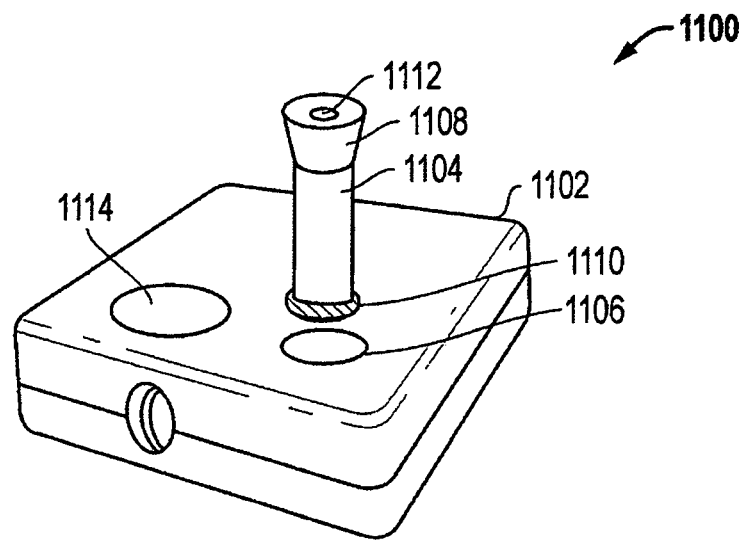
FIG. 11 is a general diagram of another illustrative embodiment of a system to access a multimedia timeline.

Referring to FIG. 11, another illustrative embodiment of a system to access a multimedia timeline is depicted and generally designated 1100. The system 1100 includes a multimedia device 1102 and a multimedia data collection and storage unit 1104.

In a particular embodiment, the multimedia device 1102 may have first socket 1106 configured to receive a portion of the multimedia collection and storage device 1104. The first socket 1106 may include one or more electrical contacts to facilitate a transfer of multimedia data stored in the multimedia data collection and storage unit 1104 to an internal memory (not shown) of the multimedia device 1102. In a particular embodiment, the first socket 1106 may include a charging device or circuit (not shown) to charge one or more rechargeable batteries (not shown) of the multimedia collection and storage unit 1104 when seated in the first socket 1106. In a particular embodiment, the multimedia device 1102 may further include a second socket 1114 to enable charging of one or more rechargeable batteries of a user input device (not shown). In a particular embodiment, the multimedia device 1102 may have two or more electrical contacts (not shown) to receive a user device. In a particular embodiment, the multimedia device 1102 may inductively charge a battery of a user device.

In a particular embodiment, the multimedia content capture and storage device 1104 may include an interface portion 1110 configured to be insertable into the first socket 1106 of the multimedia device 1102. In a particular embodiment, the multimedia collection and storage device 1104 may include a microphone 1112 to capture audio information and may store audio information at an internal memory (not shown). In a particular embodiment, the multimedia data capture and storage device 1104 may include one or more controls 1108 to cause the multimedia data capture and storage device 1104 to transmit navigation and selection commands associated with a multimedia timeline to the multimedia device 1102.

Figure 12:
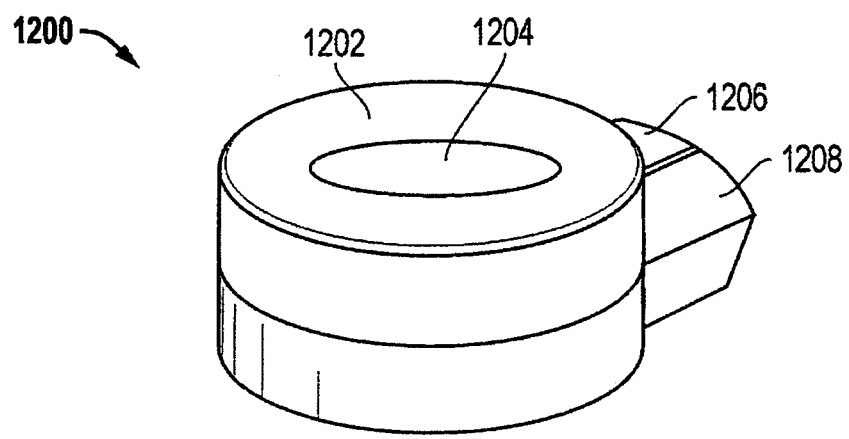
FIG. 12 is a diagram of another illustrative embodiment of a device that may be used to interact with a multimedia timeline user interface.

Referring to FIG. 12, another illustrative embodiment of a device that may be used to interact with a multimedia timelines user interface is depicted and generally designated 1200. In a particular embodiment, the user input device 1200 may wirelessly transmit commands associated with navigation and selection of a multimedia timeline graphical user interface (GUI).

The user input device 1200 includes a first control 1202. In a particular embodiment, actuation of the first control 1202 may cause the user input device 1200 to generate navigation commands for linear navigation through chronological data of a multimedia timeline. In a specific embodiment, the first control 1202 may be actuated by rotating the first control 1202 relative to another control 1204, 1206, 1208, or any combination thereof, of the user input device 1200.

The user input device 1200 includes a second control 1204. In a particular embodiment, actuation of the second control 1204 may cause the user input device 1200 to generate a selection command to select a currently indicated multimedia data object at a multimedia timeline GUI. In a specific embodiment, the second control 1204 may include a button, touchscreen, or other pressure-sensitive control.

In a particular embodiment, the user input device 1200 may include a third control 1206 and a fourth control 1208. In a particular embodiment, actuation of the third control 1206 or the fourth control 1208 may cause the user input device 1200 to generate one or more commands to interact with a multimedia timeline GUI. In a specific embodiment, the third control 1206 may be a "menu" control that causes the user input device 1200 to transmit an instruction to display a list of menu options of a multimedia timeline GUI. In another specific embodiment, the fourth control may be a "favorites" control that causes the user input device 1200 to transmit an instruction to display a user-defined list or selection of multimedia data objects associated with a multimedia timeline.

Figure 13:
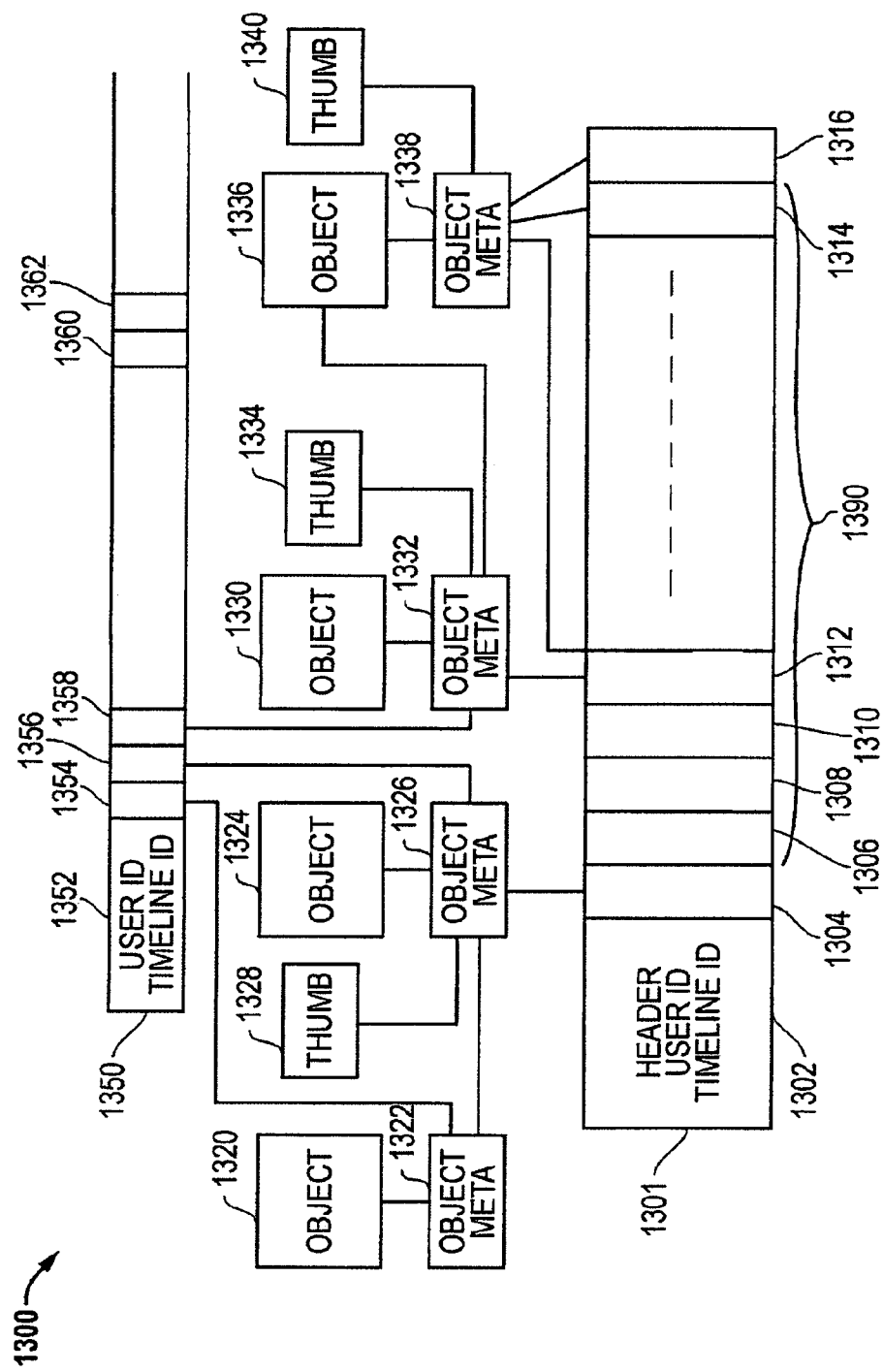
FIG. 13 is a general diagram of a particular illustrative embodiment of data structures associated with multimedia timelines.

Referring to FIG. 13, a particular illustrative embodiment of data structures associated with multimedia timelines is depicted and generally designated 1300. A first data structure 1301 may be associated with a first multimedia timeline. A second data structure 1350 may be associated with a second multimedia timeline. A first data object 1320 may be associated with first object metadata, such as a first object reference element 1322. A second data object 1324 may be associated with second object metadata, such as a second object reference element 1326 and a second object thumbnail 1328. A third data object 1330 may be associated with third object metadata, such as a third object reference element 1332 and a third object thumbnail 1334. A fourth data object 1336 may be associated with fourth object metadata, such as a fourth object reference element 1338 and a fourth thumbnail 1340.

The first data structure 1302 may include first header data 1302 and a first representative group of timeline metadata elements, such as linking elements 1304, 1306, 1308, 1310, 1312, 1314, and 1316. In a particular embodiment, the first header data 1302 may include a timeline identification (ID) that uniquely or semi-uniquely identifies the first multimedia timeline. In a particular embodiment, the first header data 1302 may include a first user identification corresponding to one or more users of the first multimedia timeline. In a specific embodiment, the first header data 1302 may indicate one or more access levels associated with each user of the first multimedia timeline, such as managerial access, editorial access, restricted editorial access, viewing access, restricted viewing access, other access levels, or any combination thereof.

In a particular embodiment, the first group of linking elements 1304-1316 may correspond to a first chronologically-ordered list of metadata. In a particular embodiment, each of the first group of linking elements 1304-1316 may include information identifying a chronological period or date reference. In a particular embodiment, each of the first group of linking elements 1304-1316 may include information identifying the prior linking element and the next linking element of the first multimedia timeline. In a specific embodiment, the linking elements 1304-1316 may be a linked list.

In a particular embodiment, each of the first group of linking elements 1304-1316 may include information, such as links, pointers, or other references, identifying one or more data objects 1320, 1324, 1330, and 1336, one or more object reference elements 1322, 1326, 1332, and 1338, one or more thumbnails 1328, 1334, 1340, or any combination thereof, that are associated with a chronological period or date reference of the linking element 1304, 1306, 1308, 1310, 1312, 1314, or 1316. For example, linking element 1304 may include information identifying the second object reference element 1326, depicted in FIG. 14 as a line connecting metadata element 1304 to the second object reference element 1326. As another example, linking element 1312 may include information identifying the third object reference element 1332 and the fourth object reference element 1338. In a specific embodiment, one or more of the first group of linking elements 1304-1316 may not identify any associated data objects 1320, 1324, 1330, and 1336, object reference elements 1322, 1326, 1332, and 1338, or thumbnails 1328, 1334, and 1340. As an example, linking elements 1306-1310 are not associated with any data objects 1320, 1324, 1330, or 1336, object reference elements 1322, 1326, 1332, or 1338, or thumbnails 1328, 1334, or 1340.

In a particular embodiment, the first data structure 1301 may be configured to be navigable and editable by a processor. A processor may locate the first data structure via the first header data 1302. A processor may navigate the linking elements 1304-1316 to find a position or location associated with a particular date reference by selecting a linking element, comparing a date reference included in the linking element to the particular date reference, and selecting a previous or next linking element based on the comparison. Timeline data, such as a data object, an object reference element, a linking element, or any combination thereof, may thus be located, added, edited, retrieved, deleted, or any combination thereof, based on the particular date reference and the chronological ordering of the linking elements 1304-1316.

In a particular embodiment, the second data structure 1350 may include second header data 1352 and a second representative group of linking elements 1354, 1356, 1358, 1360, and 1362. In a particular embodiment, the second header data 1352 may include a second timeline identification that uniquely or semi-uniquely identifies the second multimedia timeline. In a particular embodiment, the second header data 1302 may include a second user identification corresponding to one or more users of the second multimedia timeline. In a specific embodiment, the second header data 1302 may indicate one or more access levels associated with each user of the second multimedia timeline, such as managerial access, editorial access, restricted editorial access, viewing access, restricted viewing access, other access levels, or any combination thereof.

In a particular embodiment, the second group of linking elements 1354-1362 may correspond to a second chronologically-ordered list of metadata. In a particular embodiment, each of the second group of linking elements 1354-1362 may include information identifying a chronological period or date reference. In a particular embodiment, each of the second group of linking elements 1354-1362 may include information identifying the prior linking element and the next linking element of the second multimedia timeline.

In a particular embodiment, each of the second group of linking elements 1354-1362 may include information identifying one or more data objects 1320, 1324, 1330, and 1336, one or more object reference elements 1322, 1326, 1332, and 1338, one or more thumbnails 1328, 1334, 1340, or any combination thereof, that are associated with the chronological period or date reference of the linking element 1354, 1356, 1358, 1360, or 1362. For example, linking element 1354 may include information identifying the first object reference element 1322. In a specific embodiment, one or more of the second group of linking elements 1354-1362 may not identify any associated data objects 1320, 1324, 1330, and 1336, object reference elements 1322, 1326, 1332, and 1338, or thumbnails 1328, 1334, and 1340. As an example, linking elements 1360 and 1362 are not associated with any data objects 1320, 1324, 1330, or 1336, object reference elements 1322, 1326, 1332, or 1338, or thumbnails 1328, 1334, or 1340.

In a particular embodiment, each data object 1320, 1324, 1330, and 1336 may include multimedia data that is associated with one or more multimedia timelines. In a particular embodiment, the data objects 1320, 1324, 1330, and 1336 may include video data, video files, audio data, audio files, image data, image files, word processing documents, emails, markup language data or files, any other type of multimedia data or file, or any combination thereof.

In a particular embodiment, each data object 1320, 1324, 1330, and 1336 may be associated with one or more of the object reference elements 1322, 1326, 1332, and 1338. In a particular embodiment, each object reference element 1322, 1326, 1332, and 1338 may include information regarding an associated data object 1320, 1324, 1330, or 1336, such as multimedia type, file type, file size or memory requirements, a memory location, a date reference, any other information corresponding to the associated data object 1320, 1324, 1330, or 1336, or any combination thereof. In a specific embodiment, a date reference may indicate a date, a time, or any combination thereof, corresponding to a creation, storing, or modifying of one or more data objects 1320, 1324, 1330, a user-specified date, a user-specified time, or any combination thereof.

In a particular embodiment, each of the object reference elements 1322, 1326, 1332, and 1338 may include one or more links, pointers, or other references indicating one or more multimedia timelines or multimedia linking elements referencing the object reference element 1322, 1326, 1332, or 1338. For example, the second object reference element 1326 may include information indicating the linking element 1304 corresponding to the first multimedia timeline and the linking element 1356 corresponding to the second multimedia timeline, in addition to information indicating the first object reference element 1322 corresponding to the first data object 1320. As another example, the third object reference element 1332 may include information indicating the linking element 1312, the third data object 1330, the third thumbnail 1334, and the fourth data object 1336.

In a particular embodiment, each of the object reference elements 1322, 1326, 1332, and 1338 may also include one or more links, pointers, or other references indicating one or more thumbnails 1328, 1334, and 1340. In a particular embodiment, each of the thumbnails 1328, 1334, and 1340 contains efficiently transmittable data representing an associated data object 1320, 1324, 1330, or 1336. As an illustrative, non-limiting example, a thumbnail associated with an image may include a low-resolution version of the associated image. As another illustrative, non-limiting example, a thumbnail associated with audio data may include a sample of the audio data. As yet another illustrative, non-limiting example, a thumbnail associated with video data may include one or more low-resolution images corresponding to frames of the video data.

In a particular embodiment, a request for multimedia timeline data corresponding to a particular chronological period of the first multimedia timeline may be received at a multimedia timeline server that includes the data structures illustrated in FIG. 13. In a particular embodiment, a copy of the entire data structure 1301 and all associated data objects 1320, 1.324, 1330, and 1336, all object reference elements 1322, 1326, 1332, and 1338, and all thumbnails 1328, 1334, and 1340 may be sent to the requestor.

In another embodiment, only a portion of the timeline metadata corresponding to the particular chronological period, such as the chronologically ordered group of linking elements 1390, may be sent to the requester. In a particular embodiment, a copy of object reference elements and thumbnails associated with the group of linking elements 1390, such as object reference elements 1332 and 1338 and thumbnails 1334 and 1340, may also be sent to the requester. In a particular embodiment, copies of data object 1330 and 1336 associated with the group of linking 1390 may be sent when a specific request for the respective data object 1330 or 1336 is received. Thus, system resources such as network bandwidth may be conserved by sending a portion of the multimedia timeline data in response to a request.

Referring to FIG. 14, a particular illustrative embodiment of an interface to display a multimedia timeline is depicted and generally designated 1400. A daily view 1402, a weekly view 1404, and a monthly view 1406 each provide a respective navigable and selectable interface for multimedia timeline data corresponding to a respective chronological period.

In a particular embodiment, the daily view 1402 may include multiple chronological indicators, such as representative chronological indicators 1410, 1412, and 1416. In a particular embodiment, each of the chronological indicators 1410, 1412, and 1416 indicates a time period to which at least one multimedia data object of a multimedia timeline may be associated.

In a particular embodiment, each chronological indicator 1410, 1412, and 1416 may represent an hour of a day that is associated with the daily view 1402. The chronological indicators 1410-1416 may indicate whether any multimedia data objects are associated with the respective hour, such as by a color scheme, a shading scheme, a textual indication, a numerical indication, a graphical indication, any other indication, or any combination thereof.

In another particular embodiment, each chronological indicator 1410-1416 may represent a single multimedia data object. As an illustrative, non-limiting example, if ten multimedia data objects are associated with a day corresponding to the daily view 1402, then ten chronological indicators may be displayed. The chronological indicators may indicate any type of data object. As an illustrative, non-limiting example, a first indicator may indicate a data object that includes audio data, a second indicator may indicate a data object that includes video data, and a third indicator may indicate a data object that includes text data.

The daily view 1402 may also include a display window 1418 that may have a viewing region 1420 and at least one selectable control 1422. In a particular embodiment, the viewing region 1420 and the selectable control 1422 may provide a consistent interface appearance and user interactivity for all multimedia data types. As an illustrative, non-limiting example, an audio file, a digital image, and a digital video file may be presented in a uniform manner via the viewing region 1420 and with a consistent look and operation of the selectable control 1422.

The daily level interface 1402 may also include a content description indicator 1424. In a particular embodiment, the content description indicator 1424 may include a title or other text associated with the multimedia content displayed at the display window 1420, a date associated with the multimedia content, an indicator of the type of multimedia content, or any combination thereof.

In the particular illustrative embodiment of the daily level interface 1402 of FIG. 14, a digital image may be displayed at the display region 1420. The content description indicator 1424 provides a title associated with the digital image in the display region 1420 and an icon of a camera as a multimedia content type indicator. Furthermore, the display control 1422 enables a recording of an audio annotation to be associated with the digital image displayed at the display region 1420. In a specific embodiment, selection of the control 1422 can cause an activation of a microphone for recording, such as the microphone 1418 of the user input device 400. In a particular embodiment, selection of the control 1422 may cause a wireless signal to be sent to a user input device to activate a microphone and wireless data that includes an annotation to be received from the user input device.

In a particular embodiment, the weekly view 1404 may include representative groups 1442, 1444, 1446, and 1448 of one or more chronological indicators, such as the representative chronological indicator 1450. In a particular embodiment, the weekly view 1404 may include a weekly view description indicator 1440 that may indicate a chronological period currently associated with the weekly view 1404. A display window 1452 may include a viewing region 1454 to provide or display currently selected multimedia content. In the illustrative embodiment of FIG. 14, the currently selected multimedia content of the weekly view 1404 may be associated with the selected chronological indicator 1450.

In a particular embodiment, each of the groups 1442, 1444, 1446, and 1448 may represent a respective day of a week. As an illustrative, non-limiting example, the first representative group 1442 may include chronological indicators associated with a first day of a week associated with the weekly view 1404, such as a Sunday. The second representative group 1444 may include chronological indicators associated with a next sequential day, such as a Monday. In a particular embodiment, each group 1442-1448 may include a variable number of chronological indicators, each chronological indicator indicating one or more multimedia objects associated with a time period during the day associated with the chronological indicator. In a particular embodiment, a thumbnail object can be depicted with each group 1442-1448 to represent at least one multimedia data object associated with the respective day.

In a particular embodiment, the monthly view 1406 may include monthly view description indicators 1460, such as month designators and a year designator. The yearly level interface 1406 may include one or more groups of chronological indicators associated with multimedia content, such as representative groups 1462, 1464, and 1466. In a particular embodiment, each group 1462-1466 may represent a month of a designated year. In addition, each group may contain a header providing one or more thumbnail objects representative of content associated with the respective month. A slider control 1470 may be used to navigate among months associated with the multimedia timeline during the designated year. In a particular embodiment, a slider control may also be included in one or more of the daily view 1402 and the weekly view 1404.

In a particular embodiment, a currently selected group or portion of a group of chronological indicators may be highlighted or otherwise distinctly displayed, such as the representative group of chronological indicators 1468. In a specific embodiment, the selected group of chronological indicators 1468 may correspond to a predetermined number of chronological indicators. In another specific embodiment, the selected group of chronological indicators 1468 may correspond to a calendar week or other predetermined chronological period. In yet another specific embodiment, the selected group of chronological indicators 1468 may correspond to a predetermined portion of the yearly view displayed at a display device, such as one-eighth of the displayed portion.

During operation, a user of the multimedia timeline graphical user interface 1400 may begin navigating the multimedia timeline using the yearly view 1406. In a particular embodiment, the user may chronologically navigate to a particular month and decide to view multimedia content associated with the particular month. For example, a user may see a thumbnail image associated with the particular month and may decide to visit the time period associated with the thumbnail image. In a particular embodiment, a user may navigate to a portion of the month, such as a particular week, and may press a selection control of a user input device to navigate to the weekly view 1404. In another particular embodiment, a user may navigate to a weekly view 1404 corresponding to the selected group of chronological indicators 1468 by actuating a "zoom in" control of a user interface device.

In a particular embodiment, a user may chronologically navigate through the weekly view 1404 by scrolling through the groups of chronological indicators, such as the representative groups 1442-1448, to locate a group of chronological indicators corresponding to a particular day. In a particular embodiment, a user may navigate through the chronological indicators of the weekly view and view thumbnails provided in the group headers. In a particular embodiment, a thumbnail provided in each group header may change in response to a user navigation through the group, so that the group header reflects multimedia content associated with a currently selected day. For example, a user may navigate through the display 1404 to the highlighted chronological indicator 1450, and be provided a thumbnail object in the display region 1454 that corresponds to the chronological period associated with the chronological indicator 1450. In a particular embodiment, a user may navigate to the daily view 1402 corresponding to the selected chronological indicator 1450 by actuating a selection control of a user input device. In another particular embodiment, a user may navigate to the daily view 1402 corresponding to the selected chronological indicator 1450 by actuating a "zoom in" control of a user interface device.

In a particular embodiment, a user may chronologically navigate through the daily view 1402 by scrolling though the chronological indicators, such as the representative chronological indicators 1410-1416. In a particular embodiment, a user may navigate to a particular chronological indicator and actuate a selection control of a user input device to launch the display window 1418 with the multimedia content corresponding to the selected chronological indicator provided at the viewing region 1420. In another embodiment, the display window 1418 may be perpetually displayed at the daily view 1402, and the multimedia content provided at the viewing region 1420 may change to reflect multimedia content associated with a currently selected chronological indicator.

It should be clearly understood that any and all terms used throughout the present disclosure, such as "display window," "thumbnail," "viewing region," or any other terminology or descriptions that may connote any particular media type, are used solely for convenience, and should not be construed to limit any aspect of the present disclosure to visually presentable multimedia content. Any such terms should be construed to encompass any and all media-specific analogs to visual elements. As an illustrative, non-limiting example, a "thumbnail" for an audio file may include a sample of the audio file, and a "display" of the audio file thumbnail may include an audible presentation of the sample. The present disclosure specifically contemplates all known media types and their successors, including, but not limited to, audio content, visual content, tactile content, and olfactory content.

Figure 15:
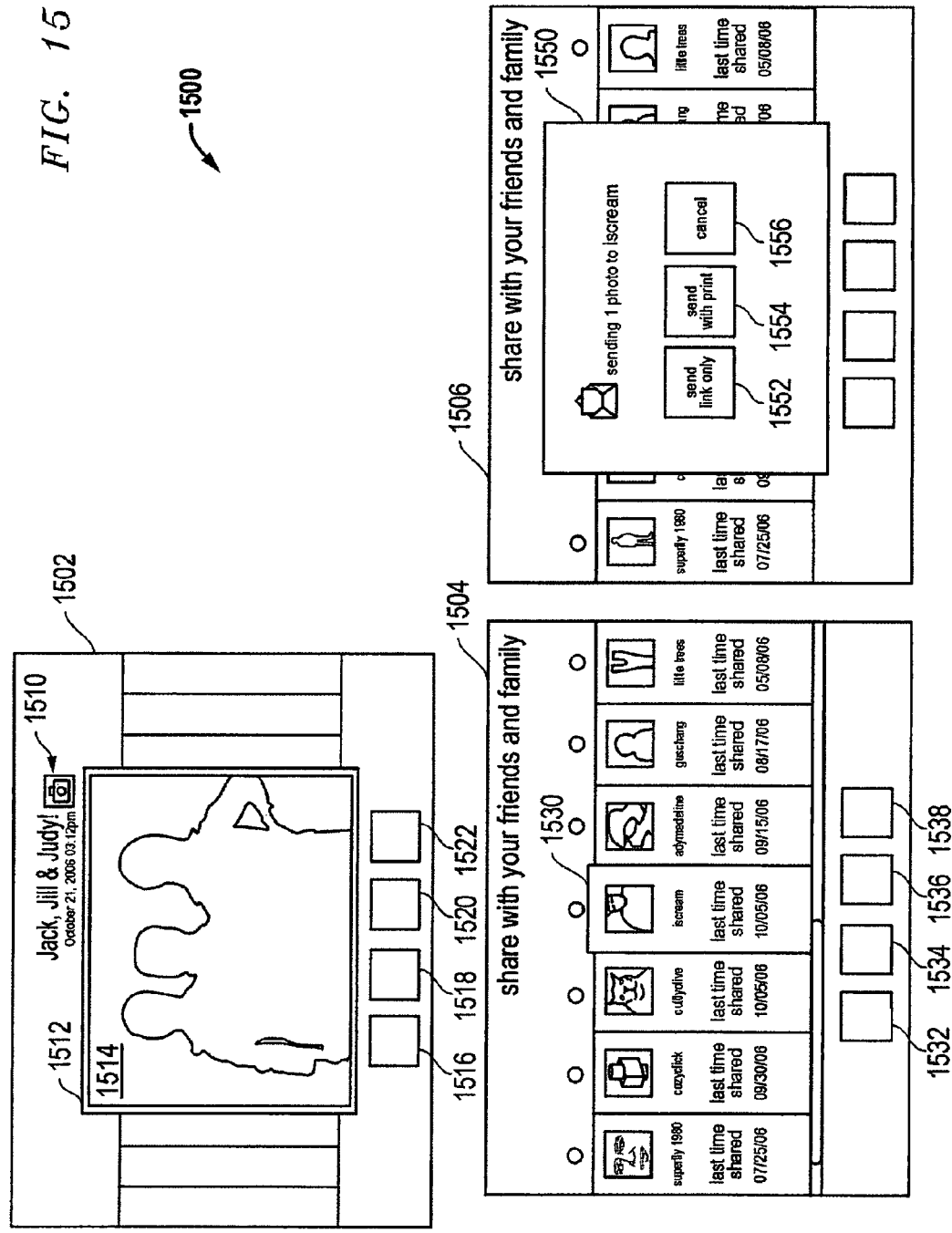
FIG. 15 is a diagram of another illustrative embodiment of an interface to display a multimedia timeline.

Referring to FIG. 15, another illustrative embodiment of an interface to display a multimedia timeline is depicted and generally designated 1500. A multimedia content view 1502 may include a display window 1512 that may have a viewing region 1514. In a particular embodiment, a content description indicator 1510 provides a description of content presented via the display window 1512. In a particular embodiment, the multimedia content view 1502 may include selectable controls that enable a user to edit a multimedia timeline or to share multimedia data from a multimedia timeline with others. In a specific embodiment, the multimedia content view 1502 may include a "share with friends" control 1516, an "add to album" control 1518, a "remove from library" control 1520, and a "change view" control 1522.

In a specific embodiment, selection of the "share with friends" control 1516 may enable a user to send or otherwise make available a multimedia data object presented at the display window 1512 to one or more recipients. In a specific embodiment, selection of the "share with friends" control 1516 may generate a friends and family view 1504. In a particular embodiment, the friends and family view 1504 may include multiple recipient indicators, such as the representative recipient indicator 1530, that have been pre-determined by a user of a multimedia timeline to be potential recipients of multimedia data.

In a particular embodiment, a second friends and family view 1506 may be generated in response to a selection of one or more recipients. The second friends and family view 1506 may include a prompt window 1550 with selectable controls to enable a transmission of multimedia data to the selected recipients. In a specific embodiment, a first selectable control 1552 may enable a user to determine that a link to the selected multimedia data object is sent. In a specific embodiment, a second selectable control 1554 may enable a user to determine that the multimedia data object is sent in a visual format as a printed photograph or other printed material. In a specific embodiment, a third selectable control 1556 may enable a user to cancel a transmission of multimedia data to the designated recipient.

In a specific embodiment, selection of the "add to album" control 1518 of the multimedia content view 1502 may enable a user to add a multimedia data object presented at the display window 1512 to one or more collections of multimedia data designated as multimedia albums. In a specific embodiment, the multimedia albums may include data generally associated with a particular event, person, or other relational context. As an illustrative, non-limiting example, an album may include a logical or physical grouping of multimedia data associated with a vacation, a community event, a wedding, any other particular event or collection or events, or any combination thereof.

In a specific embodiment, selection of the "remove from library" control 1520 of the multimedia content view 1502 may enable a user to remove a multimedia data object presented at the display window 1512 from a multimedia timeline. In a specific embodiment, all data associated with the removed multimedia object, such as metadata and thumbnails, may also be removed automatically by selection of the "remove from library" control 1520.

In a specific embodiment, selection of the "change view" control 1522 of the multimedia content view 1502 may enable a user to navigate to a different view of a multimedia timeline graphical user interface. In a specific embodiment, selection of the "change of view" control 1522 may cause selectable menu of available views to be provided. As an illustrative, non-limiting example, available views may include a yearly view, a weekly view, a daily view, any other view, or any combination thereof.

Figure 16:
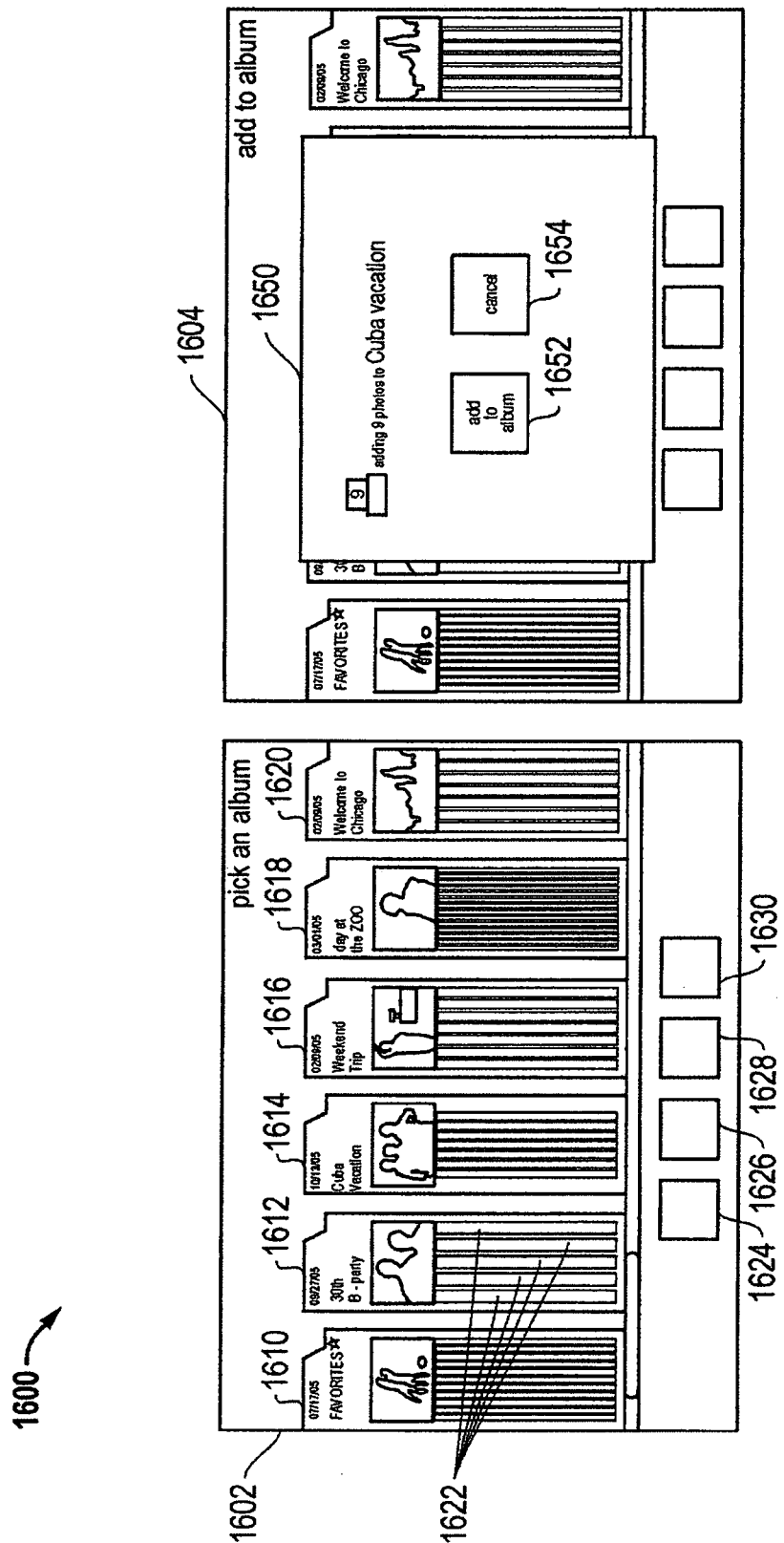
FIG. 16 is a diagram of another illustrative embodiment of an interface to display a multimedia timeline.

Referring to FIG. 16, another illustrative embodiment of an interface to display a multimedia timeline is depicted and generally designated 1600. An album view 1602 may include multiple representative album indicators 1610, 1612, 1614, 1616, 1618, and 1620. In a particular embodiment, each of the representative indicators 1610-1620 may include a title, a description, a representative thumbnail, and one or more chronological indicators corresponding to multimedia content associated with the respective album. In a particular embodiment, the chronological indicators, such as representative chronological indicators 1622, may each indicate an individual multimedia data object that may be associated with a particular event, user, or other criteria, to generate a logically related subset of multimedia timeline content. In a particular embodiment, selectable controls 1624, 1626, 1628, and 1630 may enable a user to perform various functions related editing and viewing albums, such as adding or associating multimedia timeline data objects to one or more albums.

In a particular embodiment, a second album view 1604 may be generated in response to a selection of a control 1624, 1626, 1628, or 1630 to add multimedia content to an album. In a particular embodiment, the second album view 1604 may include a prompt window 1650 that may include a first selectable control 1652 to add selected multimedia data to a designated album. In a particular embodiment, the prompt window 1650 may include a second selectable album control 1654 to cancel adding multimedia data to a designated album.

Figure 17:
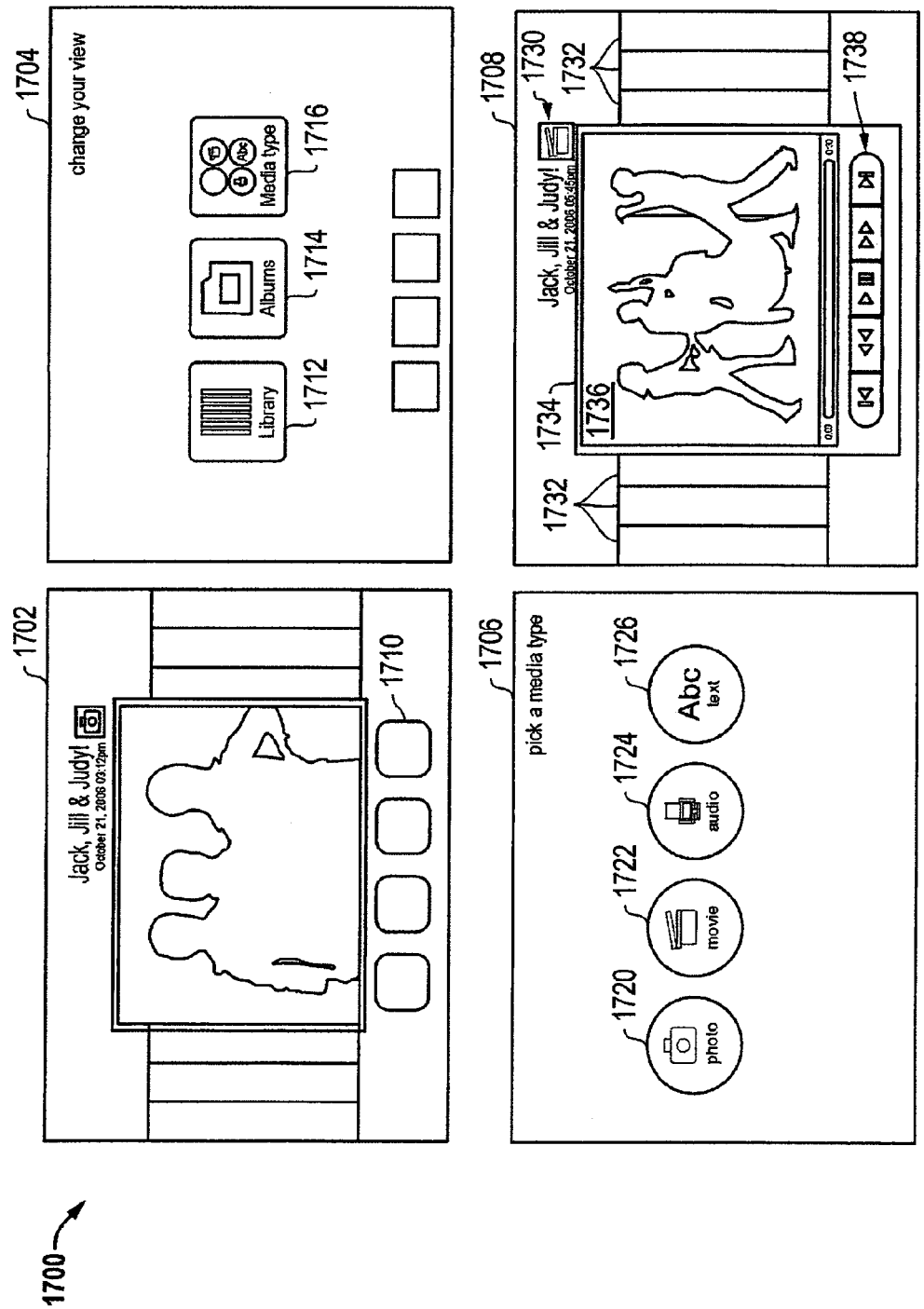
FIG. 17 is a diagram of another illustrative embodiment of an interface to display a multimedia timeline.

Referring to FIG. 17, another illustrative embodiment of an interface to display a multimedia timeline is depicted and generally designated 1700. An album view 1702 may include multiple chronological indicators corresponding to multimedia data objects associated with a particular album. In a particular embodiment, the album level view 1702 may also include multiple selectable controls, including a "change view" control 1710.

In a particular embodiment, a "view selection" view 1704 may be generated in response to a selection of the "change view" control 1710. The "view selection" view 1704 may include multiple selectable controls to enable a user to specify a multimedia timeline presentation format, such as a "library" control 1712, an "albums" control 1714, and a "media type" control 1716.

In a particular embodiment, a media type view 1706 may be generated in response to a selection of the "media type" control 1716. The media type view 1706 may include multiple selectable controls to enable a selection of a particular media type, such as a "photo" control 1720, a "movie" control 1722, an "audio" control 1724 and a "text" control 1726.

In a particular embodiment, a movie-only view 1708 may be generated in response to a selection of the "movie" control 1722. In a particular embodiment, the movie-only view 1708 depicts only chronological indicators 1732 associated with movie data objects. The movie-only view 1708 may include a display window 1734 with a viewing region 1736 and a set of selectable media controls 1738. The movie-only view 1708 may also include a content description indicator 1730. In a particular embodiment, the content description indicator 1730 may include a title, a date associated with the displayed multimedia content, an icon indicating a media type of the displayed multimedia content, other information, or any combination thereof.

Figure 18:
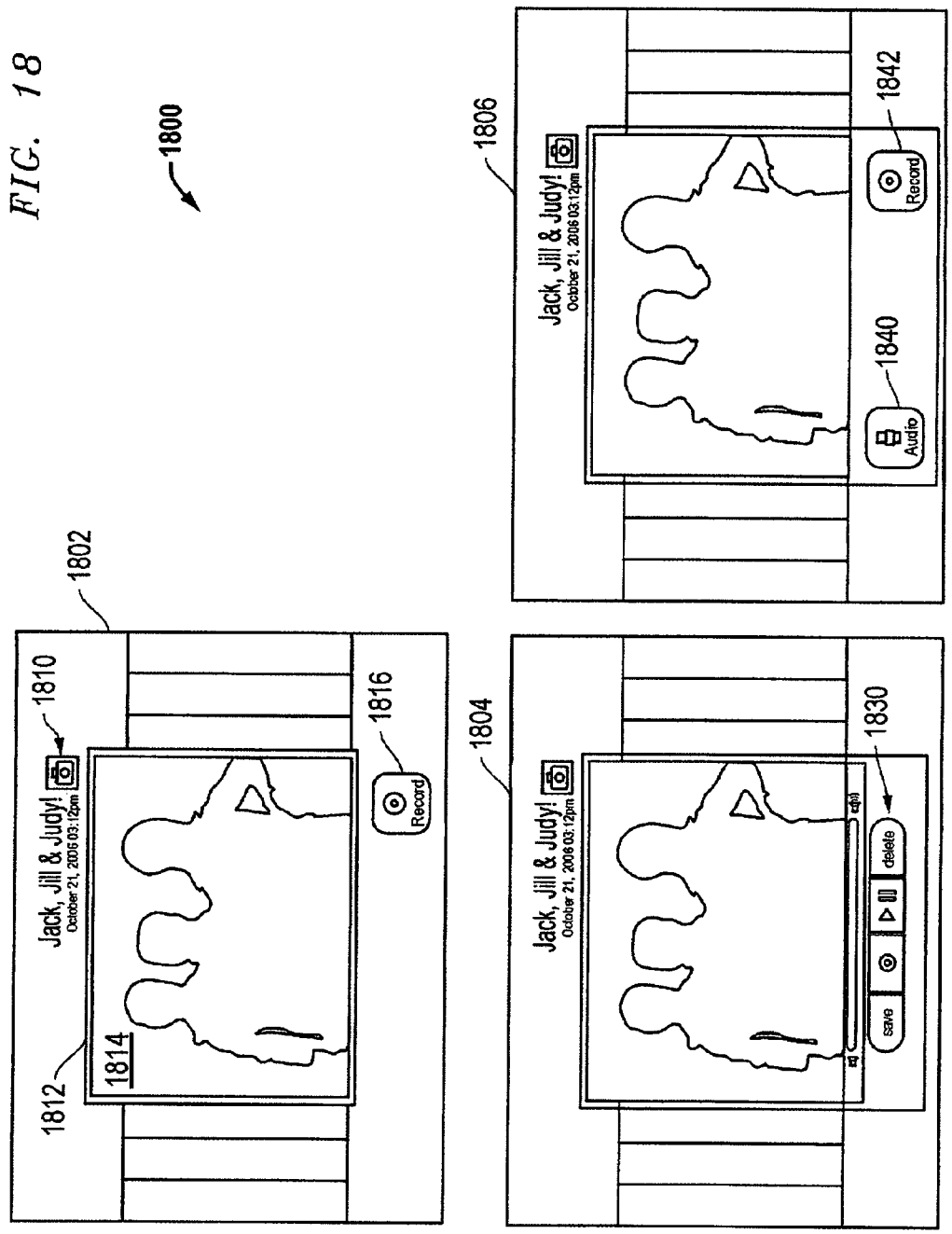
FIG. 18 is a diagram of another illustrative embodiment of an interface to display a multimedia timeline.

Referring to FIG. 18, another illustrative embodiment of an interface to display a multimedia timeline is depicted and generally designated 1800. A first view 1802 may include a content description indicator 1810 and a multimedia window 1812 that may have a display region 1814 and a selectable record control 1816. In a particular embodiment, the record control 1816 can enable recording of audio information associated with a multimedia object provided at the display region 1814.

In a particular embodiment, a selection of the record control 1816 may cause an audio recording interface 1804 that may have selectable audio controls 1830 to be displayed. In a particular embodiment, the audio controls 1830 may include a save control, a record control, a play/pause control, and a delete control.

In a particular embodiment, when a selected multimedia object may have an associated audio recording, an "audio available" view 1806 can provide a selectable audio playback control 1840. In a particular embodiment, the audio playback control 1840 may enable a playback of audio information associated with a displayed multimedia object.

In a particular embodiment, a user of a multimedia timeline may navigate to a particular multimedia object of a multimedia timeline and may record audio information to be stored in association with the multimedia object. For example, a user may record audio content related to thoughts or memories corresponding to the multimedia object, such as a description of a photograph or a historical background of a document. A user having access to the multimedia timeline may cause the recorded audio information to be played by selecting the audio playback control 1840.

Figure 19:
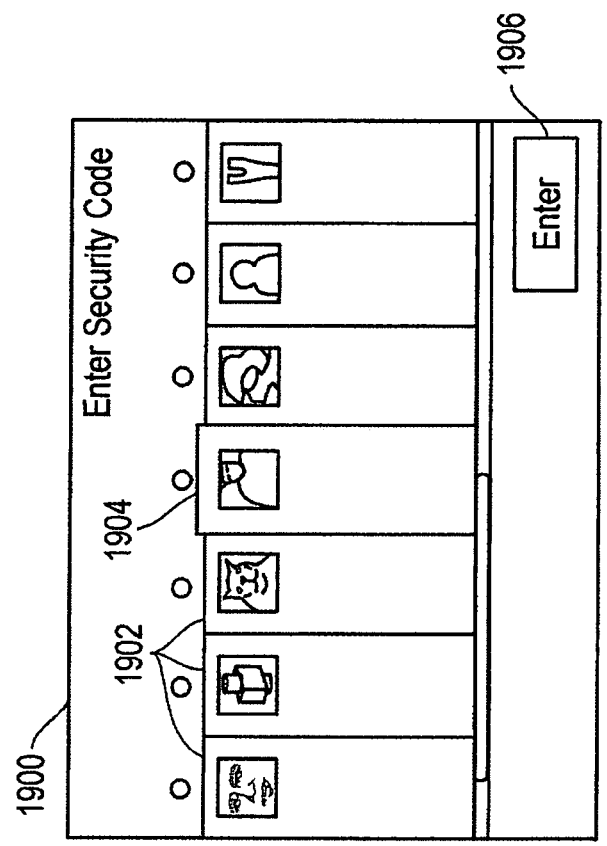
FIG. 19 is a diagram of another illustrative embodiment of an interface to provide security for a multimedia timeline.

Referring to FIG. 19, an illustrative embodiment of an interface to provide security for a multimedia timeline is depicted and generally designated 1900. In a particular embodiment, the interface 1900 may be a security interface that provides multiple indicators 1902 corresponding to multimedia objects associated with a particular multimedia timeline. In a particular embodiment, each indicator 1902 can include a thumbnail corresponding to an associated multimedia object. In a particular embodiment, the indicators 1902 may be navigable and selectable by a user requesting access to a multimedia timeline. A representative selected indicator 1904 may be displayed in a manner distinguishable from non-selected indicators. In a particular embodiment, selection of a control 1906 may indicate that selection of one or more selected indicators 1904 is complete.

In a particular embodiment, a user having managerial access to a particular multimedia timeline may select one or more multimedia objects of the particular multimedia timeline for a security code or key. In a particular embodiment, at least a portion of a security code for a multimedia timeline may be selected by an automated random or pseudo-random selection process, such as by a computer. In a particular embodiment, the indicators 1902 may represent one or more of the security code multimedia objects. In a particular embodiment, the indicators 1902 may also indicate one or more non-security code multimedia objects of the particular multimedia timeline or from other multimedia timelines. Access to the particular multimedia timeline may be restricted based on a user's selection of one or more indicators 1902.

In a particular embodiment, a security code may be a single multimedia object indicated by an indicator 1904. A user selecting a correct indicator 1904 may thus be granted access to the timeline. In another embodiment, a multimedia timeline may include a multi-tiered security access system, and a level of security access can be determined based on one or more selected indicators, an order of selection of indicators, a number of correct selected indicators, other combinations of selected indicators or indicator selection order, or any combination thereof.

In a specific embodiment, a user requesting access to a multimedia timeline may be prompted to traverse multiple security interfaces 1900. In a non-limiting, illustrative example, three separate security interfaces may be sequentially presented to a user desiring access to a multimedia timeline. Access to a multimedia timeline, or a level of access in a multi-tiered security access system, may be determined based on indicator selections at the three security interfaces.

In a particular embodiment, a graphical user interface may include a first screen having a first set of multimedia items provided to obtain access to a multimedia timeline. The first screen may have a first selection button to select a first selection. The first selection may include one or more multimedia items from the first set of multimedia items. The first screen may also have a first control button to indicate that the first selection is complete. Access to the multimedia timeline may be granted when the first selection matches a first key.

In a particular embodiment, the graphical user interface may include a second screen that has a second set of multimedia items provided to obtain access to the multimedia timeline. The second screen may have a second selection button to select a second selection. The second selection may include one or more multimedia items from the second set of multimedia items. The second screen may have a second control button to indicate that the second selection is complete. Access to the multimedia timeline may be granted when the first selection matches the first key and the second selection matches a second key.

Figure 20:
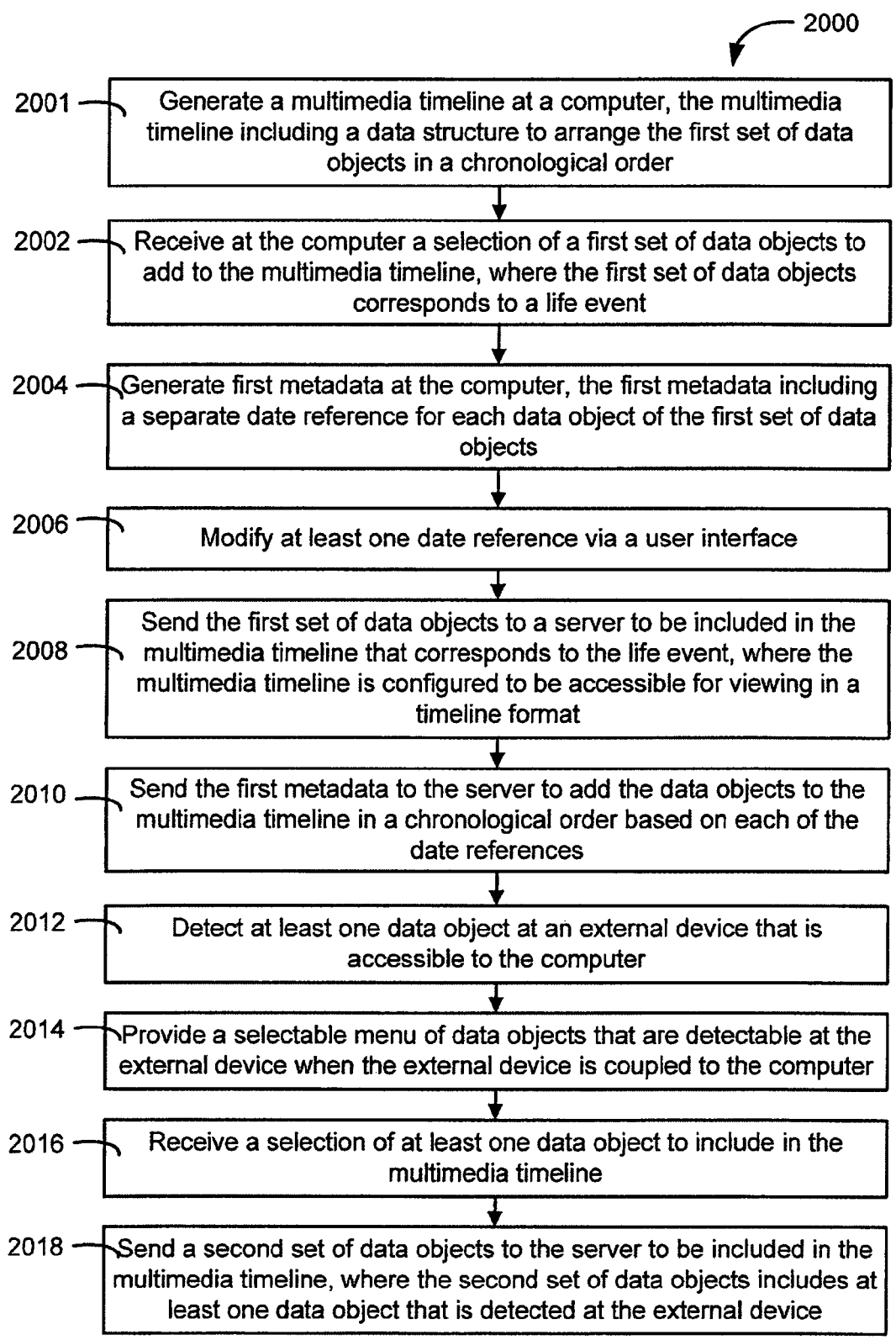
FIG. 20 is a flow diagram of a particular illustrative embodiment of a method of providing a multimedia timeline.

Referring to FIG. 20, a particular illustrative embodiment of a method of providing a multimedia timeline is depicted and generally designated 2000. In a particular embodiment, a multimedia timeline may be generated at a computer, the multimedia timeline including a data structure to arrange the first set of data objects in a chronological order, at 2001. In a particular embodiment, the computer may be the computer 312 of FIG. 3, and the data structure may be the first data structure 1301 of FIG. 13. In a particular embodiment, a security mechanism may be provided to enable an authorized user to add content to the multimedia timeline. In a particular embodiment, the security mechanism may include a security interface, such as the interface 1900 of FIG. 19.

A selection of a first set of data objects to add to the multimedia timeline may be received at the computer, where the first set of data objects corresponds to a life event, at 2002. In a particular embodiment, the selection may be received via a drag and drop sequence at a user interface. The drag and drop sequence may include positioning an icon corresponding to a data object proximate to an icon representing the multimedia timeline. In a particular embodiment, the first set of data objects may include at least one data object that has at least one media type selected from all media types that are storable at a personal computer. In a particular embodiment, the at least one data object may include at least one of an audio media type, a video media type, a document and an email.

In a particular embodiment, the life event may include at least a portion of a person's life. In a particular embodiment, the life event may begin substantially at the person's birth and may include substantially all of the person's life. In a particular embodiment, the life event may be a wedding, a marriage, an anniversary, a graduation, a birthday, or a vacation. In a particular embodiment, the multimedia timeline may include autobiographical content.

In a particular embodiment, first metadata may be generated at the computer, the first metadata including a date reference for each data object of the first set of data objects, at 2004. In a particular embodiment, at least one date reference may be modified via a user interface, at 2006.

The first set of data objects may be sent to a server to be included in the multimedia timeline, where the multimedia timeline is configured to be accessible for viewing in a timeline format, at 2008. In a particular embodiment, the first metadata may be sent to the server to add each of the data objects to the multimedia timeline in a chronological order based on the date reference, at 2010. In a particular embodiment, the server may be a dedicated multimedia timeline server that stores multimedia timeline data at a dedicated multimedia timeline data center. In a particular embodiment, the first set of data objects may be retrievable from the server at a multimedia device when an access key device associated with the multimedia timeline is coupled to the multimedia device.

In a particular embodiment, a plurality of multimedia devices may be in communication with the server. Each multimedia device of the plurality of multimedia devices may be configured to enable uploading to the server multimedia timeline data when coupled to the access key device. Each multimedia device of the plurality of multimedia devices may be configured to enable editing the multimedia timeline when coupled to the access key device. In a particular embodiment, the server may be the timeline server 302 of FIG. 3.

In a particular embodiment, at least one data object may be detected at an external device that is accessible to the computer, at 2012. In a particular embodiment, the external device may be a personal digital assistant (PDA), an audio player, an audio recorder, a video player, a video recorder, a phone, any other media capture or storage device, or any combination thereof.

In a particular embodiment, a selectable menu of data objects that are detectable at the external device when the external device is coupled to the computer may be provided, at 2014. In a particular embodiment, the selectable menu may be provided automatically when the external device is detected by the computer. In a particular embodiment, a selection of at least one data object to include in the multimedia timeline may be received, at 2016.

In a particular embodiment, a second set of data objects may be sent to the server to be included in the multimedia timeline, where the second set of data objects includes the at least one data object, at 2018. The first set of data objects and the second set of data objects may each include various types of multimedia content. For example, in a particular embodiment, the second set of data objects may include a video file, an audio file, or an image file, and the first set of data objects may include at least one data object that is not a video file, an audio file, or an image file.

In a particular embodiment, an annotation may be received at the computer. The annotation may correspond to a particular data object of the first set of data objects. In a particular embodiment, the annotation may be sent to the server to associate the annotation with the particular data object in connection with the multimedia timeline. In a particular embodiment, the annotation may include at least one of audio data, video data, and text data.

Figure 21:
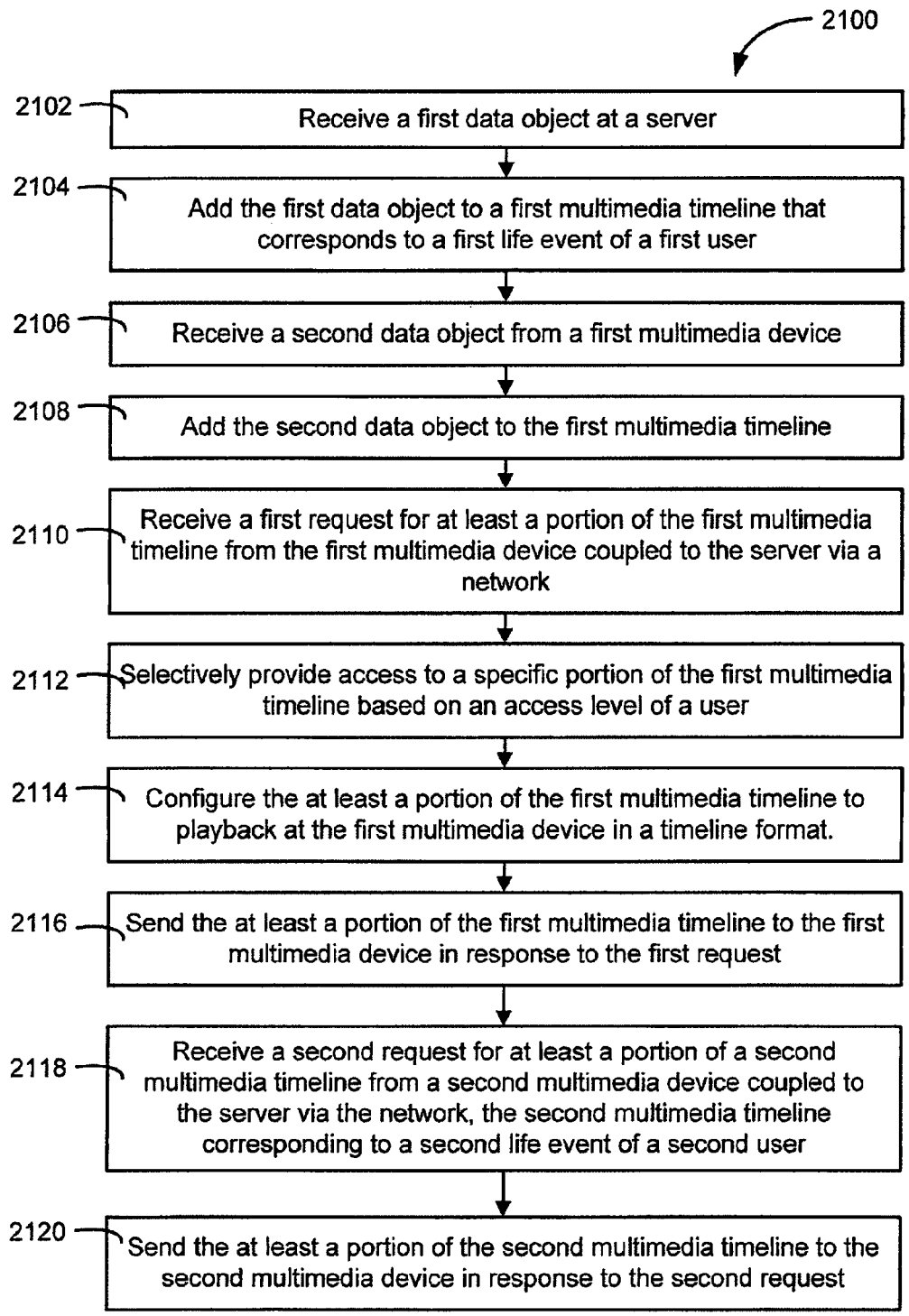
FIG. 21 is a flow diagram of another illustrative embodiment of a method of providing a multimedia timeline.

Referring to FIG. 21, another illustrative embodiment of a method of providing a multimedia timeline is depicted and generally designated 2100. A first data object may be received at a server, at 2102. The server may store and provide multiple multimedia timelines associated with multiple users. In a particular embodiment, the server may be the timeline server 302 of FIG. 3.

The first data object may be added to a first multimedia timeline that corresponds to a first life event of a first user, at 2104. The first multimedia timeline may include data objects having various media types. For example, in a particular embodiment, the first data object may include audio data, and another data object of the first multimedia timeline may not include audio data.

In a particular embodiment, a second data object may be received from a first multimedia device, at 2106. In a particular embodiment, the multimedia device may be a dedicated device to provide multimedia timeline sessions, such as the multimedia device 306 of FIG. 3. In a particular embodiment, the second data object may be added to the first multimedia timeline, at 2108.

A first request for at least a portion of the first multimedia timeline may be received from the first multimedia device coupled to the server via a network, at 2110. In a particular embodiment, the first request may include user identification information to selectively provide playback of the first multimedia timeline. In a particular embodiment, access to a specific portion of the first multimedia timeline may be selectively provided based on an access level of a user, at 2112.

In a particular embodiment, at least a portion of the first multimedia timeline may be configured to playback at the first multimedia device in a timeline format, at 2114. At least a portion of the first multimedia timeline may be sent to the first multimedia device in response to the first request, at 2116.

In a particular embodiment, at least a portion of the first multimedia timeline may be configured to playback at the first multimedia device in a format other than a chronological timeline format. In a particular embodiment, the format other than a chronological timeline further comprises a favorites format based on an input from the first user.

In a particular embodiment, a second request for at least a portion of a second multimedia timeline may be received from a second multimedia device coupled to the server via the network, the second multimedia timeline corresponding to a second life event of a second user, at 2118. In a particular embodiment, at least a portion of the second multimedia timeline may be sent to the second multimedia device in response to the second request, at 2120.

Figure 22:
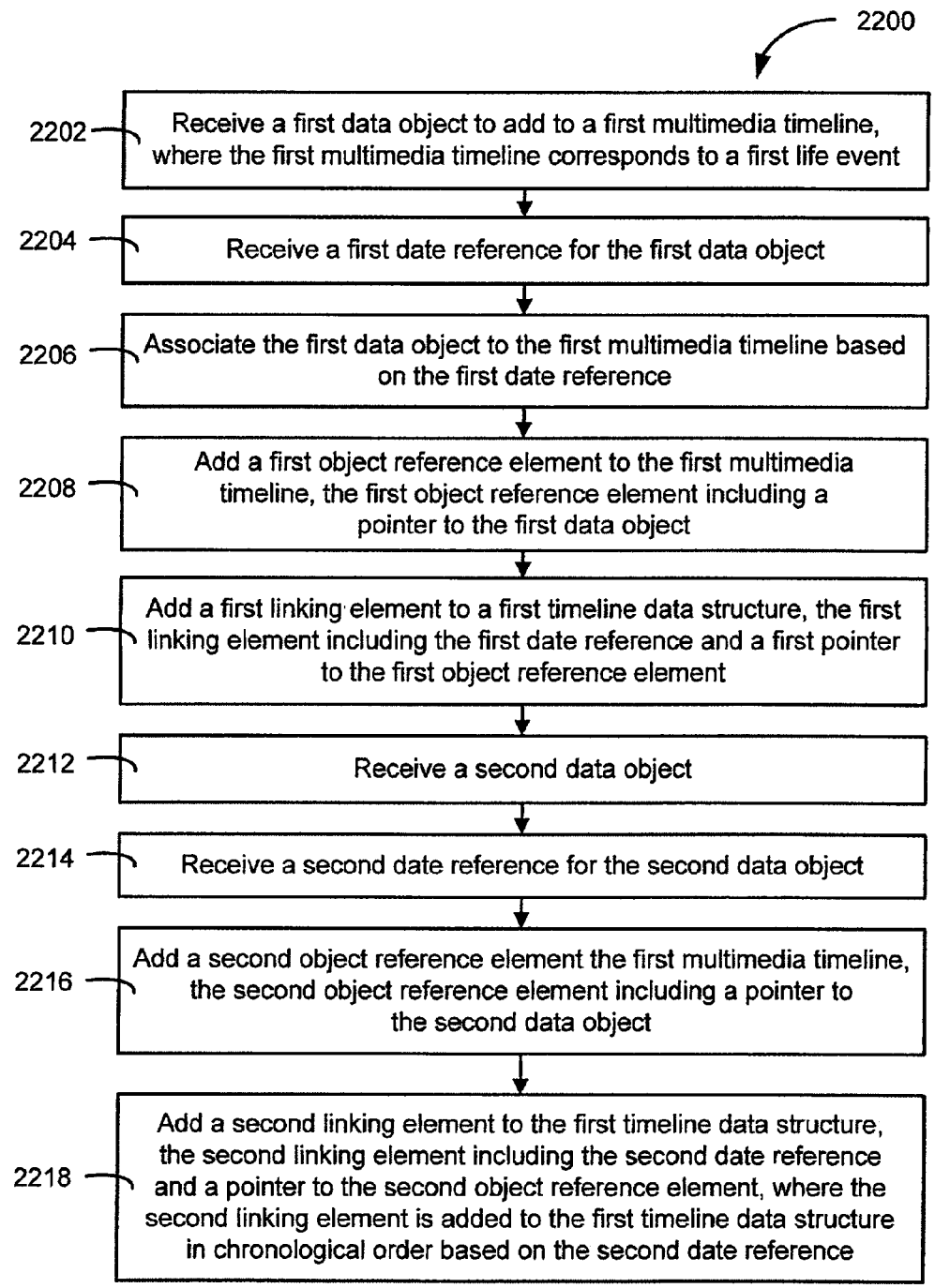
FIG. 22 is a flow diagram of a particular illustrative embodiment of a method of adding data objects to a multimedia timeline.

Referring to FIG. 22, a particular illustrative embodiment of a method of adding data objects to a multimedia timeline is depicted and generally designated 2200. A first data object may be received to add to a first multimedia timeline, where the first multimedia timeline corresponds to a first life event, at 2202. In a particular embodiment, the multimedia timeline may correspond to a life event. In a particular embodiment, the life event may include at least a portion of a person's life. In a particular embodiment, the life event may include a business event. In a particular embodiment, the business event may include a meeting, a presentation, a conference, a project, a career, any other business event, or any combination thereof. In a particular embodiment, the life event may include a social event. In a particular embodiment, the social event may include a religious activity, a performance, a party, a sporting activity, a fraternal organization activity, a recreational activity, a festival, any other social events, or any combination thereof.

A first date reference for the first data object may be received, at 2204. The first data object may be added to the first multimedia timeline in a position based on the first date reference, at 2206. In a particular embodiment, adding the first data object to the first multimedia timeline includes adding metadata to link the first data object to a second data object. The second data object may be stored at the first multimedia timeline before the first data object is received. In a particular embodiment, the second data object may be stored in a position at the first multimedia timeline before the position of the first data object. In a particular embodiment, the first multimedia timeline may include metadata that links a second data object that is stored at the first multimedia timeline to a third data object that is stored at the first multimedia timeline. In a particular embodiment, the metadata links the second data object to a multiple data objects, including the third data object. In a particular embodiment, at least one of the multiple data objects is not stored at the first multimedia timeline.

In a particular embodiment, a first object reference element may be added to the first multimedia timeline, at 2208. The first object reference element may include a pointer to the first data object. In a particular embodiment, the first object reference element may include a media type of the first data object, a reference to a thumbnail of the first data object, other data associated with the first data object, or any combination thereof.

In a particular embodiment, a first linking element may be added to a first timeline data structure, at 2210. The first linking element may include the first date reference and a first pointer to the first object reference element. In a particular embodiment, the first linking element may be added to the first timeline data structure in chronological order based on the first date reference.

In a particular embodiment, the first timeline data structure may include a header having a timeline identifier to uniquely identify the first multimedia timeline. In a particular embodiment, the timeline identifier may be a unique or semi-unique timeline identifier. In a particular embodiment, the first timeline data structure may include a linked list of multiple linking elements associated with the first multimedia timeline. In a particular embodiment, the multiple linking elements may be chronologically ordered. In a particular embodiment, the first timeline data structure may be the first data structure 1301 of FIG. 13.

In a particular embodiment, other linking elements having other date references may be added to the first timeline data structure based on the date references. In a particular embodiment, one or more linking elements that include pointers to the first data object or the first object reference element may be added to other timeline data structures associated with other life events.

In a particular embodiment, a second data object is received, at 2212. A second date reference for the second data object may be received, at 2214. A second object reference element may be added to the first multimedia timeline, at 2216. The second object reference element may include a pointer to the second data object. A second linking element may be added to the first timeline data structure, at 2218. The second linking element may include the second date reference and a pointer to the second object reference element. The second linking element may be added to the first timeline data structure in chronological order based on the second date reference.

Figure 23:
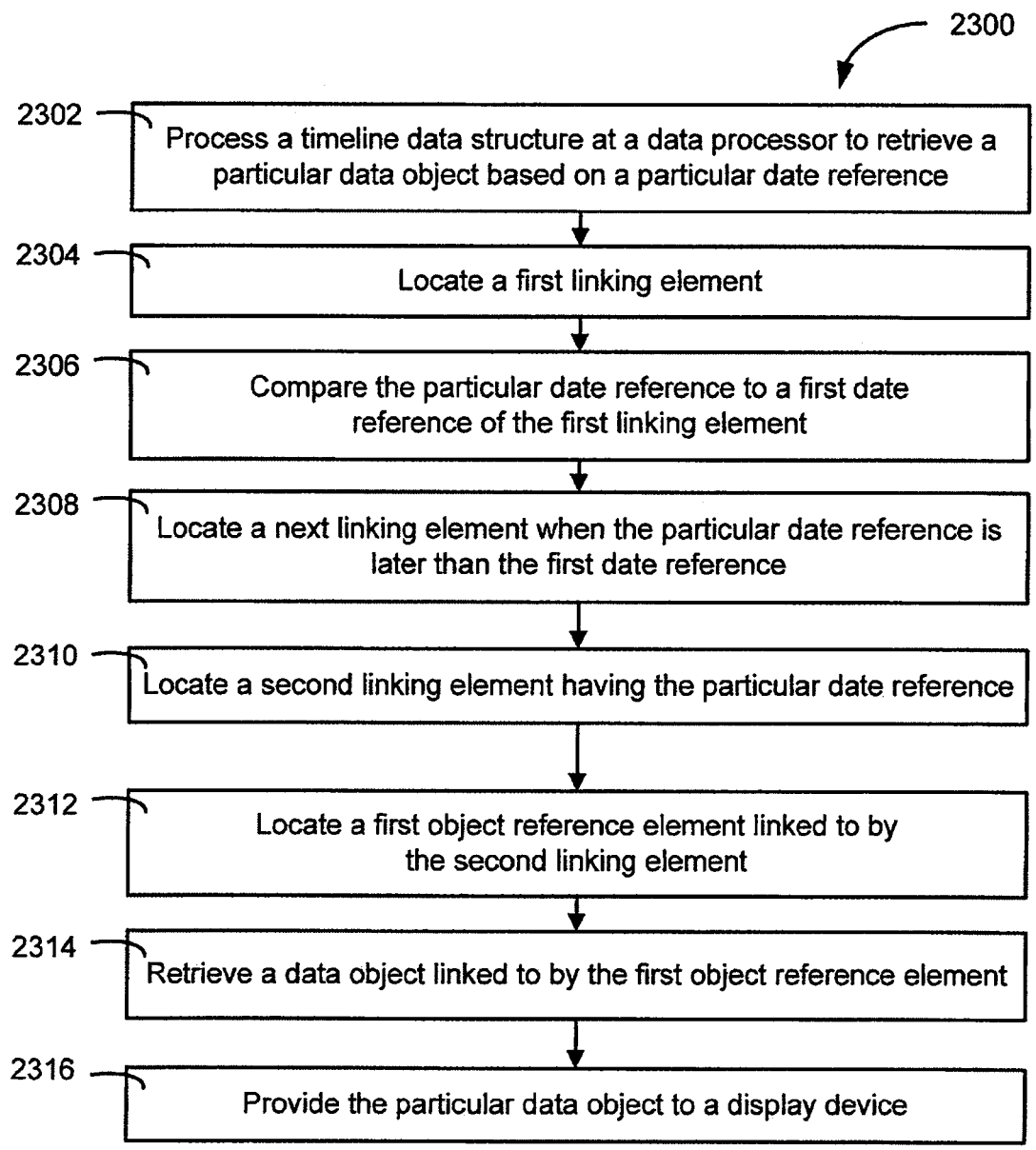
FIG. 23 is a flow diagram of another illustrative embodiment of a method of providing a multimedia timeline.

Referring to FIG. 23, another illustrative embodiment of a method of providing a multimedia timeline is depicted and generally designated 2300. A timeline data structure is processed at a data processor to retrieve a particular data object based on a particular date reference, at 2302. In a particular embodiment, the data processor may execute instructions tangibly embodied in a computer-readable medium.

In a particular embodiment, the timeline data structure may include a header to identify a multimedia timeline, where the multimedia timeline corresponds to a life event. In a particular embodiment, the timeline data structure may include a chronologically ordered group of linking elements. At least one of the linking elements may be linked to the header. The chronologically ordered group of linking elements may include information to link to data objects of the multimedia timeline. Each linking element may be associated with a date reference. In a particular embodiment, the timeline data structure may be the first data structure 1301 of FIG. 13.

In a particular embodiment, a first linking element is located, at 2304. The particular date reference is compared to a first date reference of the first linking element, at 2306. A next linking element is located when the particular date reference is later than the first date reference, at 2308.

In a particular embodiment, each linking element of the chronologically ordered group of linking elements is associated with at least one of the data objects. In a particular embodiment, the chronologically ordered group of linking elements may be modifiable by the data processor to maintain a chronological order when a linking element is added. In a particular embodiment, each linking element may link to at least one object reference element of a group of object reference elements. In a particular embodiment, each of the group of object reference elements links to at least one of the data objects.

In a particular embodiment, a second linking element having the particular date reference may be located, at 2310. A first object reference element that the second linking element links to may be located, at 2312. A data object that the first object reference element links to may be retrieved, at 2314. The particular data object may be provided to a display device, at 2316.

Figure 24:
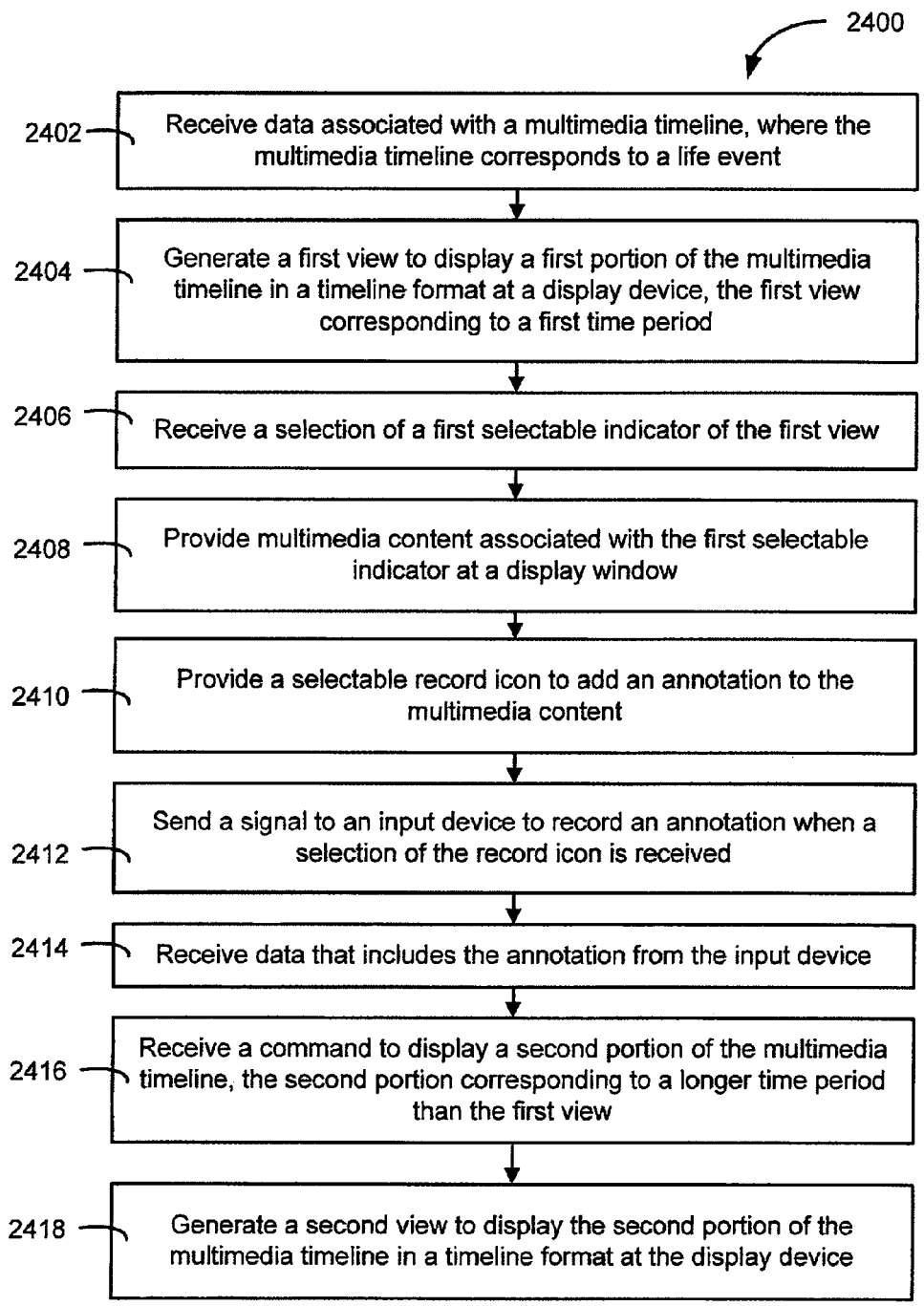
FIG. 24 is a flow diagram of a particular illustrative embodiment of a method of displaying a multimedia timeline.

Referring to FIG. 24, a particular illustrative embodiment of a method of displaying a multimedia timeline is depicted and generally designated 2400. Data associated with a multimedia timeline is received, at 2402. In a particular embodiment, the multimedia timeline may correspond to a life event. A first view may be generated to display a first portion of the multimedia timeline in a timeline format at a display device, at 2404. In a particular embodiment, the first portion of the multimedia timeline includes the complete multimedia timeline. In another embodiment, the first portion of the multimedia timeline includes a portion, but not all of the multimedia timeline.

In a particular embodiment, the first view may correspond to a first time period. In a particular embodiment, the first time period may be based on a day. In a particular embodiment, the first view may include multiple selectable indicators that are displayed in a chronological order. In a particular embodiment, the first view may be the daily view 1402 of FIG. 14.

In a particular embodiment, a selection of a first selectable indicator may be received, at 2406. In a particular embodiment, multimedia content associated with the first selectable indicator may be displayed at a display window, at 2408. In a particular embodiment, the display window may be config- ured to provide any type of multimedia content, including audio, video, textual, etc. In a particular embodiment, the display window may be the display window 1418 of FIG. 14.

In a particular embodiment, a selectable record icon to add an annotation to the multimedia content may be provided, at 2410. In a particular embodiment, a signal may be sent to an input device to record an annotation when a selection of the record icon is received, at 2412. In a particular embodiment, data that includes the annotation may be received from the input device, at 2414. In a particular embodiment, the input device may be the user input device 106 of FIG. 1.

In a particular embodiment, a command to display a second portion of the multimedia timeline may be received, at 2416. The second portion of the multimedia timeline may correspond to a longer time period than the first view. In a particular embodiment, a second view may be generated to display the second portion of the multimedia timeline in a timeline format at the display device, at 2418. In a particular embodiment, the second view may include a second plurality of selectable indicators that are displayed in a chronological order. In a particular embodiment, the first view may be a weekly view, and the second view may be a monthly view. In a particular embodiment, the second view may be the weekly view 1404 of FIG. 14.

Figure 25:
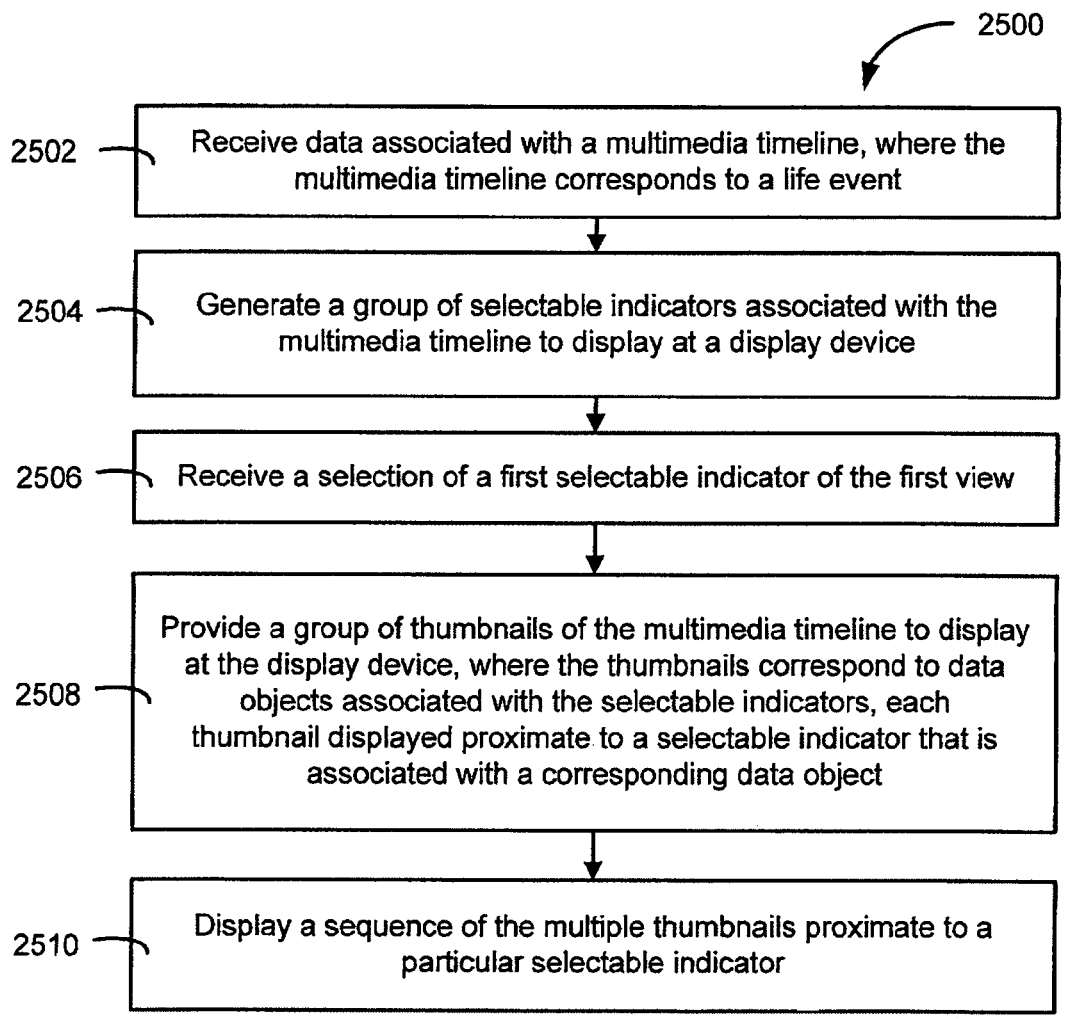
FIG. 25 is a flow diagram of another illustrative embodiment of a method of displaying a multimedia timeline.

Referring to FIG. 25, another illustrative embodiment of a method of displaying a multimedia timeline is depicted and generally designated 2500. Data associated with a multimedia timeline may be received, at 2502. The multimedia timeline may correspond to a life event. In a particular embodiment, data associated with the multimedia timeline may be received via a dongle that provides a dedicated exclusive wireless network for multimedia timeline data. In a particular embodiment, the dongle may be the dongle 910 of FIG. 9.

A group of selectable indicators associated with the multimedia timeline may be generated to display at a display device, at 2504. A group of thumbnails of the multimedia timeline may be provided to display at the display device, at 2508. In a particular embodiment, the thumbnails may correspond to data objects associated with the selectable indicators. In a particular embodiment, each thumbnail may be displayed proximate to a selectable indicator that is associated with a corresponding data object. In a particular embodiment, multiple thumbnails may be associated with a particular selectable indicator. In a particular embodiment, a sequence of the multiple thumbnails may be displayed proximate to the particular selectable indicator, at 2510.

Figure 26:
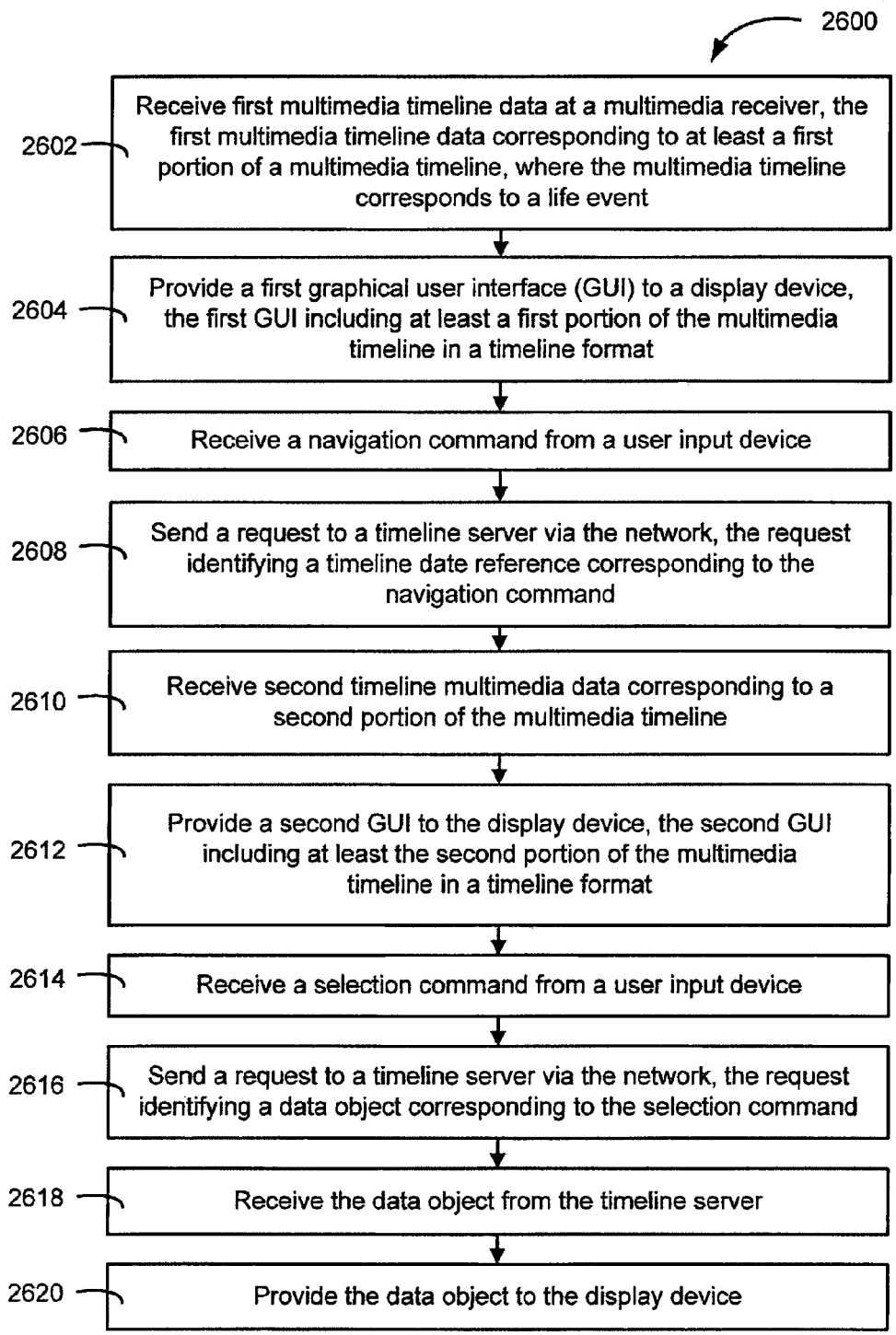
FIG. 26 is a flow diagram of a particular illustrative embodiment of a method of accessing a multimedia timeline.

Referring to FIG. 26, a particular illustrative embodiment of a method of accessing a multimedia timeline is depicted and generally designated 2600. First multimedia timeline data is received at a multimedia device, at 2602. In a particular embodiment, the multimedia device may be the multimedia device 102 of FIG. 1. The first multimedia timeline data may correspond to at least a first portion of a multimedia timeline. The multimedia timeline may correspond to a life event.

A first graphical user interface (GUI) may be provided to a display device, at 2604. The first GUI may include at least a first portion of the multimedia timeline in a timeline format. In a particular embodiment, the multimedia device may be directly connected to the display device. In a particular embodiment, the multimedia device may be hardwired to the display device. In a particular embodiment, the display device may be a television or a monitor. The first GUI may be provided without using a personal computer.

In a particular embodiment, the multimedia timeline data may include a header and metadata associated with data objects of the multimedia timeline. In a particular embodiment, the metadata may identify a date reference and a media type of each of the data objects. In a particular embodiment, the metadata may identify a date reference and a media type of each data object. In a particular embodiment, at least one data object of the multimedia timeline is not provided to the multimedia device until an indicator corresponding to the at least one data object is selected at the first GUI.

In a particular embodiment, a navigation command may be received from a user input device, at 2606. In a particular embodiment, the user input device may be the user input device 106 of FIG. 1. A request may be sent to a timeline server via a network, at 2608. The request may identify a timeline date reference corresponding to the navigation command. In a particular embodiment, the timeline server may be the timeline server 302 of FIG. 3.

In a particular embodiment, second timeline multimedia data corresponding to a second portion of the multimedia timeline may be received, at 2610. A second GUI may be provided to the display device, at 2612. The second GUI may include at least the second portion of the multimedia timeline in a timeline format.

In a particular embodiment, a selection command may be received from a user input device, at 2614. A request may be sent to a timeline server via the network, at 2616. The request may identify a data object corresponding to the selection command. In a particular embodiment, the data object may be received from the timeline server, at 2618. The data object may be provided to the display device, at 2620.

In a particular embodiment, the multimedia device may be a set-top box, a television, a personal computer, a personal music player, a remote control device, a digital video disc player, or a digital camera. In a particular embodiment, the multimedia device may include at least one of an access key port and a password security mechanism to access the multimedia timeline. In a particular embodiment, the multimedia device may be configured to wirelessly communicate via a wireless network. In a particular embodiment, the multimedia device may be located at a private residence, a coffee shop, a hotel, or an airport. The multimedia timeline may be determined based on an access key device inserted into a key port of the multimedia device.

Figure 27:
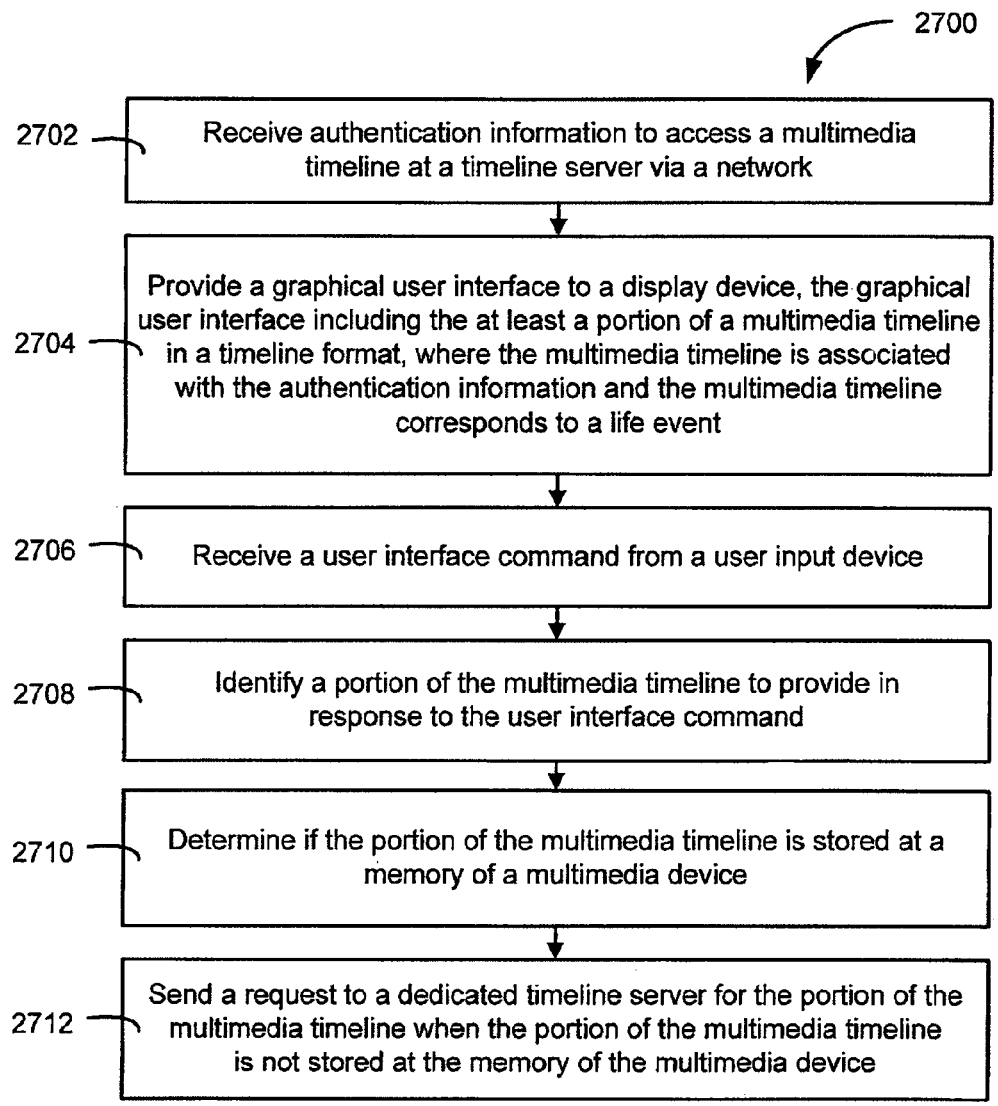
FIG. 27 is a flow diagram of another illustrative embodiment of a method of accessing a multimedia timeline.

Referring to FIG. 27, another illustrative embodiment of a method of accessing a multimedia timeline is depicted and generally designated 2700. Authentication information to access a multimedia timeline may be received at a timeline server via a network, at 2702. A graphical user interface may be provided to a display device, at 2704. The graphical user interface may include a first portion of a multimedia timeline in a timeline format. The multimedia timeline may be associated with the authentication information. The multimedia timeline may correspond to a life event.

In a particular embodiment, a user interface command may be received from a user input device, at 2706. A second portion of the multimedia timeline may be identified in response to the user interface command, at 2708. A determination if the second portion of the multimedia timeline is stored at a memory of a multimedia device may be made, at 2710. A request may be sent to a dedicated timeline server for the second portion of the multimedia timeline when the second portion of the multimedia timeline is not stored at the memory of the multimedia device, at 2712.

Figure 28:
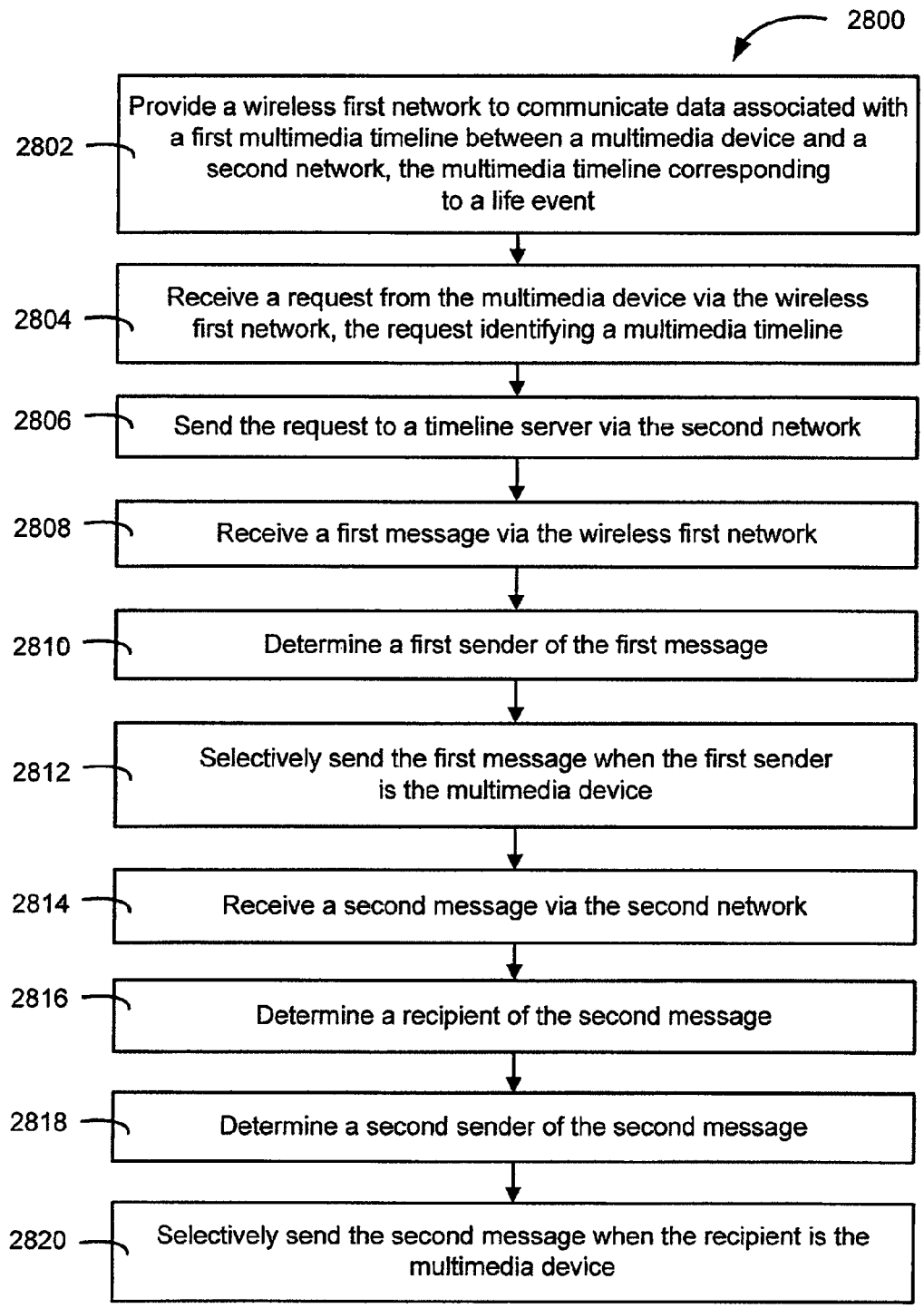
FIG. 28 is a flow diagram of a particular illustrative embodiment of a method of wirelessly communicating multimedia timeline data.

Referring to FIG. 28, a particular illustrative embodiment of a method of wirelessly communicating multimedia timeline data is depicted and generally designated 280b. A first wireless network may be provided to communicate data associated with a multimedia timeline between a multimedia device and a second network, at 2802. The multimedia timeline may correspond to a life event. In a particular embodiment, the first wireless network may be configured to provide a dedicated wireless access point to the second network to communicate multimedia timeline data between the multimedia device and the timeline server coupled to the second network. In a particular embodiment, the first wireless network may exclusively communicate multimedia timeline data between the multimedia device and the timeline server. In a particular embodiment, the first wireless network may be provided by a dongle directly connected to customer premises equipment. In a particular embodiment, the first wireless network may be provided by the dongle 1008 of FIG. 10.

In a particular embodiment, a request may be received from the multimedia device via the first wireless network, at 2804. The request may identify the multimedia timeline. The request may be sent to a timeline server via the second network, at 2806.

In a particular embodiment, a first message may be received via the first wireless network, at 2808. A first sender of the first message may be determined, at 2810. The first message may be selectively sent when the first sender is the multimedia device, at 2812.

In a particular embodiment, a second message may be received via the second network, at 2814. In a particular embodiment, a recipient of the second message may be determined, at 2816. In a particular embodiment, a second sender of the second message may be determined, at 2818. In a particular embodiment, the second message may be selectively sent when the recipient is the multimedia device, at 2820. In a particular embodiment, the second message may be selectively sent when the recipient is the multimedia device, when the second sender is a multimedia timeline server, when the message contains multimedia timeline data, or any combination thereof.

Figure 29:
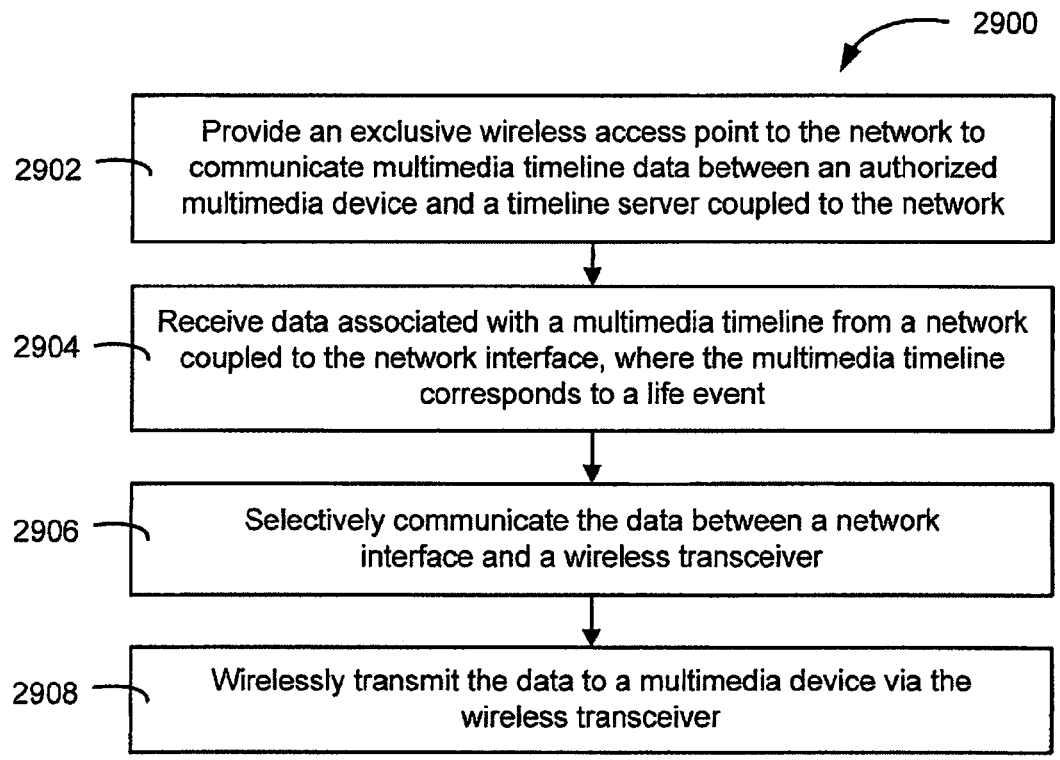
FIG. 29 is a flow diagram of another illustrative embodiment of a method of wirelessly communicating multimedia timeline data.

Referring to FIG. 29, another illustrative embodiment of a method of wirelessly communicating multimedia timeline data is depicted and generally designated 2900. In a particular embodiment, an exclusive wireless access point to the network may be provided to communicate multimedia timeline data between an authorized multimedia device and a timeline server coupled to the network, at 2902. In a particular embodiment, the wireless access point may be provided by a dongle directly coupled to customer premises equipment. In a particular embodiment, the wireless access point may be provided by the dongle 1008 of FIG. 10.

In a particular embodiment, data associated with a multimedia timeline may be received from a network coupled to the network interface, at 2904. The multimedia timeline may correspond to a life event.

In a particular embodiment, the data may be selectively communicated between a network interface and a wireless transceiver, at 2906. In a particular embodiment, the network interface may include at least one of an Ethernet interface and a Universal Serial Bus (USB) interface. In a particular embodiment, a connector may be coupled to the network interface. The connector may enable a connection to at least one of a modem, an access point, a gateway, a router, and a switch. In a particular embodiment, the data may be wirelessly transmitted to a multimedia device via the wireless transceiver, at 2908.

Figure 30:
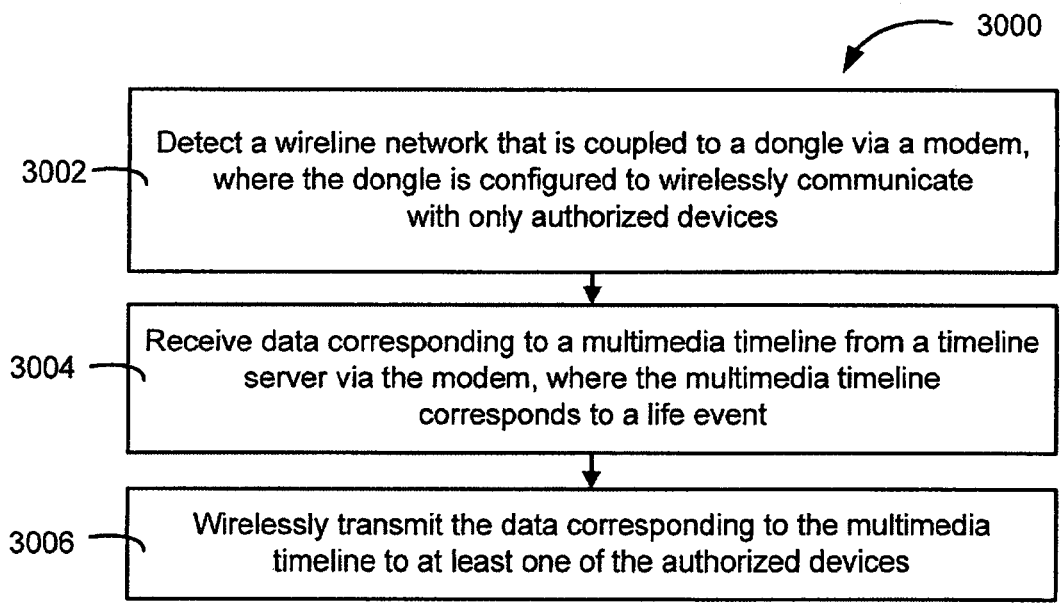
FIG. 30 is a flow diagram of another illustrative embodiment of a method of wirelessly communicating multimedia timeline data.

Referring to FIG. 30, another illustrative embodiment of a method of wirelessly communicating multimedia timeline data is depicted and generally designated 3000. A wireline network may be detected that is coupled to a dongle via a modem, at 3002. The dongle may be configured to wirelessly communicate with only an authorized device. In a particular embodiment, the dongle may be the dongle 1008 of FIG. 10.

Data corresponding to a multimedia timeline may be received from a timeline server via the modem, at 3004. The multimedia timeline may correspond to a life event. The data corresponding to the multimedia timeline may be transmitted to the authorized device, at 3006. In a particular embodiment, the data may be wirelessly transmitted to more than one authorized devices.

In a particular embodiment, a wireless network that is exclusive to the authorized device and a direct connection to the wireline network may be established by the dongle without using a personal computer. In a particular embodiment, the dongle may be preconfigured to establish a wireless network exclusive to the authorized device without requiring a software installation by a user. In a particular embodiment, the dongle may be preconfigured to establish a wireless network exclusive to the authorized device without requiring settings configured by a user. In a particular embodiment, the dongle may provide an exclusive wireless access point to the network to communicate multimedia timeline data between the authorized device and a timeline server coupled to the network.

Figure 31:
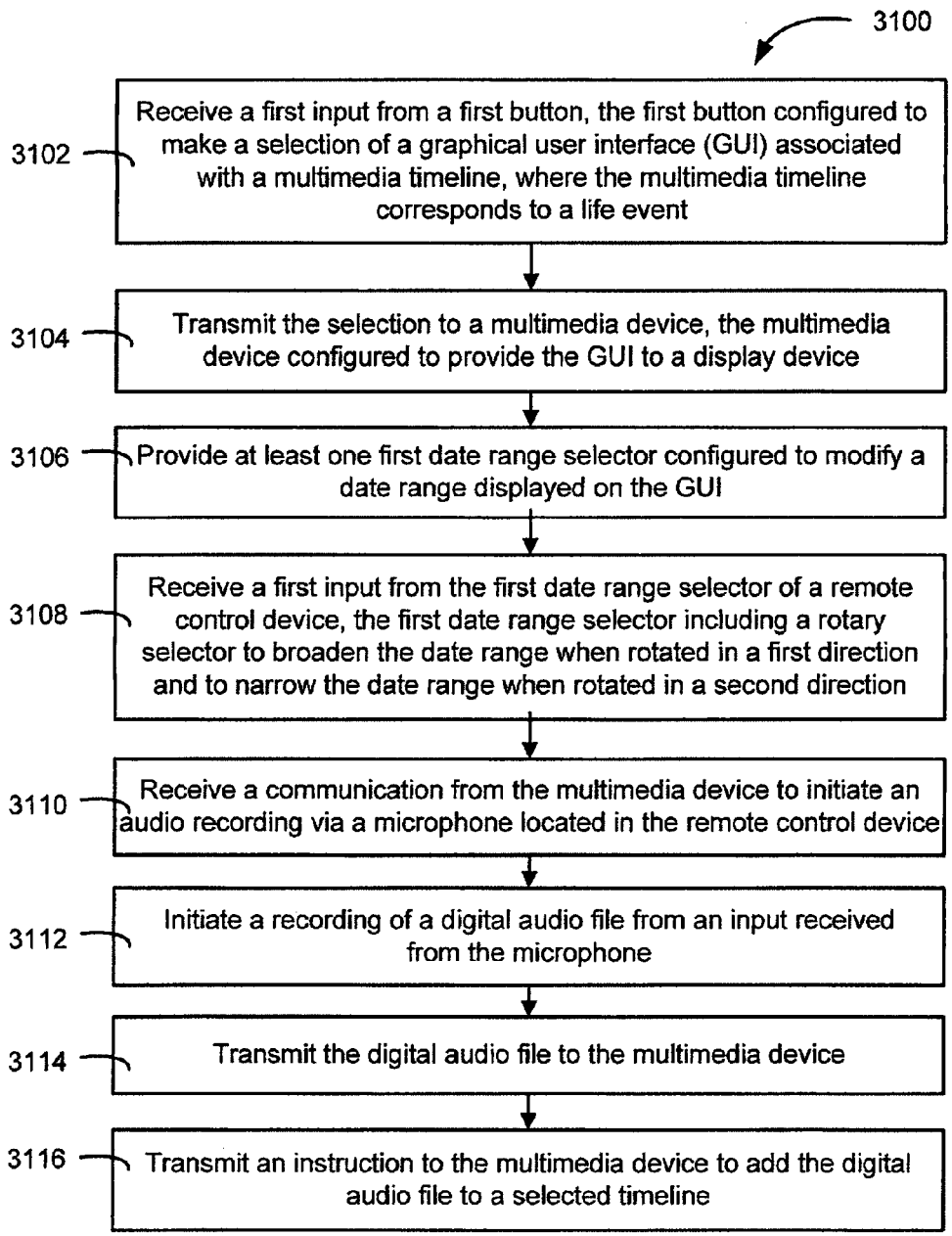
FIG. 31 is a flow diagram of a particular illustrative embodiment of a method of interacting with a multimedia timeline user interface.

Referring to FIG. 31, a particular illustrative embodiment of a method of interacting with a multimedia timeline user interface is depicted and generally designated 3100. A first input may be received from a first selector of a remote control device, at 3102. In a particular embodiment, the remote control device may be incorporated into an electronic device. In a particular embodiment, the electronic device may be a video camera, a digital camera, a telephone, or a portable music player.

In a particular embodiment, the first selector may be configured to make a selection of a graphical user interface (GUI) associated with a multimedia timeline. The multimedia timeline may correspond to a life event. In a particular embodiment, the first selector may be a button.

In a particular embodiment, the selection may be transmitted to a multimedia device, at 3104. The multimedia device may be configured to provide the GUI to a display device. At least one first date range selector configured to modify a date range displayed on the GUI may be provided, at 3106. In a particular embodiment, a first input may be received from the first date range selector of the remote control device, at 3108. The first date range selector may include a rotary selector to broaden the date range when rotated in a first direction and to narrow the date range when rotated in a second direction.

In a particular embodiment, the multimedia timeline may be received at the multimedia device via a wireless network provided by a dongle coupled to a modem. In a particular embodiment, the dongle may be directly connected to the modem. The wireless network may be dedicated to providing multimedia timeline data communication exclusively with the multimedia device.

In a particular embodiment, a communication may be received from the multimedia device to initiate an audio recording via a microphone located in the remote control device, at 3110. In a particular embodiment, a recording of a digital audio file from an input received from the microphone may be initiated, at 3112. In a particular embodiment, the digital audio file may be designated as an annotation relative to at least a portion of the timeline. The at least a portion of the timeline may have a date range based on a time period. In a particular embodiment, the time period may be selected from one of a second, a minute, an hour, a day, a week, a month, a year, a decade, a century, and a millennium.

In a particular embodiment, the digital audio file may be transmitted to the multimedia device, at 3114. An instruction may be transmitted to the multimedia device to add the digital audio file to a selected timeline, at 3116.

Figure 32:
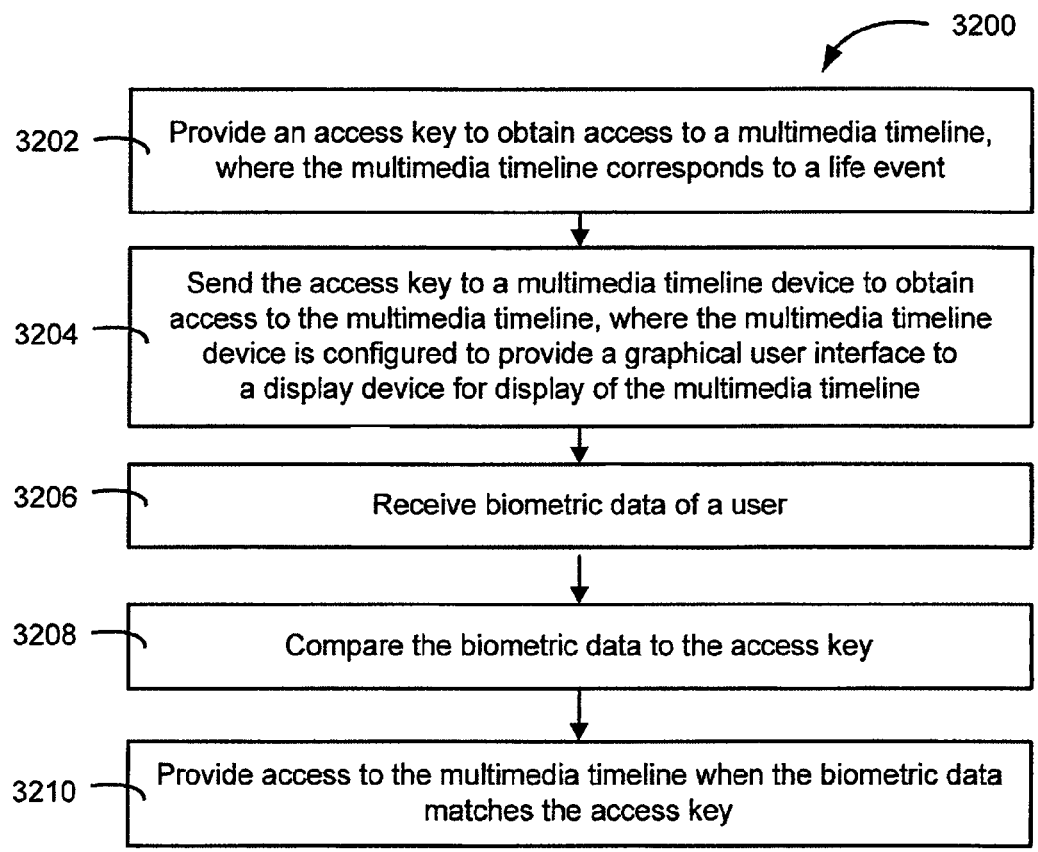
FIG. 32 is a flow diagram of another illustrative embodiment of a method of accessing a multimedia timeline.

Referring to FIG. 32, another illustrative embodiment of a method of accessing a multimedia timeline is depicted and generally designated 3200. An access key may be provided to obtain access to a multimedia timeline, where the multimedia timeline corresponds to a life event, at 3202. In a particular embodiment, the access key may be configured to allow a determination of a level of access to the multimedia timeline. The level of access may be at least partially restricted based on the access key. In a particular embodiment, the access key may be provided by an access key device. In a particular embodiment, the access key may include a cryptographic key. In a particular embodiment, the access key is provided by the key device master 532 of FIG. 5.

In a particular embodiment, the access key may be sent to a multimedia timeline device to obtain access to the multimedia timeline, at 3204. The multimedia timeline device may be configured to provide a graphical user interface to a display device for display of the multimedia timeline. In a particular embodiment, the multimedia timeline device is the multimedia device 502 of FIG. 5.

In a particular embodiment, biometric data of a user may be received, at 3206. The biometric data may be compared to the access key, at 3208. Access to the multimedia timeline may be provided when the biometric data matches the access key, at 3210. In a particular embodiment, the biometric data may include biometric data based on at least one of a fingerprint, a deoxyribo nucleic acid (DNA), an eye retina, an eye iris, a facial pattern, a hand geometry, a voice, a facial thermogram, a signature, a hand vein, and keystroke dynamics.

Figure 33:
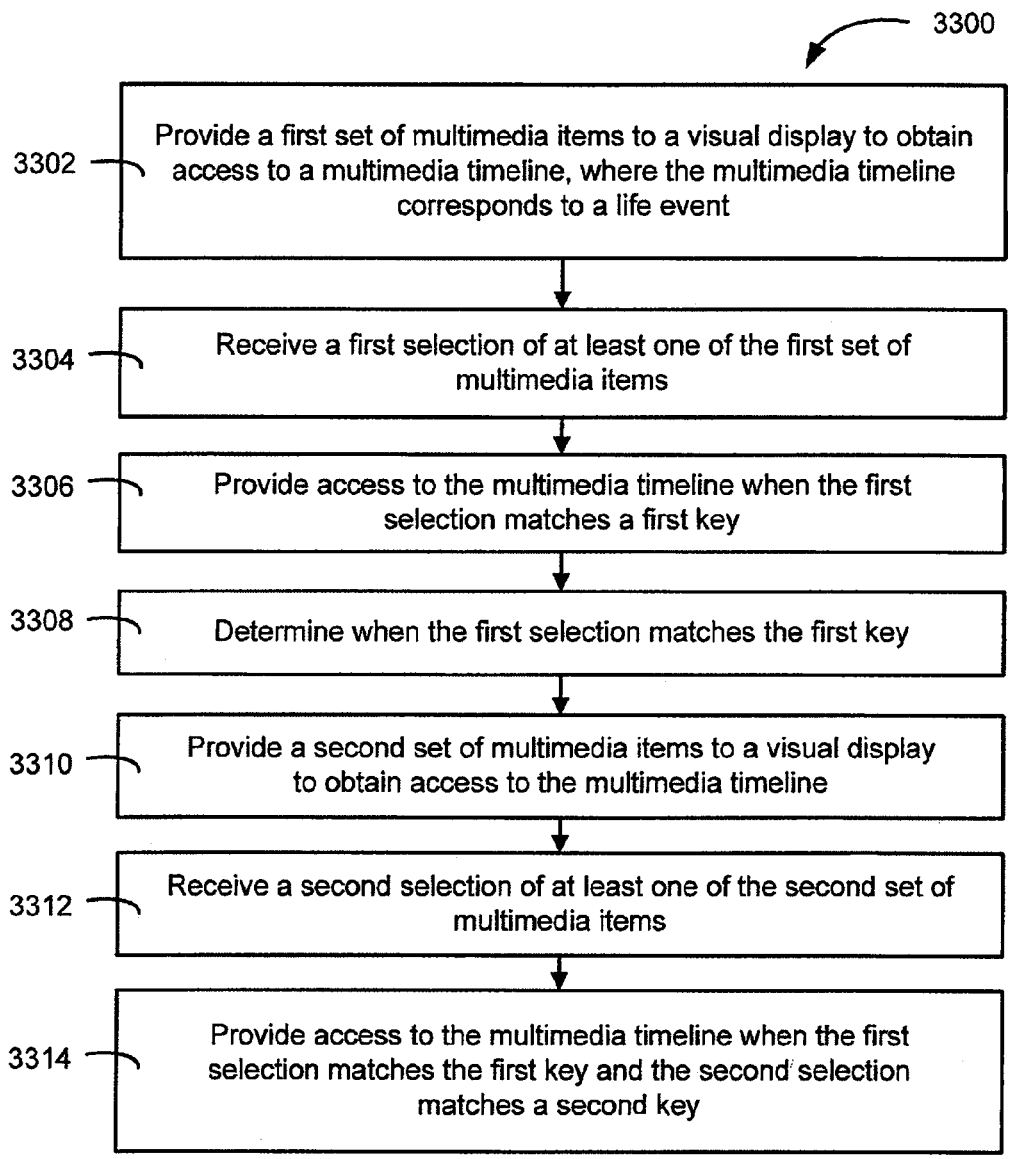
FIG. 33 is a flow diagram of a particular illustrative embodiment of a method of providing security for a multimedia timeline.

Referring to FIG. 33, a particular illustrative embodiment of a method of providing security for a multimedia timeline is depicted and generally designated 3300. A first set of multimedia items may be provided to a visual display to obtain access to a multimedia timeline, at 3302. The multimedia timeline may correspond to a life event. In a particular embodiment, a visual security mechanism to access the multimedia timeline may be initialized based on information received from an access key device. In a particular embodiment, the first set of multimedia items includes a first multimedia item from the multimedia timeline. In a particular embodiment, the first set of multimedia items includes a second multimedia item not from the multimedia timeline.

In a particular embodiment, a first selection of at least one multimedia item of the first set of multimedia items may be received, at 3304. In a particular embodiment, the first selection may include more than one multimedia item. Access may be provided to the multimedia timeline when the first selection matches a first key, at 3306. In a particular embodiment, the first key may allow access to more than one multimedia timeline. In a particular embodiment, the first key may allow access to the multimedia timeline by a multimedia timeline device coupled to a dongle configured to establish an exclusive wireless network between the multimedia timeline device and a network access point.

In a particular embodiment, the first selection may include more than one multimedia item. Access may be provided to the first set of multimedia items when the first selection of more than one multimedia item is made in a correct sequence. In a particular embodiment, access to the multimedia timeline may be disabled after receiving a predetermined number of selections that do not match the first key.

In a particular embodiment, a determination when the first selection matches the first key may be made, at 3308. A second set of multimedia items may be provided to a visual display to obtain access to the multimedia timeline, at 3310.

A second selection of at least one multimedia item of the second set of multimedia items may be received, at 3312. Access to the multimedia timeline may be provided when the first selection matches the first key and the second selection matches a second key.

In a particular embodiment, a determination when the first selection matches a second key may be made. Restricted access may be provided to the multimedia timeline when the first selection matches the second key. In a particular embodiment, non-restricted access to the multimedia timeline may be provided when the first selection matches the first key.

In a particular embodiment, the restricted access may allow a user to view only a portion of the multimedia timeline. In a particular embodiment, the restricted access may not allow a user to edit any portion of the multimedia timeline. In a particular embodiment, the restricted access may allow a user to edit only a portion of the multimedia timeline. In a particular embodiment, the restricted access may allow a user to record an annotation for a data object stored in the multimedia timeline.

In a particular embodiment, a determination when the first selection matches the first key may be made. A second set of multimedia items may be provided to the visual display to obtain access to the multimedia timeline. A second selection of at least one multimedia item of the second set of multimedia items may be received. A third set of multimedia items may be provided to the visual display to obtain access to the multimedia timeline. A third selection of at least one multimedia item of the third set of multimedia items may be received. Access to the multimedia timeline may be provided when the first selection matches the first key, the second selection matches a second key, and the third selection matches a third key. In a particular embodiment, each set of multimedia items may contain twelve multimedia items.

Figure 34:
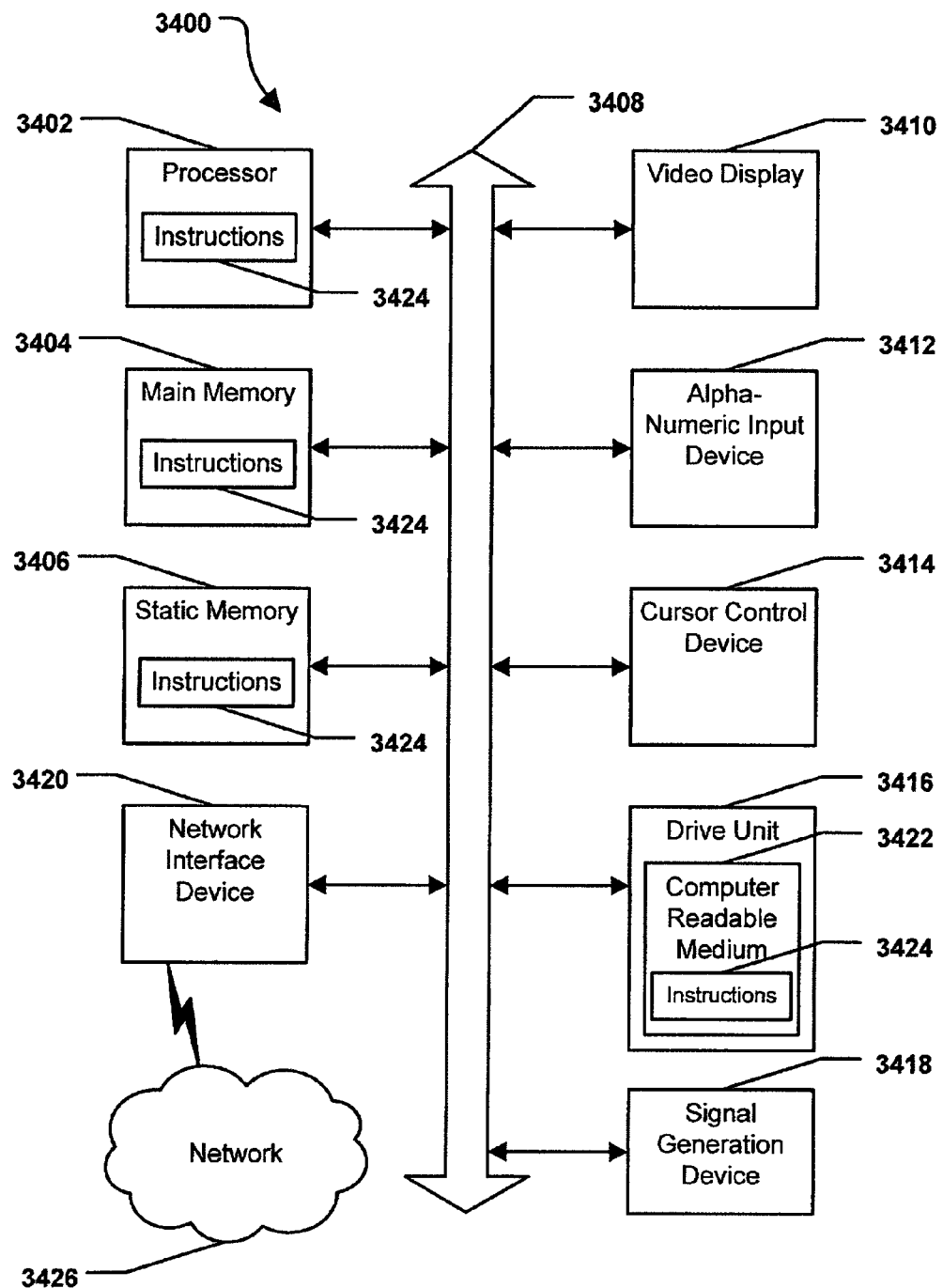
FIG. 34 is a diagram of an illustrative embodiment of a general computer system.

Referring to FIG. 34, an illustrative embodiment of a general computer system is shown and is designated 3400. The computer system 3400 can include a set of instructions that can be executed to cause the computer system 3400 to perform any one or more of the methods or computer based functions disclosed herein. The computer system 3400, or any portion thereof, may operate as a standalone device or may be connected, e.g., using a network, to other computer systems or peripheral devices, including a server or multimedia device, as shown in FIGS. 1-12.

In a networked deployment, the computer system may operate in the capacity of a server, such as a timeline server or content acquisition server, or a multimedia device. The computer system 3400 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 3400 can be implemented using electronic devices that provide voice, video or data communication. Further, while a single computer system 3400 is illustrated, the term "system" shall also be taken to include any collection of systems or sub-systems that individually or jointly execute a set, or multiple sets, of instructions to perform one or more computer functions.

As illustrated in FIG. 34, the computer system 3400 may include a processor 3402, e.g., a central processing unit (CPU), a graphics-processing unit (GPU), or both. Moreover, the computer system 3400 can include a main memory 3404 and a static memory 3406 that can communicate with each other via a bus 3408. As shown, the computer system 3400 may further include a video display unit 3410, such as a liquid crystal display (LCD), an organic light emitting diode (OLED), a flat panel display, a solid state display, or a cathode ray tube (CRT). Additionally, the computer system 3400 may include an input device 3412, such as a keyboard, and a cursor control device 3414, such as a mouse. The computer system 3400 can also include a disk drive unit 3416, a signal generation device 3418, such as a speaker or remote control, and a network interface device 3420.

In a particular embodiment, as depicted in FIG. 34, the disk drive unit 3416 may include a computer-readable medium 3422 in which one or more sets of instructions 3424, e.g. software, can be embedded. Further, the instructions 3424 may embody one or more of the methods or logic as described herein. In a particular embodiment, the instructions 3424 may reside completely, or at least partially, within the main memory 3404, the static memory 3406, and/or within the processor 3402 during execution by the computer system 3400. The main memory 3404 and the processor 3402 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 3424 or receives and executes instructions 3424 responsive to a propagated signal, so that a device connected to a network 3426 can communicate voice, video or data over the network 3426. Further, the instructions 3424 may be transmitted or received over the network 3426 via the network interface device 3420.

The present disclosure contemplates a computer-readable medium that includes instructions 3424 so that a device connected to a network 3426 can communicate voice, video or data over the network 3426. Further, the instructions 3424 may be transmitted or received over the network 3426 via the network interface device 3420.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

It should also be noted that software that implements the disclosed methods may optionally be stored on a tangible storage medium, such as: a magnetic medium, such as a disk or tape; a magneto-optical or optical medium, such as a disk; or a solid state medium, such as a memory card or other package that houses one or more read-only (non-volatile) memories, random access memories, or other re-writable (volatile) memories. Accordingly, the disclosure is considered to include a tangible storage medium as listed herein, and other equivalents and successor media, in which the software implementations herein may be stored.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

In a particular embodiment, a method of providing a multimedia timeline is disclosed. The method includes receiving at a computer a selection of a first set of data objects to add to a multimedia timeline. The first set of data objects corresponds to a life event. The method also includes sending the first set of data objects to a server to be included in the multimedia timeline. The multimedia timeline is configured to be accessible for viewing in a timeline format.

In another embodiment, a method is disclosed. The method includes receiving a first data object at a server. The method includes adding the first data object to a first multimedia timeline that corresponds to a first life event of a first user. The method includes receiving a first request for at least a portion of the first multimedia timeline from a first multimedia device coupled to the server via a network. The method further includes sending the at least a portion of the first multimedia timeline to the first multimedia device in response to the first request.

In another embodiment, a system is disclosed. The system includes a processor and a data storage device accessible to the processor. The system also includes an interface accessible to the processor to send and receive data via a network. The system further includes a memory accessible to the processor. The memory includes instructions executable by the processor to receive a first set of data objects via the interface. The memory includes instructions executable by the processor to add the first set of data objects to a multimedia timeline that corresponds to a life event. The memory includes instructions executable by the processor to receive a first request for at least a portion of the multimedia timeline from a multimedia device. The memory further includes instructions executable by the processor to send the at least a portion of the multimedia timeline to the multimedia device in response to the first request. The at least a portion of the multimedia timeline includes at least one data object of the first set of data objects.

In another embodiment, a computer-readable medium is disclosed. The computer readable medium has instructions to cause a processor to execute a method. The method may include determining a set of data objects to add to a multimedia timeline. The multimedia timeline may correspond to a life event. The method may also include generating metadata that includes a separate date reference for each data object of the set of data objects.

In another embodiment, a method is disclosed. The method includes receiving a first data object to add to a first multimedia timeline. The first multimedia timeline corresponds to a first life event. The method includes receiving a first date reference for the first data object. The method further includes adding the first data object to the first multimedia timeline in a position based on the first date reference.

In another embodiment, a method is disclosed that includes processing a timeline data structure at a data processor to retrieve a particular data object based on a particular date reference. The method also includes providing the particular data object to a display device. The timeline data structure may include a header to identify a multimedia timeline, where the multimedia timeline corresponds to a life event. The timeline data structure may also include a chronologically ordered group of linking elements. At least one of the linking elements may be linked to the header. The chronologically ordered group of linking elements may include information to link to data objects of the multimedia timeline. Each linking element may be associated with a date reference.

In another embodiment, a system is disclosed. The system includes a, processor and a computer-readable medium accessible to the processor. The computer-readable medium may have instructions to cause the processor to execute a method. The method may include selecting a data object to add to a multimedia timeline, where the multimedia timeline corresponds to a life event. The method may include selecting a date reference for the data object. The method may further include adding the data object to the multimedia timeline based on the date reference.

In another embodiment, a computer-readable medium having instructions to cause a processor to execute a method is disclosed. The method includes receiving a data object to add to a multimedia timeline, where the multimedia timeline corresponds to a life event. The method may include receiving a date reference for the data object via user input. The method may further include adding the data object to the multimedia timeline at a position based on the date reference.

In another embodiment, a method of displaying a multimedia timeline is disclosed. The method includes receiving data associated with a multimedia timeline. The multimedia timeline may correspond to a life event. The method may also include generating a first view to display a first portion of the multimedia timeline in a timeline format at a display device. The first view may correspond to a first time period.

In another embodiment, a graphical user interface to display a multimedia timeline is disclosed. The graphical user interface includes a plurality of selectable indicators associated with a multimedia timeline. The multimedia timeline may correspond to a life event. A selection of at least one of the plurality of selectable indicators may cause a display window to provide a data object of the multimedia timeline.

In another embodiment, a computer-readable medium is disclosed. The computer-readable medium has instructions to cause a processor to execute a method. The method includes receiving data associated with a multimedia timeline. The multimedia timeline may correspond to a life event. The method may include generating a plurality of selectable indicators associated with the multimedia timeline to be displayed at a display device. The method may further include providing a plurality of thumbnails of the multimedia timeline to display at the display device. Each of the plurality of thumbnails may correspond to a data objects associated with one of the plurality of selectable indicators. Each thumbnail of the plurality of thumbnails may be displayed proximate to a selectable indicator that is associated with a corresponding data object.

In another embodiment, a method is disclosed. The method includes receiving first multimedia timeline data at a multimedia device, the first multimedia timeline data corresponding to at least a first portion of a multimedia timeline. The multimedia timeline may correspond to a life event. The method may further include providing a first graphical user interface (GUI) to a display device. The first GUI may include at least a first portion of the multimedia timeline in a timeline format.

In another embodiment, a system is disclosed. The system may include a network interface and a processor coupled to the network interface. The system may also include a display interface coupled to the processor to communicate with a display device. The system may further include a computer-readable medium accessible to the processor and having instructions to cause the processor to execute a method. The method may include receiving multimedia timeline data from a timeline server via the network interface. The multimedia timeline data may correspond to at least a portion of a multimedia timeline. The multimedia timeline may correspond to a life event. The method may further include providing a graphical user interface to the display device via the display interface. The graphical user interface may include the at least a portion of the multimedia timeline in a timeline format In another embodiment, a computer-readable medium is disclosed. The computer-readable medium has instructions to cause a processor to execute a method. The method may include receiving authentication information to access a multimedia timeline at a timeline server via a network. The method may also include providing a graphical user interface to a display device. The graphical user interface may include a first portion of a multimedia timeline in a timeline format. The multimedia timeline may be associated with the authentication information. The multimedia timeline may correspond to a life event.

In another embodiment, a method is disclosed. The method includes providing a wireless first network to communicate data associated with a first multimedia timeline between a multimedia device and a second network. The multimedia timeline may correspond to a life event. A request may be received from the multimedia device via the wireless first network. The request may identify a multimedia timeline. The request may be sent to a timeline server via the second network.

In another embodiment, a device is disclosed. The device may include a wireless transceiver. The device may also include a network interface. The device may further include a processor coupled to the wireless transceiver and further coupled to the network interface. The processor may be configured to receive data associated with a multimedia timeline from a network coupled to the network interface. The multimedia timeline may correspond to a life event. The processor may be configured to selectively communicate the data between the network interface and the wireless transceiver. The processor may be configured to wirelessly transmit the data to a multimedia device via the wireless transceiver.

In another embodiment, a computer-readable medium is disclosed. The computer-readable medium has instructions to cause a processor to perform a method. The method may include detecting a wireline network that is coupled to a dongle via a modem. The dongle may be configured to wirelessly communicate with only authorized devices. The method may include receiving data corresponding to a multimedia timeline from a timeline server via the modem. The multimedia timeline may correspond to a life event. The method may further include wirelessly transmitting the data corresponding to the multimedia timeline to at least one of the authorized devices.

In another embodiment, a remote control apparatus is disclosed. The remote control apparatus may include a first button configured to make a selection of a graphical user interface (GUI) associated with a multimedia timeline. The multimedia timeline may correspond to a life event. The remote control apparatus may include a transmitter to transmit the selection to a multimedia device. The multimedia device may be configured to provide the GUI to a display device. The remote control apparatus may further include at least one first date range selector configured to modify a date range displayed on the GUI.

In another embodiment, a method for interacting with a multimedia timeline user interface is disclosed. The method may include receiving a first input from a first button of a remote control device. The first button may be configured to make a selection of a graphical user interface (GUI) associated with a multimedia timeline. The multimedia timeline may correspond to a life event. The method may include transmitting the selection to a multimedia device. The multimedia device may be configured to provide the GUI to a display device. The method may further include providing at least one first date range selector configured to modify a date range displayed on the GUI.

In another embodiment, a computer-readable medium internal to a remote control device is disclosed. The computer-readable medium has instructions to cause a processor to perform a method. The method may include receiving a first input from a first button. The first button may be configured to make a selection of a graphical user interface (GUI) associated with a multimedia timeline. The multimedia timeline may correspond to a life event. The method may include transmitting the selection to a multimedia device. The multimedia device may be configured to provide the GUI to a display device. The method may further include providing at least one first date range selector configured to modify a date range displayed on the GUI.

In another embodiment, a device is disclosed that includes a memory to store an access key to obtain access to a multimedia timeline. The multimedia timeline may correspond to a life event. The device may include an interface to provide the access key to a multimedia timeline device to obtain access to the multimedia timeline. The multimedia timeline device may be configured to provide a graphical user interface to a display device for display of the multimedia timeline.

In another embodiment, a method is disclosed that includes providing an access key to obtain access to a multimedia timeline. The multimedia timeline may correspond to a life event. The method may include sending the access key to a multimedia timeline device to obtain access to the multimedia timeline. The multimedia timeline device may be configured to provide a graphical user interface to a display device for display of the multimedia timeline.

In another embodiment, a method is disclosed that includes providing a first set of multimedia items to a visual display to obtain access to a multimedia timeline. The multimedia timeline may correspond to a life event. The method may include receiving a first selection of at least one of the first set of multimedia items. The method may further include providing access to the multimedia timeline when the first selection matches a first key.

In another embodiment, a graphical user interface is disclosed that includes a first screen. The first screen may include a first set of multimedia items provided to obtain access to a multimedia timeline. The multimedia timeline may correspond to a life event. The first screen may also include a first selection button to select a first selection. The first selection may include at least one multimedia item from the first set of multimedia items. The first screen may further include a first control button to indicate that the first selection is complete. Access to the multimedia timeline may be granted when the first selection matches a first key.

In another embodiment, a computer-readable medium is disclosed. The computer-readable medium has instructions to cause a processor to perform a method. The method may include providing a first set of multimedia items to a visual display to obtain access to a multimedia timeline. The multimedia timeline may correspond to a life event. The method may include receiving a first selection of at least one of the first set of multimedia items. The method may further include providing access to the multimedia timeline when the selection matches a first key.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method comprising:
   receiving, at a device, data associated with a multimedia timeline, wherein the multimedia timeline corresponds to a life event;
   generating a first view to display a first portion of the multimedia timeline in a first timeline format at a display device, the first view corresponding to a first time period, wherein the first view includes a first selectable record icon;
   receiving a first audio annotation by activating a microphone in response to a selection of the first selectable record icon;
   associating the first audio annotation with the first portion of the multimedia timeline;
   in response to receiving a command to modify the first view via a rotary selector of a remote control device, generating a second view to display a second portion of the multimedia timeline in a second timeline format at the display device, the second view corresponding to a second time period, wherein the second view includes a second selectable record icon;
   receiving a second audio annotation by activating the microphone in response to a selection of the second selectable record icon; and
   associating the second audio annotation with the second portion of the multimedia timeline, wherein the second time period is broadened with respect to the first time period when the command corresponds to the rotary selector being rotated in a first direction, and wherein the second time period is narrowed with respect to the first time period when the command corresponds to the rotary selector being rotated in a second direction.

2. The method of claim 1, wherein the life event comprises at least a portion of a person's life.

3. The method of claim 1, wherein the life event comprises a business event.

4. The method of claim 3, wherein the business event comprises a meeting, a presentation, a conference, a project, a career, or any combination thereof.

5. The method of claim 1, wherein the life event comprises a social event.

6. The method of claim 5, wherein the social event comprises a religious activity, a performance, a party, a sporting activity, a fraternal organization activity, a recreational activity, a festival, or any combination thereof.

7. The method of claim 1, wherein the first time period is based on a day.

8. The method of claim 1, wherein the first view includes a first plurality of selectable indicators displayed in chronological order.

9. The method of claim 8, further comprising:
receiving a selection of a first selectable indicator of the first plurality of selectable indicators; and
providing multimedia content associated with the first selectable indicator at a display window.

10. The method of claim 8, wherein the second view includes a second plurality of selectable indicators that are displayed in chronological order.

11. The method of claim 1, wherein the microphone is integrated into the remote control device.

12. The method of claim 1, wherein the first view is a weekly view, and wherein the weekly view is modified to a monthly view when the command corresponds to the rotary selector being rotated in the first direction.

13. The method of claim 1, wherein the first portion of the multimedia timeline includes all of the multimedia timeline.

14. The method of claim 1, wherein the first portion of the multimedia timeline includes less than all of the multimedia timeline.

15. A computer-readable storage device storing instructions that, when executed by a processor, cause the processor to perform operations, comprising:
generating a graphical user interface including a plurality of selectable indicators associated with a multimedia timeline, wherein the multimedia timeline corresponds to a life event;
displaying a data object of the multimedia timeline in a display window in response to a selection of at least one of the plurality of selectable indicators, wherein the display window includes a first selectable record icon;
receiving a first audio annotation by activating a microphone in response to a selection of the first selectable record icon;
associating the first audio annotation with the data object;
modifying a first view that displays a first portion of the multimedia timeline to a second view that displays a second portion of the multimedia timeline, wherein the first view is modified in response to receiving a command to modify the first view via a rotary selector of a remote control device, wherein the first view corresponds to a first time period and includes a second selectable record icon, and wherein the second view corresponds to a second time period and includes a third selectable record icon;
receiving a second audio annotation by activating the microphone in response to a selection of the second selectable record icon;
associating the second audio annotation with the first portion of the multimedia timeline;
receiving a third audio annotation by activating the microphone in response to a selection of the third selectable record icon; and
associating the third audio annotation with the second portion of the multimedia timeline,
wherein the second time period is broadened with respect to the first time period when the command corresponds to the rotary selector being rotated in a first direction, and
wherein the second time period is narrowed with respect to the first time period when the command corresponds to the rotary selector being rotated in a second direction.

16. The computer-readable storage device of claim 15, wherein the display window includes a play control, a rewind control, and a fast-forward control, and wherein the data object includes at least one of audio data and video data.

17. The computer-readable storage device of claim 15, wherein the plurality of selectable indicators are chronologically ordered in a timeline format.

18. The computer-readable storage device of claim 17, wherein the plurality of selectable indicators correspond to sequential time intervals of approximately equal duration.

19. The computer-readable storage device of claim 17, wherein each selectable indicator of the plurality of selectable indicators corresponds to a predetermined number of chronologically sequential data objects of the multimedia timeline.

20. The computer-readable storage device of claim 15, wherein a first selectable indicator indicates a first data object of the multimedia timeline that includes audio data, wherein a second selectable indicator indicates a second data object of the multimedia timeline that includes video data, and wherein a third selectable indicator indicates a third data object of the multimedia timeline that includes text data.

21. The computer-readable storage device of claim 15, wherein the first view includes one of a daily view, a weekly view, a monthly view, and an album view.

22. The computer-readable storage device of claim 21, wherein the album view includes at least one selectable album indicator that corresponds to an album of the multimedia timeline, wherein the album view comprises a user-determined group of data objects of the multimedia timeline.

23. The computer-readable storage device of claim 15, wherein the plurality of selectable indicators indicate data objects associated with a playlist of the multimedia timeline unrestricted based on media type.

24. The computer-readable storage device of claim 23, wherein the plurality of selectable indicators indicate data objects of the playlist corresponding to the first time period, wherein the first time period is one of a day, a week, a month, and a year.

25. The computer-readable storage device of claim 23, wherein the plurality of selectable indicators indicate at least a first data object and a second data object, wherein the first data object is associated with the playlist via a link to the second data object.

26. The computer-readable storage device of claim 25, further comprising at least one selectable control to attach a third data object to any of the data objects associated with the playlist.

27. A computer readable computer-readable storage device storing instructions that, when executed by a processor, cause the processor to perform operations comprising:
receiving data associated with a multimedia timeline, wherein the multimedia timeline corresponds to a life event;
generating a plurality of selectable indicators associated with the multimedia timeline to be displayed at a display device;
providing a plurality of thumbnails of the multimedia timeline to display at the display device, wherein each of the plurality of thumbnails corresponds to a data object associated with one of the plurality of selectable indicators, wherein each thumbnail of the plurality of thumbnails is displayed proximate to a selectable indicator that is associated with a corresponding data object;
modifying a first view that displays a first portion of the multimedia timeline to a second view that displays a second portion of the multimedia timeline, wherein the first view is modified to the second view in response to receiving a command to modify the first view via a rotary selector of a remote control device, wherein the first view corresponds to a first time period and includes a first selectable record icon, and wherein the second view corresponds to a second time period and includes a second selectable record icon;

receiving a first audio annotation by activating a microphone in response to a selection of the first selectable record icon;

associating the first audio annotation with the first portion of the multimedia timeline;

receiving a second audio annotation by activating the microphone in response to a selection of the second selectable record icon; and associating the second audio annotation with the second portion of the multimedia timeline, wherein the second time period is broadened with respect to the first time period when the command corresponds to the rotary selector being rotated in a first direction, and wherein the second time period is narrowed with respect to the first time period when the command corresponds to the rotary selector being rotated in a second direction.

28. The computer-readable storage device of claim 27, wherein the operations further comprise receiving data associated with the multimedia timeline via a dongle that provides a dedicated wireless network for multimedia timeline data.

29. The computer-readable storage device of claim 27, wherein multiple thumbnails are associated with a particular selectable indicator, and wherein the operations further comprise displaying a sequence of the multiple thumbnails proximate to the particular selectable indicator.

30. The method of claim 1, further comprising:

generating a third view to display a third portion of the multimedia timeline in a third timeline format at the display device in response to receiving a second command to modify the second view via the rotary selector of the remote control device, the third view corresponding to a third time period, wherein the third view includes a third selectable record icon;

receiving a third audio annotation by activating the microphone in response to a selection of the third selectable record icon; and associating the third audio annotation with the third portion of the multimedia timeline, wherein the third time period is broadened with respect to the second time period when the second command corresponds to the rotary selector being rotated in the first direction, and wherein the third time period is narrowed with respect to the second time period when the second command corresponds to the rotary selector being rotated in the second direction.

31. The method of claim 1, wherein the remote control device is incorporated into an electronic device.

32. The method of claim 31, wherein the electronic device includes a video camera, a digital camera, a telephone, a portable music player, or any combination thereof.

* * * * *